US009885634B2

(12) United States Patent
Hedin

(10) Patent No.: US 9,885,634 B2
(45) Date of Patent: Feb. 6, 2018

(54) ANALYSIS SYSTEM

(71) Applicant: S.P.M. INSTRUMENT AB, Strangnas (SE)

(72) Inventor: Lars-Olov Elis Hedin, Hallstahammar (SE)

(73) Assignee: S.P.M. INSTRUMENT AB, Strangnas (SE)

( * ) Notice: Subject to any disclaimer, the term of this patent is extended or adjusted under 35 U.S.C. 154(b) by 0 days.

(21) Appl. No.: 14/949,472

(22) Filed: Nov. 23, 2015

(65) Prior Publication Data
US 2016/0146700 A1 May 26, 2016

Related U.S. Application Data

(60) Division of application No. 14/332,598, filed on Jul. 16, 2014, now Pat. No. 9,200,980, which is a
(Continued)

(30) Foreign Application Priority Data

Dec. 22, 2008 (SE) ..................................... 0850178
May 5, 2009 (SE) ..................................... 0950311

(51) Int. Cl.
*G01F 17/00* (2006.01)
*G01M 13/02* (2006.01)
(Continued)

(52) U.S. Cl.
CPC .......... *G01M 13/028* (2013.01); *G01H 1/003* (2013.01); *G01M 13/045* (2013.01); *G01M 99/005* (2013.01); *G01M 99/008* (2013.01)

(58) Field of Classification Search
CPC ................................................. G01M 13/028
See application file for complete search history.

(56) References Cited

U.S. PATENT DOCUMENTS 3,554,012 A 1/1971 Sohoel
4,528,852 A 7/1985 Sohoel
(Continued)

FOREIGN PATENT DOCUMENTS

CN 1926413 3/2007
DE 3424692 2/1986
(Continued)

OTHER PUBLICATIONS

Andrew Milman, "Mathematical Principles of Remote Sensing: Making Inferences from Noisy Data", Sleeping Bear Press, Michigan, 1999, pp. 215-233
(Continued)

*Primary Examiner* — Phuong Huynh
(74) *Attorney, Agent, or Firm* — Young & Thompson

(57) ABSTRACT

A method for analyzing the condition of a machine having a rotating shaft, including:

- generating an analog electric measurement signal ($S_{EA}$) dependent on mechanical vibrations emanating from rotation of the shaft;
- sampling the analog measurement signal at a sampling frequency ($f_S$) so as to generate a digital measurement data signal ($S_{MD}$) in response to the received analog measurement data;
- performing a decimation of the digital measurement data signal ($S_{MD}$) so as to achieve a digital signal ($S_{RED}$) having a reduced sampling frequency ($f_{SR1}$, $f_{SR2}$); wherein the decimation includes the step of
- controlling the reduced sampling frequency ($f_{SR1}$, $f_{SR2}$) such that the number of sample values per revolution of the shaft (8) is kept at a substantially constant value; and (Continued)

performing a condition analysis function (F1, F2, Fn) for analyzing the condition of the machine dependent on the digital signal ($S_{RED}$) having a reduced sampling frequency ($f_{SR1}$, $f_{SR2}$).

33 Claims, 26 Drawing Sheets

Related U.S. Application Data continuation of application No. 13/141,399, filed as application No. PCT/SE2009/051490 on Dec. 22, 2009, now Pat. No. 8,812,265.

(60) Provisional application No. 61/175,508, filed on May 5, 2009.

(51) Int. Cl.
| | | |
|---|---|---|
| *G01H 1/00* | (2006.01) | |
| *G01M 13/04* | (2006.01) | |
| *G01M 99/00* | (2011.01) | |
| *G06F 11/30* | (2006.01) | |

(56) References Cited

U.S. PATENT DOCUMENTS

| | | | |
|---|---|---|---|
| 4,912,661 | A | 3/1990 | Potter |
| 4,991,442 | A | 2/1991 | Matsumoto |
| 5,201,292 | A | 4/1993 | Grajski et al. |
| 5,258,923 | A | 11/1993 | Imam et al. |
| 5,365,787 | A | 11/1994 | Hernandez et al. |
| 5,445,028 | A | 8/1995 | Bianchi et al. |
| 5,633,811 | A | 5/1997 | Canada et al. |
| 5,852,793 | A | 12/1998 | Board et al. |
| 5,870,699 | A | 2/1999 | Canada et al. |
| 5,895,857 | A | 4/1999 | Robinson et al. |
| 6,053,047 | A | 4/2000 | Dister et al. |
| 6,332,116 | B1 | 12/2001 | Qian et al. |
| 6,351,713 | B1 | 2/2002 | Board et al. |
| 6,351,714 | B1 | 2/2002 | Birchmeier |
| 6,591,682 | B1 | 7/2003 | Lysen |
| 6,618,128 | B2 | 9/2003 | Van Voorhis et al. |
| 6,801,864 | B2 | 10/2004 | Miller |
| 6,874,364 | B1 | 4/2005 | Campbell et al. |
| 7,010,445 | B2 | 3/2006 | Battenberg et al. |
| 7,133,801 | B2 | 11/2006 | Song |
| 7,136,794 | B1 | 11/2006 | Bechhoefer |
| 7,505,852 | B2 | 3/2009 | Board |
| 7,640,139 | B2 | 12/2009 | Sahara et al. |
| 7,949,496 | B2 | 5/2011 | Lindberg et al. |
| 8,810,396 | B2 | 8/2014 | Hedin |
| 8,812,265 | B2 | 8/2014 | Hedin |
| 2003/0130811 | A1 | 7/2003 | Boerhout |
| 2003/0182071 | A1 | 9/2003 | Ditommaso et al. |
| 2004/0101048 | A1 | 5/2004 | Paris |
| 2004/0199348 | A1 | 10/2004 | Hitchcock et al. |
| 2005/0209811 | A1 | 9/2005 | Lindberg et al. |
| 2005/0246150 | A1 | 11/2005 | Shiromaru et al. |
| 2006/0150738 | A1 | 7/2006 | Leigh |
| 2007/0282545 | A1 | 12/2007 | Board |
| 2008/0033695 | A1* | 2/2008 | Sahara .................. G01H 1/003 702/185 |
| 2009/0164142 | A1* | 6/2009 | Studer .................. G01M 15/12 702/33 |
| 2010/0288051 | A9 | 11/2010 | Janssens et al. |
| 2011/0285532 | A1 | 11/2011 | Hedin |
| 2011/0295557 | A1 | 12/2011 | Hedin |
| 2014/0372079 | A1 | 12/2014 | Hedin |

FOREIGN PATENT DOCUMENTS

| | | |
|---|---|---|
| EP | 0107178 | 5/1984 |
| EP | 1477783 | 11/2004 |
| EP | 1513254 | 3/2005 |
| GB | 2190198 | 11/1987 |
| GB | 2451310 | 1/2009 |
| JP | 60195426 | 10/1985 |
| JP | 1127934 | 5/1989 |
| JP | 01178814 | 7/1989 |
| JP | 04-279826 | 10/1992 |
| JP | 04279826 | 10/1992 |
| WO | 9513655 | 5/1995 |
| WO | 9527183 | 10/1995 |
| WO | 9605486 | 2/1996 |
| WO | 9801831 | 1/1998 |
| WO | 0004361 | 1/2000 |
| WO | 0103840 | 1/2001 |
| WO | 02073150 | 9/2002 |
| WO | 03062766 | 7/2003 |
| WO | 2007-137132 | 11/2007 |
| WO | 2010-07645 | 7/2010 |
| WO | 2010-074648 | 7/2010 |
| WO | 2010074645 | 7/2010 |

OTHER PUBLICATIONS

Robinson et al., "How Advanced Analysis Identifies Lubrication Problems", Machinery Health, Pumps & Systems, 2007, pp. 66-67.
James C. Robinson, "Autocorrelation as a Diagnostic Tool", 2007, pp. 1-22.
Joe Dominick, "PeakVue as Part of a Reliability Based Maintenance Program", Emerson Process Management—CSI, DoctorKnow® Application Papers, 2010 pp. 1-15.
Elliott et al., "13.2 Correlation and Autocorrelation Using the FFT", Fast Transforms: Algorithms, Analyses, Applications (New York: Academic Press), 1982, pp. 545-547
Autocorrelation from Wikipedia, 2009, http://en.wikipedia.org/wiki/autocorrelation, pp. 1-6.
Chang et al, "A Novel Envelope Detector for High-Frame Rate, High-Frequency Ultrasound Imaging", IEEE Transactions on Ultrasonics, Ferroelectrics, and Frequency Control, 2007, vol. 54, No. 9, pp. 1792-1801.
Autocorrelation—Wikipedia, the free encyclopedia, Dec. 12, 2008, p. 2-6, http://en.wikipedia.org/wiki/Autocorrelation.

* cited by examiner

ANALYSIS SYSTEM

TECHNICAL FIELD OF THE INVENTION

The present invention relates to a method for analysing the condition of a machine, and to an apparatus for analysing the condition of a machine. The invention also relates to a system including such an apparatus and to a method of operating such an apparatus. The invention also relates to a computer program for causing a computer to perform an analysis function.

DESCRIPTION OF RELATED ART

Machines with moving parts are subject to wear with the passage of time, which often causes the condition of the machine to deteriorate. Examples of such machines with movable parts are motors, pumps, generators, compressors, lathes and CNC-machines. The movable parts may comprise a shaft and bearings.

In order to prevent machine failure, such machines should be subject to maintenance, depending on the condition of the machine. Therefore the operating condition of such a machine is preferably evaluated from time to time. The operating condition can be determined by measuring vibrations emanating from a bearing or by measuring temperature on the casing of the machine, which temperatures are dependent on the operating condition of the bearing. Such condition checks of machines with rotating or other moving parts are of great significance for safety and also for the length of the life of such machines. It is known to manually perform such measurements on machines. This ordinarily is done by an operator with the help of a measuring instrument performing measurements at measuring points on one or several machines.

A number of commercial instruments are available, which rely on the fact that defects in rolling-element bearings generate short pulses, usually called shock pulses. A shock pulse measuring apparatus may generate information indicative of the condition of a bearing or a machine.

WO 03062766 discloses a machine having a measuring point and a shaft with a certain shaft diameter, wherein the shaft can rotate when the machine is in use. WO 03062766 also discloses an apparatus for analysing the condition of a machine having a rotating shaft. The disclosed apparatus has a sensor for producing a measured value indicating vibration at a measuring point. The apparatus disclosed in WO 03062766 has a data processor and a memory. The memory may store program code which, when run on the data processor, will cause the analysis apparatus to perform a Machine Condition Monitoring function. Such a Machine Condition Monitoring function may include shock pulse measuring.

U.S. Pat. No. 6,053,047 discloses an accelerometer used as vibration sensor collecting analog vibration data which is delivered to an A/D-converter which provides digital vibration data to a processor 90. According to U.S. Pat. No. 6,053,047 the processor performs digital bandpass filtering of digital vibration data, rectifying the filtered signal, and low pass filtering the rectified signal to produce a low frequency signal. The low frequency signal is passed through a capacitor to produce a demodulated signal. An FFT is performed on the demodulated signal 116 to produce a vibration spectrum. U.S. Pat. No. 6,053,047 also teaches to calculate the resonant frequency of each physical path from the accelerometer to various vibration sources in the motor and U.S. Pat. No. 6,053,047 teaches to perform this calibration step before the motor leaves the factory. Alternatively such calibration of each physical path from the various vibration sources to the accelerometer must be performed using a calibrated hammer, according to U.S. Pat. No. 6,053,047.

SUMMARY

An aspect of the invention relates to achieving an improved apparatus for the evaluation of the condition of a machine.

This object is achieved by means of an apparatus for analysing the condition of a machine having a part rotating with a speed of rotation, comprising:
 a first sensor adapted to generate an analogue electric measurement signal ($S_{EA}$) dependent on mechanical vibrations emanating from rotation of said part;
 an analogue-to-digital converter (44) for sampling said analogue measurement signal at a sampling frequency ($f_S$) so as to generate a digital measurement data signal ($S_{MD}$) in response to said received analogue measurement data;
 a first decimator for performing a decimation of the digital measurement data signal ($S_{MD}$, $S_{ENV}$) so as to achieve a first digital signal ($S_{MD}$, $S_{ENV}$) having a first reduced sampling frequency ($f_{SR1}$);
 a fractional decimator (470, 470A, 470B), said fractional decimator (470, 470A, 470B) having
  a first input for receiving said first digital signal ($S_{MD}$, $S_{ENV}$) and
  a second input for receiving a signal indicative of a relevant variable speed of rotation ($f_{ROT}$) associated with said part;
  a third input for receiving a signal indicative of an output sample rate setting signal;
  said fractional decimator (470, 470A, 470B) being adapted to generate a second digital signal ($S_{RED}$) having a second reduced sampling frequency ($f_{SR2}$) such that the number of sample values per revolution of said rotating part is kept at a substantially constant value; said second decimator (470, 470A, 470B) generating said second digital signal ($S_{RED2}$) in response to
   said first digital signal ($S_{MD}$, $S_{ENV}$),
   said signal indicative of a relevant variable speed of rotation ($f_{ROT}$) and
   said signal indicative of an output sample rate setting signal; further comprising
 an evaluator (230) for performing a condition analysis function (F1, F2, Fn) for analysing the condition of the machine dependent on said second digital signal ($S_{RED2}$) having a reduced sampling frequency ($f_{SR1}$, $f_{SR2}$).

According to an advantageous embodiment of the apparatus said first sensor is a shock pulse sensor.

The invention also elates to a method of operating a finite impulse response filter having an input (480) for receiving detected input data values (S(j)) of a digital measurement data signal ($S_{MD}$) dependent on mechanical vibrations emanating from rotation of a shaft, said digital measurement data signal ($S_{MD}$) having a sampling frequency ($f_{SR1}$); and an input for receiving a signal indicative of a speed of rotation of a monitored rotating part at a time associated said detection of said input data values (S(j)); and a memory (604) adapted to receive and store said data values (S(j)) and information indicative of the corresponding speed of rotation ($f_{ROT}$); and a value generator (606) adapted to generate a fractional value (D); and; a plurality of FIR filter taps having individual filter values; the method comprising the step of interpolating a filter value.

BRIEF DESCRIPTION OF THE DRAWINGS

For simple understanding of the present invention, it will be described by means of examples and with reference to the accompanying drawings, of which.

DETAILED DESCRIPTION OF EMBODIMENTS

Figure 1:
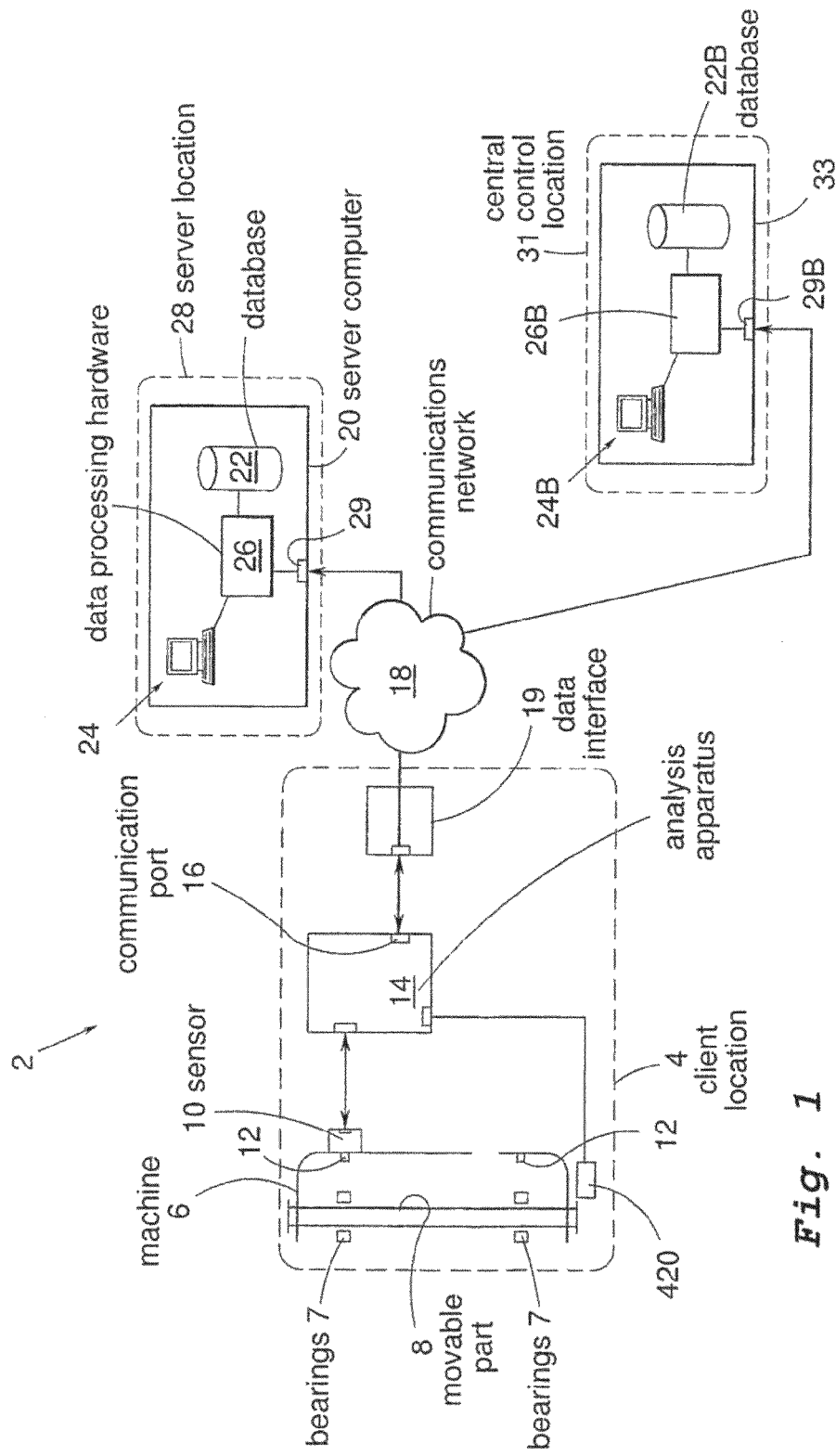
FIG. 1 shows a schematic block diagram of an embodiment of a condition analyzing system 2 according to an embodiment of the invention.

In the following description similar features in different embodiments may be indicated by the same reference numerals.

FIG. 1 shows a schematic block diagram of an embodiment of a condition analyzing system 2 according to an embodiment of the invention. Reference numeral 4 relates to a client location with a machine 6 having a movable part 8. The movable part may comprise bearings 7 and a shaft 8 which, when the machine is in operation, rotates. The operating condition of the shaft 8 or of a bearing 7 can be determined in response to vibrations emanating from the shaft and/or bearing when the shaft rotates. The client location 4, which may also be referred to as client part or user part, may for example be the premises of a wind farm, i.e. a group of wind turbines at a location, or the premises of a paper mill plant, or some other manufacturing plant having machines with movable parts.

An embodiment of the condition analyzing system 2 is operative when a sensor 10 is attached on or at a measuring point 12 on the body of the machine 6. Although FIG. 1 only illustrates two measuring points 12, it to be understood that a location 4 may comprise any number of measuring points 12. The condition analysis system 2 shown in FIG. 1, comprises an analysis apparatus 14 for analysing the condition of a machine on the basis of measurement values delivered by the sensor 10.

The analysis apparatus 14 has a communication port 16 for bi-directional data exchange. The communication port 16 is connectable to a communications network 18, e.g. via a data interface 19. The communications network 18 may be the world wide internet, also known as the Internet. The communications network 18 may also comprise a public switched telephone network.

A server computer 20 is connected to the communications network 18. The server 20 may comprise a database 22, user input/output interfaces 24 and data processing hardware 26, and a communications port 29. The server computer 20 is located on a location 28, which is geographically separate from the client location 4. The server location 28 may be in a first city, such as the Swedish capital Stockholm, and the client location may be in another city, such as Stuttgart, Germany or Detroit in Michigan, USA, Alternatively, the server location 28 may be in a first part of a town and the client location may be in another part of the same town. The server location 28 may also be referred to as supplier part 28, or supplier part location 28.

According to an embodiment of the invention a central control location 31 comprises a control computer 33 having data processing hardware and software for surveying a plurality of machines at the client location 4. The machines 6 may be wind turbines or gear boxes used in wind turbines. Alternatively the machines may include machinery in e.g. a paper mill. The control computer 33 may comprise a database 22B, user input/output interfaces 24B and data processing hardware 26B, and a communications port 29B. The central control location 31 may be separated from the client location 4 by a geographic distance. By means of communications port 29B the control computer 33 can be coupled to communicate with analysis apparatus 14 via port 16. The analysis apparatus 14 may deliver measurement data being partly processed so as to allow further signal processing and/or analysis to be performed at the central location 31 by control computer 33.

A supplier company occupies the supplier part location 28. The supplier company may sell and deliver analysis apparatuses 14 and/or software for use in an analysis apparatus 14. The supplier company may also sell and deliver analysis software for use in the control computer at the central control location 31. Such analysis software 94,105 is discussed in connection with FIG. 4 below. Such analysis software 94,105 may be delivered by transmission over said communications network 18.

According to one embodiment of the system 2 the apparatus 14 is a portable apparatus which may be connected to the communications network 18 from time to time.

According to another embodiment of the system 2 the apparatus 14 is connected to the communications network 18 substantially continuously. Hence, the apparatus 14 according to this embodiment may substantially always be "on line" available for communication with the supplier computer 20 and/or with the control computer 33 at control location 31.

Figure 2A:
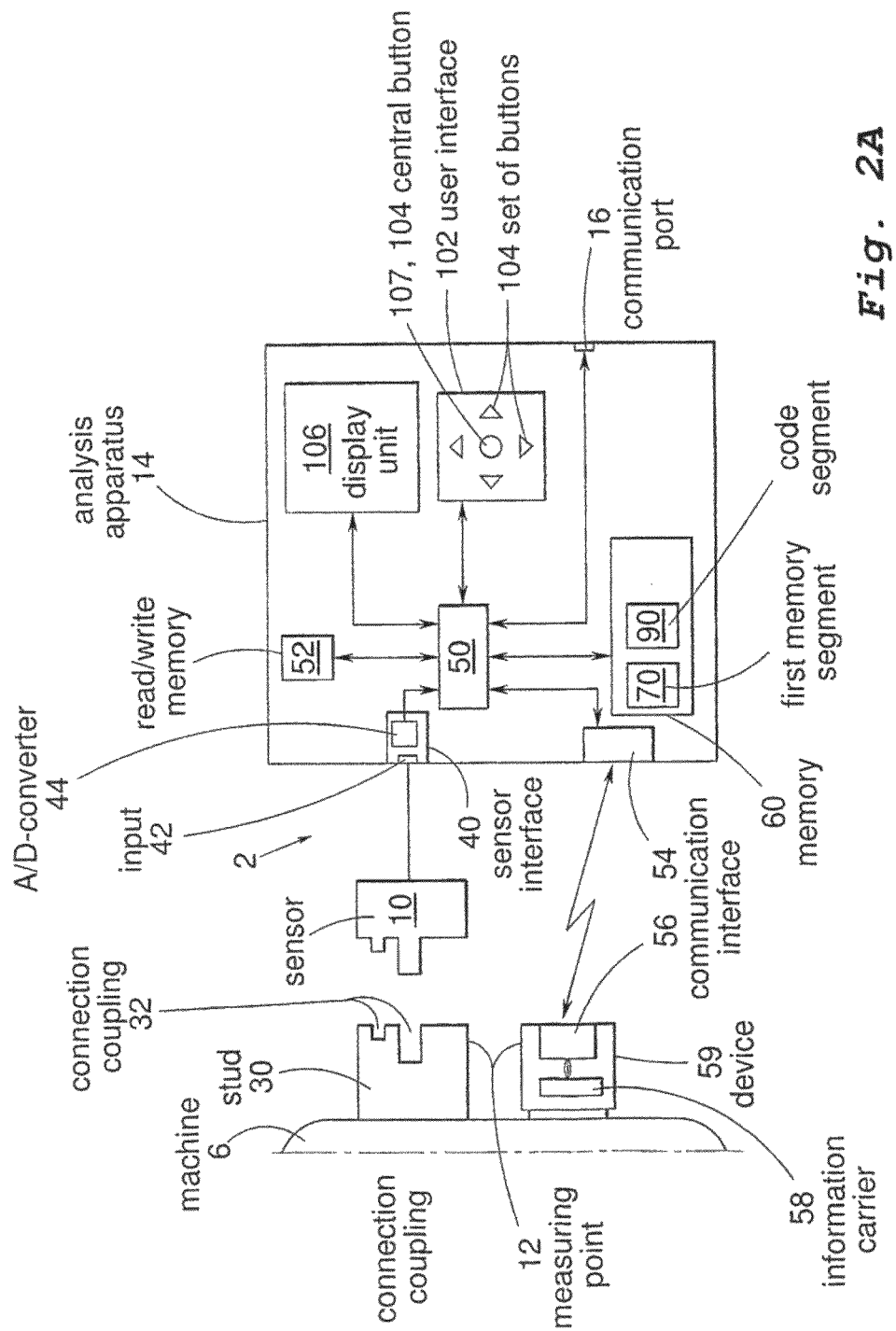
FIG. 2A is a schematic block diagram of an embodiment of a part of the condition analyzing system 2 shown in FIG. 1.

FIG. 2A is a schematic block diagram of an embodiment of a part of the condition analyzing system 2 shown in FIG. 1. The condition analyzing system, as illustrated in FIG. 2A, comprises a sensor unit 10 for producing a measured value. The measured value may be dependent on movement or, more precisely, dependent on vibrations or shock pulses caused by bearings when the shaft rotates.

An embodiment of the condition analyzing system 2 is operative when a device 30 is firmly mounted on or at a measuring point on a machine 6. The device 30 mounted at the measuring point may be referred to as a stud 30. A stud 30 can comprise a connection coupling 32 to which the sensor unit 10 is removably attachable. The connection coupling 32 can, for example comprise double start threads for enabling the sensor unit to be mechanically engaged with the stud by means of a ¼ turn rotation.

A measuring point 12 can comprise a threaded recess in the casing of the machine. A stud 30 may have a protruding part with threads corresponding to those of the recess for enabling the stud to be firmly attached to the measuring point by introduction into the recess like a bolt.

Alternatively, a measuring point can comprise a threaded recess in the casing of the machine, and the sensor unit 10 may comprise corresponding threads so that it can be directly introduced into the recess. Alternatively, the measuring point is marked on the casing of the machine only with a painted mark.

The machine 6 exemplified in FIG. 2A may have a rotating shaft with a certain shaft diameter d1. The shaft in the machine 24 may rotate with a speed of rotation V1 when the machine 6 is in use.

The sensor unit 10 may be coupled to the apparatus 14 for analysing the condition of a machine. With reference to FIG. 2A, the analysis apparatus 14 comprises a sensor interface 40 for receiving a measured signal or measurement data, produced by the sensor 10. The sensor interface 40 is coupled to a data processing means 50 capable of controlling the operation of the analysis apparatus 14 in accordance with program code. The data processing means 50 is also coupled to a memory 60 for storing said program code.

According to an embodiment of the invention the sensor interface 40 comprises an input 42 for receiving an analogue signal, the input 42 being connected to an analogue-to-digital (A/D) converter 44, the digital output 48 of which is coupled to the data processing means 50. The A/D converter 44 samples the received analogue signal with a certain sampling frequency $f_S$ so as to deliver a digital measurement data signal $S_{MD}$ having said certain sampling frequency $f_S$ and wherein the amplitude of each sample depends on the amplitude of the received analogue signal at the moment of sampling.

Figure 2B:
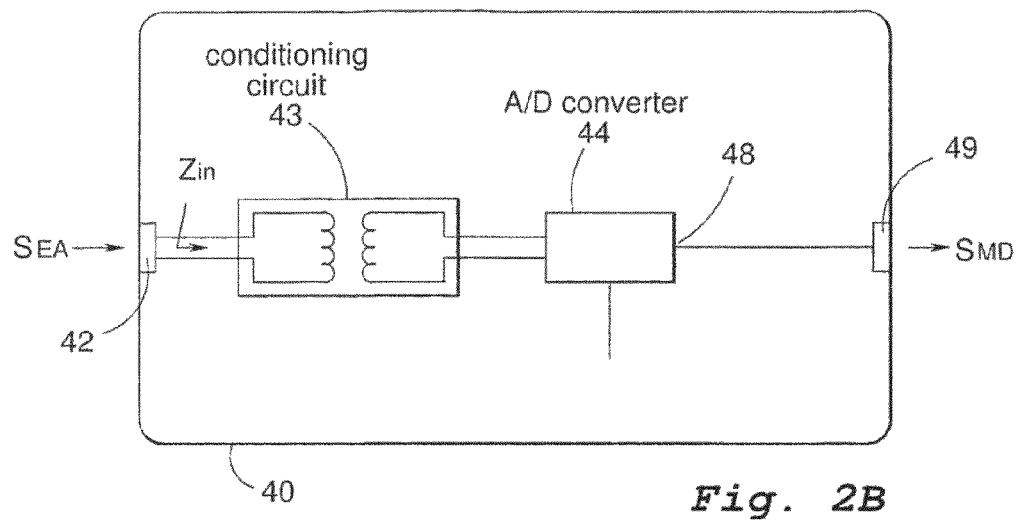
FIG. 2B is a schematic block diagram of an embodiment of a sensor interface.

According to another embodiment of the invention, illustrated in FIG. 2B, the sensor interface 40 comprises an input 42 for receiving an analogue signal $S_{EA}$ from a Shock Pulse Measurement Sensor, a conditioning circuit 43 coupled to receive the analogue signal, and an A/D converter 44 coupled to receive the conditioned analogue signal from the conditioning circuit 43. The A/D converter 44 samples the received conditioned analogue signal with a certain sampling frequency $f_S$ so as to deliver a digital measurement data signal $S_{MD}$ having said certain sampling frequency $f_S$ and wherein the amplitude of each sample depends on the amplitude of the received analogue signal at the moment of sampling.

The sampling theorem guarantees that bandlimited signals (i.e., signals which have a maximum frequency) can be reconstructed perfectly from their sampled version, if the sampling rate $f_S$ is more than twice the maximum frequency $f_{SEAmax}$ of the analogue signal $S_{EA}$ to be monitored. The frequency equal to one-half of the sampling rate is therefore a theoretical limit on the highest frequency that can be unambiguously represented by the sampled signal $S_{MD}$. This frequency (half the sampling rate) is called the Nyquist frequency of the sampling system. Frequencies above the Nyquist frequency $f_N$ can be observed in the sampled signal, but their frequency is ambiguous. That is, a frequency component with frequency f cannot be distinguished from other components with frequencies $B*f_N+f$, and $B*f_N-f$ for nonzero integers B. This ambiguity, known as aliasing may be handled by filtering the signal with an anti-aliasing filter (usually a low-pass filter with cutoff near the Nyquist frequency) before conversion to the sampled discrete representation.

In order to provide a safety margin for in terms of allowing a non-ideal filter to have a certain slope in the frequency response, the sampling frequency may be selected to a higher value than 2. Hence, according to embodiments of the invention the sampling frequency may be set to $$f_S = k * f_{SEAmax}$$

wherein k is a factor having a value higher than 2.0

Accordingly the factor k may be selected to a value higher than 2.0. Preferably factor k may be selected to a value between 2.0 and 2.9 in order to provide a good safety margin while avoiding to generate unnecessarily many sample values. According to an embodiment the factor k is advantageously selected such that 100*k/2 renders an integer. According to an embodiment the factor k may be set to 2.56. Selecting k to 2.56 renders 100*k=256=2 raised to 8.

According to an embodiment the sampling frequency $f_S$ of the digital measurement data signal $S_{MD}$ may be fixed to a certain value $f_S$, such as e.g. $f_S$=102 kHz Hence, when the sampling frequency $f_S$ is fixed to a certain value $f_S$, the maximum frequency $f_{SEAmax}$ of the analogue signal $S_{EA}$ will be:

$$f_{SEAmax} = f_S/k$$

wherein $f_{SEAmax}$ is the highest frequency to be analyzed in the sampled signal Hence, when the sampling frequency $f_S$ is fixed to a certain value $f_S$=102 400 Hz, and the factor k is set to 2.56, the maximum frequency $f_{SEAmax}$ of the analogue signal $S_{EA}$ will be:

$$f_{SEAmax} = f_S/k = 102\ 400/2.56 = 40\ kHz$$

Accordingly, a digital measurement data signal $S_{MD}$, having a certain sampling frequency $f_S$, is generated in response to said received analogue measurement signal $S_{EA}$. The digital output 48 of the A/D converter 44 is coupled to the data processing means 50 via an output 49 of the sensor interface 40 so as to deliver the digital measurement data signal $S_{MD}$ to the data processing means 50.

The sensor unit 10 may comprise a vibration transducer, the sensor unit being structured to physically engage the connection coupling of the measuring point so that vibrations of the machine at the measuring point are transferred to the vibration transducer. According to an embodiment of the invention the sensor unit comprises a transducer having a piezo-electric element. When the measuring point 12 vibrates, the sensor unit 10, or at least a part of it, also vibrates and the transducer then produces an electrical signal of which the frequency and amplitude depend on the mechanical vibration frequency and the vibration amplitude of the measuring point 12, respectively. According to an embodiment of the invention the sensor unit 10 is a vibration sensor, providing an analogue amplitude signal of e.g. 10 mV/g in the Frequency Range 1.00 to 10000 Hz. Such a vibration sensor is designed to deliver substantially the same amplitude of 10 mV irrespective of whether it is exerted to the acceleration of 1 g (9.82 m/s²) at 1 Hz, 3 Hz or 10 Hz. Hence, a typical vibration sensor has a linear response in a specified frequency range up to around 10 kHz. Mechanical vibrations in that frequency range emanating from rotating machine parts are usually caused by imbalance or misalignment. However, when mounted on a machine the linear response vibration sensor typically also has several different mechanical resonance frequencies dependent on the physical path between sensor and vibration source.

A damage in a roller bearing causes relatively sharp elastic waves, known as shock pulses, travelling along a physical path in the housing of a machine before reaching the sensor. Such shock pulses often have a broad frequency spectrum. The amplitude of a roller bearing shock pulse is typically lower than the amplitude of a vibration caused by imbalance or misalignment.

Figure 2C:
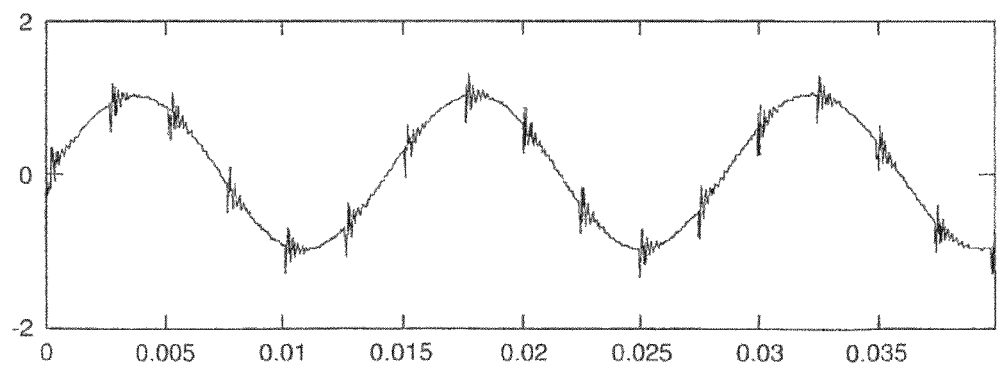
FIG. 2C is an illustration of a measuring signal from a vibration sensor.

The broad frequency spectrum of shock pulse signatures enables them to activate a "ringing response" or a resonance at a resonance frequency associated with the sensor. Hence, a typical measuring signal from a vibration sensor may have a wave form as shown in FIG. 2C, i.e. a dominant low frequency signal with a superimposed higher frequency lower amplitude resonant "ringing response".

In order to enable analysis of the shock pulse signature, often emanating from a bearing damage, the low frequency component must be filtered out. This can be achieved by means of a high pass filter or by means of a band pass filter. However, these filters must be adjusted such that the low frequency signal portion is blocked while the high frequency signal portion is passed on. An individual vibration sensor will typically have one resonance frequency associated with the physical path from one shock pulse signal source, and a different resonance frequency associated with the physical path from another shock pulse signal source, as mentioned in U.S. Pat. No. 6,053,047. Hence, filter adjustment aiming to pass high the frequency signal portion requires individual adaptation when a vibration sensor is used.

When such filter is correctly adjusted the resulting signal will consist of the shock pulse signature(s), However, the analysis of the shock pulse signature(s) emanating from a vibration sensor is somewhat impaired by the fact that the amplitude response as well as resonance frequency inherently varies dependent on the individual physical path from the shock pulse signal sources.

Advantageously, these drawbacks associated with vibration sensors may be alleviated by the use of a Shock Pulse Measurement sensor. The Shock Pulse Measurement sensor is designed and adapted to provide a pre-determined mechanical resonance frequency, as described in further detail below.

This feature of the Shock Pulse Measurement sensor advantageously renders repeatable measurement results in that the output signal from a Shock Pulse Measurement sensor has a stable resonance frequency substantially independent on the physical path between the irrespective between the shock pulse signal source and the shock pulse sensor. Moreover, mutually different individual shock pulse sensors provide a very small, if any, deviation in resonance frequency.

An advantageous effect of this is that signal processing is simplified, in that filters need not be individually adjusted, in contrast to the case described above when vibration sensors are used. Moreover, the amplitude response from shock pulse sensors is well defined such that an individual measurement provides reliable information when measurement is performed in accordance with appropriate measurement methods defined by S.P.M. Instrument AB.

Figure 2D:
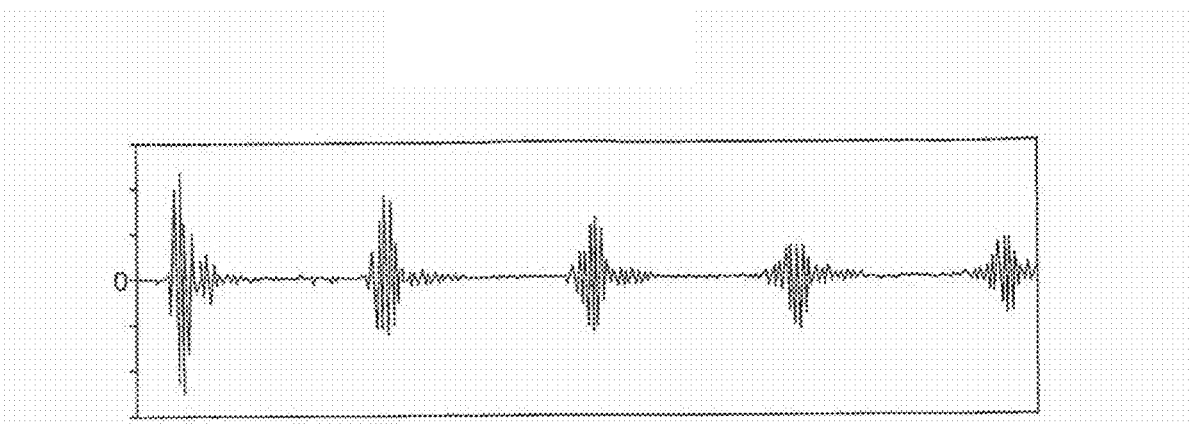
FIG. 2D illustrates a measuring signal amplitude generated by a shock pulse sensor.
Figure 2E:
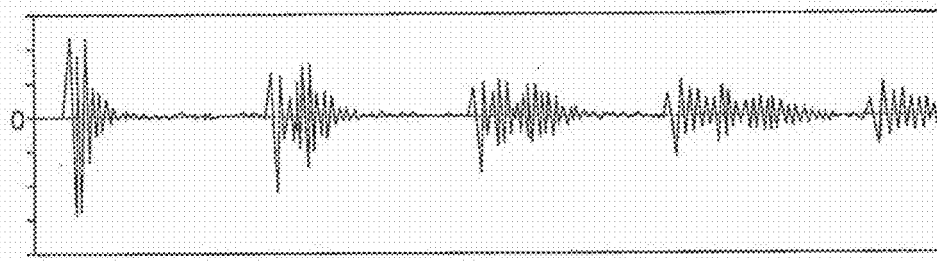
FIG. 2E illustrates a measuring signal amplitude generated by a vibration sensor.

FIG. 2D illustrates a measuring signal amplitude generated by a shock pulse sensor, and FIG. 2E illustrates a measuring signal amplitude generated by a vibration sensor. Both sensors have been exerted to the same series of mechanical shocks without the typical low frequency signal content. As clearly seen in FIGS. 2D and 2E, the duration of a resonance response to a shock pulse signature from the Shock Pulse Measurement sensor is shorter than the corresponding resonance response to a shock pulse signature from the vibration sensor. This feature of the Shock Pulse Measurement sensor of providing distinct shock pulse signature responses has the advantageous effect of providing a measurement signal from which it is possible to distinguish between different mechanical shock pulses that occur within a short time span.

Figure 3:
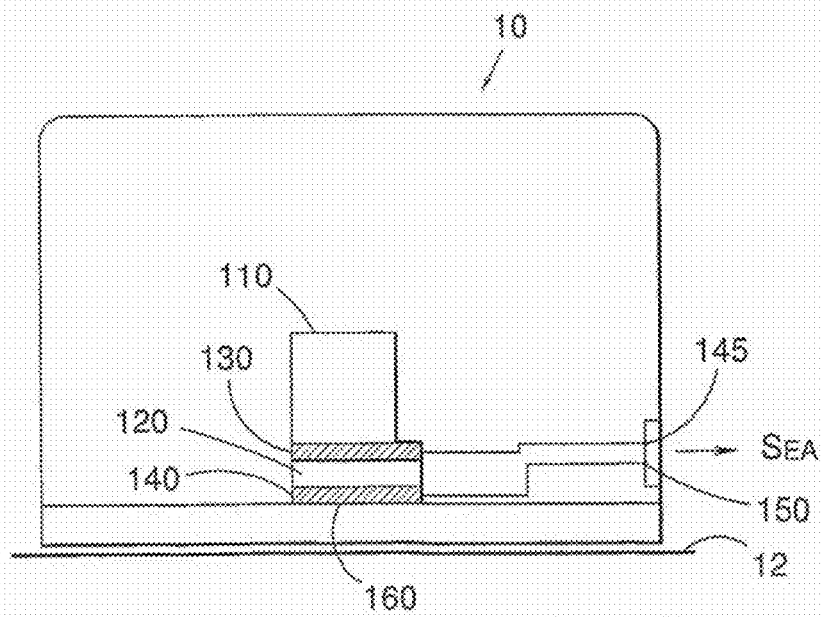
FIG. 3 is a simplified illustration of a Shock Pulse Measurement sensor according to an embodiment of the invention.

According to an embodiment of the invention the sensor is a Shock Pulse Measurement sensor. FIG. 3 is a simplified illustration of a Shock Pulse Measurement sensor 10 according to an embodiment of the invention. According to this embodiment the sensor comprises a part 110 having a certain mass or weight and a piezo-electrical element 120. The piezo-electrical element 120 is somewhat flexible so that it can contract and expand when exerted to external force. The piezo-electrical element 120 is provided with electrically conducting layers 130 and 140, respectively, on opposing surfaces. As the piezo-electrical element 120 contracts and expands it generates an electric signal which is picked up by the conducting layers 130 and 140. Accordingly, a mechanical vibration is transformed into an analogue electrical measurement signal $S_{EA}$, which is delivered on output terminals 145, 150. The piezo-electrical element 120 may be positioned between the weight 110 and a surface 160 which, during operation, is physically attached to the measuring point 12, as illustrated in FIG. 3.

The Shock Pulse Measurement sensor 10 has a resonance frequency that depends on the mechanical characteristics for the sensor, such as the mass m of weight part 110 and the resilience of piezo-electrical element 120. Hence, the piezo-electrical element has an elasticity and a spring constant k. The mechanical resonance frequency $f_{RM}$ for the sensor is therefore also dependent on the mass in and the spring constant k.

According to an embodiment of the invention the mechanical resonance frequency $f_{RM}$ for the sensor can be determined by the equation following equation:

$$f_{RM}=1/(2\pi)\sqrt{(k/m)} \qquad \text{(eq1)}$$

According to another embodiment the actual mechanical resonance frequency for a Shock Pulse Measurement sensor 10 may also depend on other factors, such as the nature of the attachment of the sensor 10 to the body of the machine 6.

The resonant Shock Pulse Measurement sensor 10 is thereby particularly sensitive to vibrations having a frequency on or near the mechanical resonance frequency $f_{RM}$. The Shock Pulse Measurement sensor 10 may be designed so that the mechanical resonance frequency $f_{RM}$ is somewhere in the range from 28 kHz to 37 kHz. According to another embodiment the mechanical resonance frequency $f_{RM}$ is somewhere in the range from 30 kHz to 35 kHz.

Accordingly the analogue electrical measurement signal has an electrical amplitude which may vary over the frequency spectrum. For the purpose of describing the theoretical background, it may be assumed that if the Shock Pulse Measurement sensor 10 were exerted to mechanical vibrations with identical amplitude in all frequencies from e.g. 1 Hz to e.g. 200 000 kHz, then the amplitude of the analogue signal $S_{EA}$ from the Shock Pulse Measurement Sensor will have a maximum at the mechanical resonance frequency $f_{RM}$ since the sensor will resonate when being "pushed" with that frequency.

With reference to FIG. 2B, the conditioning circuit 43 receives the analogue signal $S_{EA}$. The conditioning circuit 43 may be designed to be an impedance adaption circuit designed to adapt the input impedance of the A/D-converter as seen from the sensor terminals 145,150 so that an optimum signal transfer will occur. Hence, the conditioning circuit 43 may operate to adapt the input impedance $Z_{in}$ as seen from the sensor terminals 145,150 so that a maximum electric power is delivered to the A/D-converter 44. According to an embodiment of the conditioning circuit 43 the analogue signal $S_{EA}$ is fed to the primary winding of a transformer, and a conditioned analogue signal is delivered by a secondary winding of the transformer. The primary winding has n1 turns and the secondary winding has n2 turns, the ratio $n1/n2=n_{12}$. Hence, the A/D converter 44 is coupled to receive the conditioned analogue signal from the conditioning circuit 43. The A/D converter 44 has an input impedance $Z_{44}$, and the input impedance of the A/D-converter as seen from the sensor terminals 145,150 will be $(n1/n2)^2 * Z_{44}$ when the conditioning circuit 43 is coupled in between the sensor terminals 145,150 and the input terminals of the A/D converter 44.

The A/D converter 44 samples the received conditioned analogue signal with a certain sampling frequency $f_S$ so as to deliver a digital measurement data signal $S_{MD}$ having said certain sampling frequency $f_S$ and wherein the amplitude of each sample depends on the amplitude of the received analogue signal at the moment of sampling.

Figure 5:
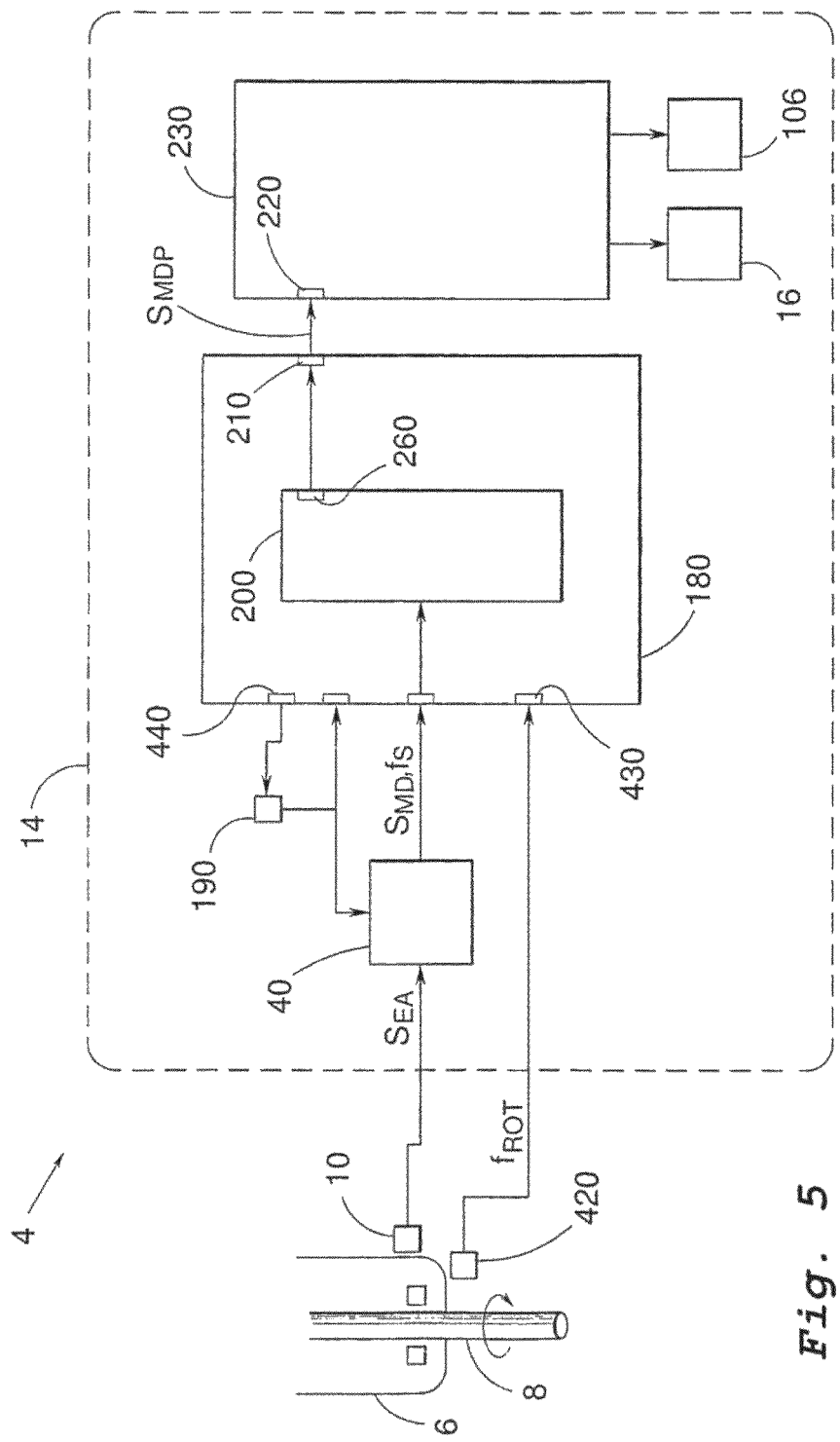
FIG. 5 is a schematic block diagram of an embodiment of the analysis apparatus at a client location with a machine 6 having a movable shaft.

According to embodiments of the invention the digital measurement data signal $S_{MD}$ is delivered to a means 180 for digital signal processing (See FIG. 5).

According to an embodiment of the invention the means 180 for digital signal processing comprises the data processor 50 and program code for causing the data processor 50 to perform digital signal processing. According to an embodiment of the invention the processor 50 is embodied by a Digital Signal Processor. The Digital Signal Processor may also be referred to as a DSP.

Figure 4:
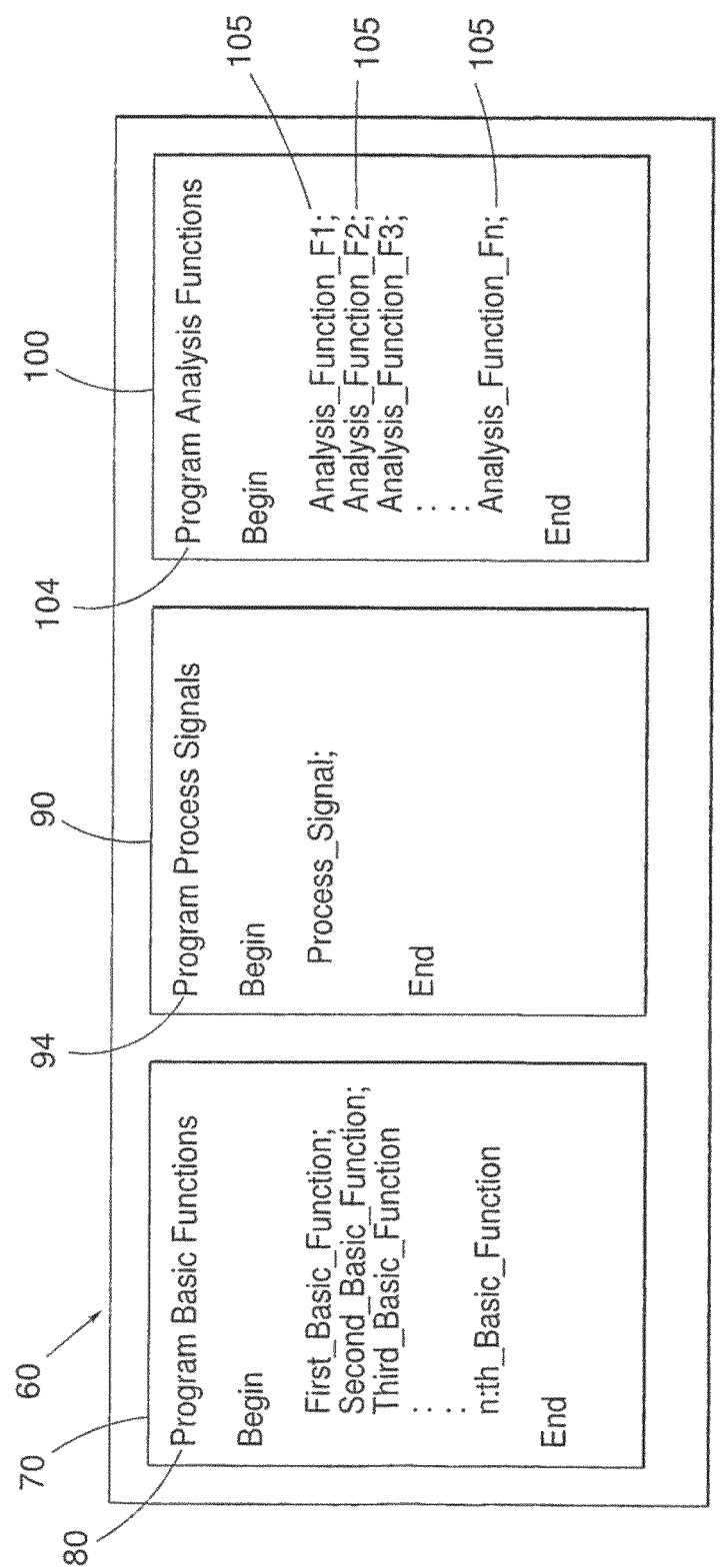
FIG. 4 is a simplified illustration of an embodiment of the memory 60 and its contents.

With reference to FIG. 2A, the data processing means 50 is coupled to a memory 60 for storing said program code. The program memory 60 is preferably a non-volatile memory. The memory 60 may be a read/write memory, i.e. enabling both reading data from the memory and writing new data onto the memory 60. According to an embodiment the program memory 60 is embodied by a FLASH memory. The program memory 60 may comprise a first memory segment 70 for storing a first set of program code 80 which is executable so as to control the analysis apparatus 14 to perform basic operations (FIG. 2A and FIG. 4). The program memory may also comprise a second memory segment 90 for storing a second set of program code 94. The second set of program code 94 in the second memory segment 90 may include program code for causing the analysis apparatus to process the detected signal, or signals, so as to generate a pre-processed signal or a set of pre-processed signals. The memory 60 may also include a third memory segment 100 for storing a third set of program code 104. The set of program code 104 in the third memory segment 100 may include program code for causing the analysis apparatus to perform a selected analysis function 105, When an analysis function is executed it may cause the analysis apparatus to present a corresponding analysis result on user interface 106 or to deliver the analysis result on port 16 (See FIG. 1 and FIG. 2A and FIGS. 7 and 8).

The data processing means 50 is also coupled to a read/write memory 52 for data storage. Moreover, the data processing means 50 may be coupled to an analysis apparatus communications interface 54. The analysis apparatus communications interface 54 provides for bi-directional communication with a measuring point communication interface 56 which is attachable on, at or in the vicinity of the measuring point on the machine.

The measuring point 12 may comprise a connection coupling 32, a readable and writeable information carrier 58, and a measuring point communication interface 56.

The writeable information carrier 58, and the measuring point communication interface 56 may be provided in a separate device 59 placed in the vicinity of the stud 30, as illustrated in FIG. 2. Alternatively the writeable information carrier 58, and the measuring point communication interface 56 may be provided within the stud 30. This is described in more detail in WO 98/01831, the content of which is hereby incorporated by reference.

The system 2 is arranged to allow bidirectional communication between the measuring point communication interface 56 and the analysis apparatus communication interface 54. The measuring point communication interface 56 and the analysis apparatus communication interface 54 are preferably constructed to allow wireless communication, According to an embodiment the measuring point communication interface and the analysis apparatus communication interface are constructed to communicate with one another by radio frequency (RE) signals. This embodiment includes an antenna in the measuring point communication interface 56 and another antenna the analysis apparatus communication interface 54.

FIG. 4 is a simplified illustration of an embodiment of the memory 60 and its contents. The simplified illustration is intended to convey understanding of the general idea of storing different program functions in memory 60, and it is not necessarily a correct technical teaching of the way in which a program would be stored in a real memory circuit. The first memory segment 70 stores program code for controlling the analysis apparatus 14 to perform basic operations. Although the simplified illustration of FIG. 4 shows pseudo code, it is to be understood that the program code 80 may be constituted by machine code, or any level program code that can be executed or interpreted by the data processing means 50 (FIG. 2A).

The second memory segment 90, illustrated in FIG. 4, stores a second set of program code 94. The program code 94 in segment 90, when run on the data processing means 50, will cause the analysis apparatus 14 to perform a function, such as a digital signal processing function. The function may comprise an advanced mathematical processing of the digital measurement data signal $S_{MD}$. According to embodiments of the invention the program code 94 is adapted to cause the processor means 50 to perform signal processing functions described in connection with FIGS. 5, 6, 9 and/or FIG. 16 in this document.

As mentioned above in connection with FIG. 1, a computer program for controlling the function of the analysis apparatus may be downloaded from the server computer 20. This means that the program-to-be-downloaded is transmitted to over the communications network 18. This can be done by modulating a carrier wave to carry the program over the communications network 18. Accordingly the downloaded program may be loaded into a digital memory, such as memory 60 (See FIGS. 2A and 4). Hence, a signal processing program 94 and or an analysis function program 104, 105 may be received via a communications port, such as port 16 (FIGS. 1 & 2A), so as to load it into memory 60. Similarly, a signal processing program 94 and or an analysis function program 104, 105 may be received via communications port 29B (FIG. 1), so as to load it into a program memory location in computer 26B or in database 22B.

An aspect of the invention relates to a computer program product, such as a program code means 94 and/or program code means 104, 105 loadable into a digital memory of an apparatus. The computer program product comprising software code portions for performing signal processing methods and/or analysis functions when said product is run on a data processing unit 50 of an apparatus for analysing the condition of a machine. The term "run on a data processing unit" means that the computer program plus the data processing unit carries out a method of the kind described in this document.

The wording "a computer program product, loadable into a digital memory of a condition analysing apparatus" means that a computer program can be introduced into a digital memory of a condition analysing apparatus so as achieve a condition analysing apparatus programmed to be capable of, or adapted to, carrying out a method of the kind described above. The term "loaded into a digital memory of a condition analysing apparatus" means that the condition analysing apparatus programmed in this way is capable of, or adapted to, carrying out a method of the kind described above.

The above mentioned computer program product may also be loadable onto a computer readable medium, such as a compact disc or DVD. Such a computer readable medium may be used for delivery of the program to a client.

According to an embodiment of the analysis apparatus 14 (FIG. 2A), it comprises a user input interface 102, whereby an operator may interact with the analysis apparatus 14. According to an embodiment the user input interface 102 comprises a set of buttons 104. An embodiment of the analysis apparatus 14 comprises a user output interface 106. The user output interface may comprise a display unit 106. The data processing means 50, when it runs a basic program function provided in the basic program code 80, provides for user interaction by means of the user input interface 102 and the display unit 106. The set of buttons 104 may be limited to a few buttons, such as for example five buttons, as illustrated in FIG. 2A. A central button 107 may be used for an ENTER or SELECT function, whereas other, more peripheral buttons may be used for moving a cursor on the display 106. In this manner it is to be understood that symbols and text may be entered into the apparatus 14 via the user interface. The display unit 106 may, for example, display a number of symbols, such as the letters of alphabet, while the cursor is movable on the display in response to user input so as to allow the user to input information.

FIG. 5 is a schematic block diagram of an embodiment of the analysis apparatus 14 at a client location 4 with a machine 6 having a movable shaft 8. The sensor 10, which may be a Shock Pulse Measurement Sensor, is shown attached to the body of the machine 6 so as to pick up mechanical vibrations and so as to deliver an analogue measurement signal $S_{EA}$ indicative of the detected mechanical vibrations to the sensor interface 40. The sensor interface 40 may be designed as described in connection with FIG. 2A or 2B. The sensor interface 40 delivers a digital measurement data signal $S_{MD}$ to a means 180 for digital signal processing.

The digital measurement data signal $S_{MD}$ has a sampling frequency $f_S$, and the amplitude value of each sample depends on the amplitude of the received analogue measurement signal $S_{EA}$ at the moment of sampling. According to an embodiment the sampling frequency $f_S$ of the digital measurement data signal Sun may be fixed to a certain value $f_S$, such as e.g. $f_S=102$ kHz. The sampling frequency $f_S$ may be controlled by a clock signal delivered by a clock 190, as illustrated in FIG. 5. The clock signal may also be delivered to the means 180 for digital signal processing. The means 180 for digital signal processing can produce information about the temporal duration of the received digital measurement data signal $S_{MD}$ in response to the received digital measurement data signal $S_{MD}$, the clock signal and the relation between the sampling frequency $f_S$ and the clock signal, since the duration between two consecutive sample values equals $T_S=1/f_S$.

According to embodiments of the invention the means 180 for digital signal processing includes a pre-processor 200 for performing a pre-processing of the digital measurement data signal $S_{MD}$ so as to deliver a pre-processed digital signal $S_{MDP}$ on an output 210. The output 210 is coupled to an input 220 of an evaluator 230. The evaluator 230 is adapted to evaluate the pre-processed digital signal $S_{MDP}$ so as to deliver a result of the evaluation to a user interface 106. Alternatively the result of the evaluation may be delivered to a communication port 16 so as to enable the transmission of the result e.g. to a control computer 33 at a control site 31 (See FIG. 1).

According to an embodiment of the invention, the functions described in connection with the functional blocks in means 180 for digital signal processing, pre-processor 200 and evaluator 230 may be embodied by computer program code 94 and/or 104 as described in connection with memory blocks 90 and 100 in connection with FIG. 4 above.

A user may require only a few basic monitoring functions for detection of whether the condition of a machine is normal or abnormal. On detecting an abnormal condition, the user may call for specialized professional maintenance personnel to establish the exact nature of the problem, and for performing the necessary maintenance work. The professional maintenance personnel frequently needs and uses a broad range of evaluation functions making it possible to establish the nature of, and/or cause for, an abnormal machine condition. Hence, different users of an analysis apparatus 14 may pose very different demands on the function of the apparatus. The term Condition Monitoring function is used in this document for a function for detection of whether the condition of a machine is normal or somewhat deteriorated or abnormal. The term Condition Monitoring function also comprises an evaluation function making it possible to establish the nature of, and/or cause for, an abnormal machine condition.

Examples of Machine Condition Monitoring Functions

The condition monitoring functions F1, F2 ... Fn includes functions such as: vibration analysis, temperature analysis, shock pulse measuring, spectrum analysis of shock pulse measurement data, Fast Fourier Transformation of vibration measurement data, graphical presentation of condition data on a user interface, storage of condition data in a writeable information carrier on said machine, storage of condition data in a writeable information carrier in said apparatus, tachometering, imbalance detection, and misalignment detection.

According to an embodiment the apparatus 14 includes the following functions:
F1=vibration analysis;
F2=temperature analysis,
F3=shock pulse measuring,
F4=spectrum analysis of shock pulse measurement data,
F5=Fast Fourier Transformation of vibration measurement data,
F6=graphical presentation of condition data on a user interface,
F7=storage of condition data in a writeable information carrier on said machine,
F8=storage of condition data in a writeable information carrier 52 in said apparatus,
F9=tachometering,
F10=imbalance detection, and
F11=misalignment detection.

F12=Retrieval of condition data from a writeable information carrier 58 on said machine.

F13=Performing vibration analysis function F1 and performing function F12 "Retrieval of condition data from a writeable information carrier 58 on said machine" so as to enable a comparison or trending based on current vibration measurement data and historical vibration measurement data.

F14=Performing temperature analysis F2; and performing function "Retrieval of condition data from a writeable information carrier 58 on said machine" so as to enable a comparison or trending based on current temperature measurement data and historical temperature measurement data.

F15=Retrieval of identification data from a writeable information carrier 58 on said machine.

Embodiments of the function F7 "storage of condition data in a writeabie information carrier on said machine", and F13 vibration analysis and retrieval of condition data is described in more detail in WO 98/01831, the content of which is hereby incorporated by reference.

Figure 6:
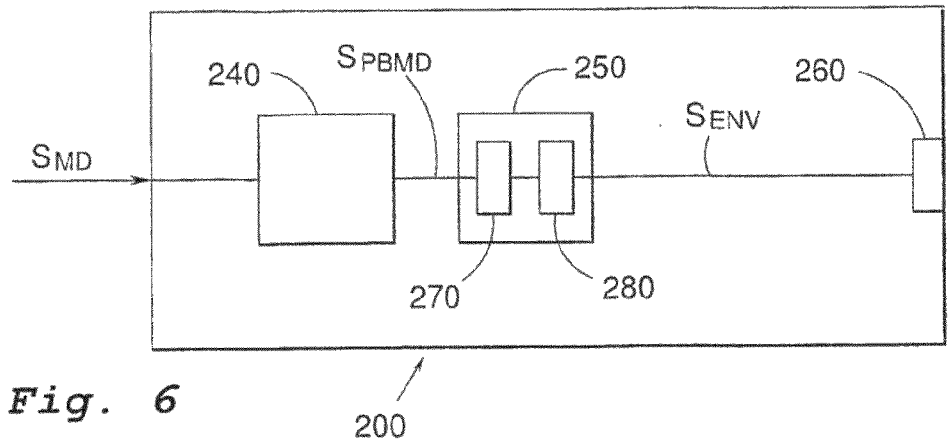
FIG. 6 illustrates a schematic block diagram of an embodiment of the pre-processor according to an embodiment of the present invention.

FIG. 6 illustrates a schematic block diagram of an embodiment of the pre-processor 200 according to an embodiment of the present invention. In this embodiment the digital measurement data signal $S_{MD}$ is coupled to a digital band pass filter 240 having a lower cutoff frequency $f_{LC}$, an upper cutoff frequency $f_{UC}$ and passband bandwidth between the upper and lower cutoff frequencies.

The output from the digital band pass filter 240 is connected to a digital enveloper 250, According to an embodiment of the invention the signal output from the enveloper 250 is delivered to an output 260. The output 260 of the pre-processor 200 is coupled to output 210 of digital signal processing means 180 for delivery to the input 220 of evaluator 230.

The upper and lower cutoff frequencies of the digital band pass filter 240 may selected so that the frequency components of the signal $S_{MD}$ at the resonance frequency $f_{RM}$ for the sensor are in the passband bandwidth. As mentioned above, an amplification of the mechanical vibration is achieved by the sensor being mechanically resonant at the resonance frequency $f_{RM}$. Accordingly the analogue measurement signal $S_{EA}$ reflects an amplified value of the vibrations at and around the resonance frequency $f_{RM}$. Hence, the band pass filter according to the FIG. 6 embodiment advantageously suppresses the signal at frequencies below and above resonance frequency $f_{RM}$, so as to further enhance the components of the measurement signal at the resonance frequency $f_{RM}$. Moreover, the digital band pass filter 240 advantageously further reduces noise inherently included in the measurement signal, since any noise components below the lower cutoff frequency $f_{LC}$, and above upper cutoff frequency $f_{UC}$ are also eliminated or reduced. Hence, when using a resonant Shock Pulse Measurement sensor 10 having a mechanical resonance frequency $f_{RM}$ in a range from a lowest resonance frequency value $f_{RML}$ to a highest resonance frequency value $f_{RMU}$ the digital band pass filter 240 may be designed to having a lower cutoff frequency $f_{LC}=f_{RML}$, and an upper cutoff frequency $f_{UC}=f_{RMU}$. According to an embodiment the lower cutoff frequency $f_{LC}=f_{RML}=28$ kHz, and the upper cutoff frequency $f_{UC}=f_{RMU}=37$ kHz.

According to another embodiment the mechanical resonance frequency $f_{RM}$ is somewhere in the range from 30 kHz to 35 kHz, and the digital band pass filter 240 may then be designed to having a lower cutoff frequency $f_{LC}=30$ kHz and an upper cutoff frequency $f_{UC}=35$ kHz.

According to another embodiment the digital band pass filter 240 may be designed to have a lower cutoff frequency $f_{LC}$ being lower than the lowest resonance frequency value $f_{RM}$, and an upper cutoff frequency $f_{UC}$ being higher than the highest resonance frequency value $f_{RMU}$. For example the mechanical resonance frequency $f_{RM}$ may be a frequency in the range from 30 kHz to 35 kHz, and the digital band pass filter 240 may then be designed to having a lower cutoff frequency $f_{LC}$=17 kHz, and an upper cutoff frequency $f_{UC}$=36 kHz.

Accordingly, the digital band pass filter 240 delivers a passband digital measurement data signal $S_F$ having an advantageously low noise content and reflecting mechanical vibrations in the passband. The passband digital measurement data signal $S_F$ is delivered to enveloper 250.

The digital enveloper 250 accordingly receives the passband digital measurement data signal $S_F$ which may reflect a signal having positive as well as negative amplitudes. With reference to FIG. 6, the received signal is rectified by a digital rectifier 270, and the rectified signal may be filtered by an optional low pass filter 280 so as to produce a digital envelop signal $S_{ENV}$.

Accordingly, the signal $S_{ENV}$ is a digital representation of an envelope signal being produced in response to the filtered measurement data signal $S_F$. According to some embodiments of the invention the optional low pass filter 280 may be eliminated, One such embodiment is discussed in connection with FIG. 9 below. Accordingly, the optional low pass filter 280 in enveloper 250 may be eliminated when decimator 310, discussed in connection with FIG. 9 below, includes a low pass filter function.

According to the FIG. 6 embodiment of the invention the signal $S_{ENV}$ is delivered to the output 260 of pre-processor 200. Hence, according to an embodiment of the invention the pre-processed digital signal $S_{MDP}$ delivered on the output 210 (FIG. 5) is the digital envelop signal $S_{ENV}$.

Whereas prior art analogue devices for generating an envelop signal in response to a measurement signal employs an analogue rectifier which inherently leads to a biasing error being introduced in the resulting signal, the digital enveloper 250 will advantageously produce a true rectification without any biasing errors. Accordingly, the digital envelop signal $S_{ENV}$ will have a good Signal-to-Noise Ratio, since the sensor being mechanically resonant at the resonance frequency in the passband of the digital band pass filter 240 leads to a high signal amplitude and the signal processing being performed in the digital domain eliminates addition of noise and eliminates addition of biasing errors.

With reference to FIG. 5 the pre-processed digital signal $S_{MDP}$ is delivered to input 220 of the evaluator 230.

According to another embodiment, the filter 240 is a high pass filter having a cut-off frequency $f_{LC}$. This embodiment simplifies the design by replacing the band-pass filter with a high-pass filter 240, thereby leaving the low pass filtering to another low pass filter downstream, such as the low pass filter 280. The cut-off frequency $f_{LC}$ of the high pass filter 240 is selected to approximately the value of the lowest expected mechanical resonance frequency value $f_{RMU}$ of the resonant Shock Pulse Measurement sensor 10. When the mechanical resonance frequency $f_{RM}$ is somewhere in the range from 30 kHz to 35 kHz, the high pass filter 240 may be designed to having a lower cutoff frequency $f_{LC}$=30 kHz. The high-pass filtered signal is then passed to the rectifier 270 and on to the low pass filter 280.

According to an embodiment it should be possible to use sensors 10 having a resonance frequency somewhere in the range from 20 kHz to 35 kHz. In order to achieve this, the high pass filter 240 may be designed to having a lower cutoff frequency $f_{LC}$=20 kHz.

Figure 7:
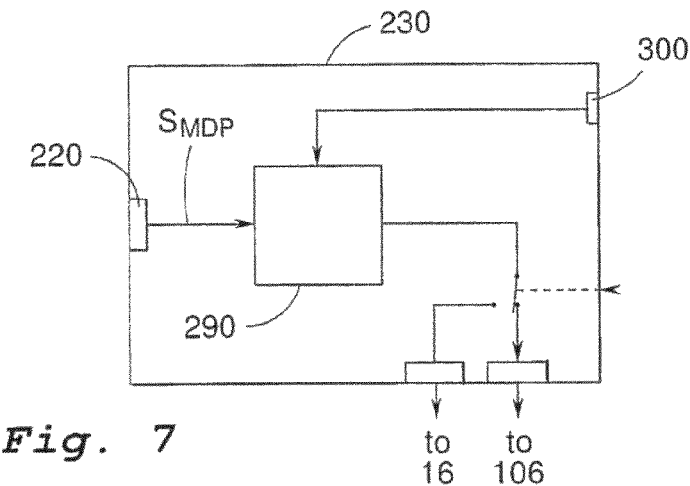
FIG. 7 illustrates an embodiment of the evaluator 230.

FIG. 7 illustrates an embodiment of the evaluator 230 (See also FIG. 5). The FIG. 7 embodiment of the evaluator 230 includes a condition analyser 290 adapted to receive a pre-processed digital signal $S_{MDP}$ indicative of the condition of the machine 6. The condition analyser 290 can be controlled to perform a selected condition analysis function by means of a selection signal delivered on a control input 300. The selection signal delivered on control input 300 may be generated by means of user interaction with the user interface 102 (See FIG. 2A). When the selected analysis function includes Fast Fourier Transform, the analyzer 290 will be set by the selection signal 300 to operate on an input signal in the frequency domain.

Dependent on what type of analysis to be performed the condition analyser 290 may operate on an input pre-processed digital signal $S_{MDP}$ in the time domain, or on an input pre-processed digital signal $S_{MDP}$ in the frequency domain. Accordingly, dependent on the selection signal delivered on control input 300, the FFT 294 may be included as shown in FIG. 8, or the signal $S_{MDP}$ may be delivered directly to the analyser 290 as illustrated in FIG. 7.

Figure 8:
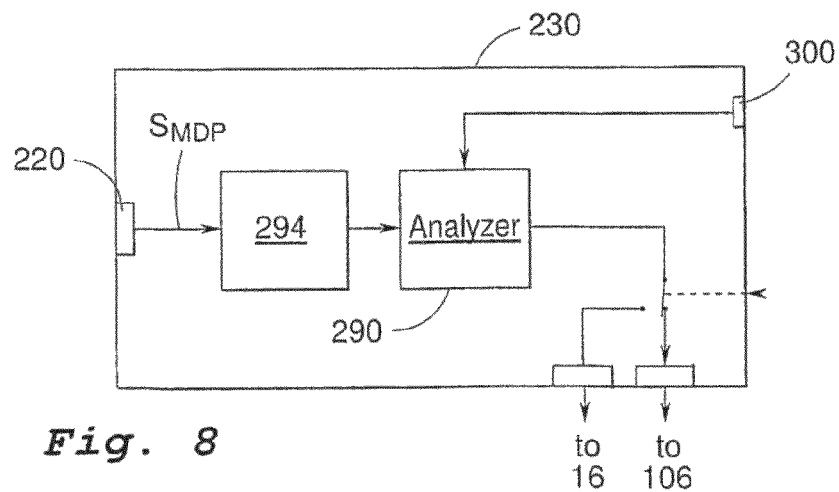
FIG. 8 illustrates another embodiment of the evaluator 230.

FIG. 8 illustrates another embodiment of the evaluator 230. In the FIG. 8 embodiment the evaluator 230 includes an optional Fast Fourier Transformer 294 coupled to receive the signal from input 220 of the evaluator 230. The output from the FFTransformer 294 may be delivered to analyser 290.

In order to analyze the condition of a rotating part it is desired to monitor the detected vibrations for a sufficiently long time to be able to detect repetitive signals. Certain repetitive signal signatures are indicative of a deteriorated condition of the rotating part. An analysis of a repetitive signal signature may also be indicative of the type of deteriorated condition. Such an analysis may also result in detection of the degree of deteriorated condition.

Hence, the measurement signal may include at least one vibration signal component $S_D$ dependent on a vibration movement of the rotationally movable part 8; wherein said vibration signal component has a repetition frequency $f_D$ which depends on the speed of rotation $f_{ROT}$ of the rotationally movable part 8. The vibration signal component which is dependent on the vibration movement of the rotationally movable part 8 may therefore be indicative of a deteriorated condition or a damage of the monitored machine. In fact, a relation between repetition frequency $f_D$ of the vibration signal component $S_D$ and the speed of rotation $f_{ROT}$ of the rotationally movable part 8 may be indicative of which mechanical part it is that has a damage, Hence, in a machine having a plurality of rotating parts it may be possible to identify an individual slightly damaged part by means of processing the measurement signal using an analysis function 105, including a frequency analysis.

Such a frequency analysis may include fast fourier transformation of the measurement signal including vibration signal component $S_D$. The fast fourier transformation (FFT), uses a certain frequency resolution. That certain frequency resolution, which may be expressed in terms of frequency bins, determines the limit for discerning different frequencies. The term "frequency bins" is sometimes referred to as "lines". If a frequency resolution providing Z frequency bins up to the shaft speed is desired, then it is necessary to record the signal during X revolutions of the shaft.

In connection with the analysis of rotation parts it may be interesting to analyse signal frequencies that are higher than the rotation frequency $f_{ROT}$ of the rotating part. The rotating part may include a shaft and bearings. The shaft rotation frequency $f_{ROT}$ is often referred to as "order 1". The interesting bearing signals may occur about ten times per shaft revolution (Order 10), i.e. a damage repetition frequency $f_D$ (measured in Hz) divided by rotational speed $f_{ROT}$ (measured in rps) equals 10 Hz/rps, i.e. order $y=f_D/f_{ROT}=10$ Hz/rps. Moreover, it may be interesting to analyse overtones of the bearing signals, so it may be interesting to measure up to order 100. Referring to a maximum order as Y, and the total number of frequency bins in the FFT to be used as Z, the following applies: Z=X*Y. Conversely, X=Z/Y, wherein X is the number of revolutions of the monitored shaft during which the digital signal is analysed; and Y is a maximum order; and Z is the frequency resolution expressed as a number of frequency bins Consider a case when the decimated digital measurement signal $S_{MDP}$ (See FIG. 5) is delivered to the FFT analyzer 294, as described in FIG. 8: In such a case, when the FFT analyzer 294 is set for Z=1600 frequency bins, and the user is interested in analysing frequencies up to order Y=100, then the value for X becomes X=Z/Y=1600/100=16.

Hence, it is necessary to measure during X=16 shaft revolutions when Z=1600 frequency bins is desired and the user is interested in analysing frequencies up to order Y=100.

The frequency resolution Z of the FFT analyzer 294 may be settable using the user interface 102, 106 (FIG. 2A).

Hence, the frequency resolution value Z for the condition analysis function 105 and/or signal processing function 94 (FIG. 4) may be settable using the user interface 102, 106 (FIG. 2A).

According to an embodiment of the invention, the frequency resolution Z is settable by selecting one value Z from a group of values. The group of selectable values for the frequency resolution Z may include

Z=400
Z=800
Z:=1600
Z=3200
Z=6400

As mentioned above, the sampling frequency $f_S$ may be fixed to a certain value such as e.g $f_S$=102 400 kHz, and the factor k may be set to 2.56, thereby rendering the maximum frequency to be analyzed $f_{SEAmax}$ to be:

$$f_{SEAmax}=f_S/k=102\ 400/2.56=40\ kHz$$

For a machine having a shaft with rotational speed $f_{ROT}$=1715 rpm=28.58 rps, a selected order value Y=100 renders a maximum frequency to be analyzed to be $$f_{ROT}*Y=28.58\ rps*100=2858\ Hz.$$

The FFTransformer 294 may be adapted to perform Fast Fourier Transform on a received input signal having a certain number of sample values. It is advantageous when the certain number of sample values is set to an even integer which may be divided by two (2) without rendering a fractional number.

Accordingly, a data signal representing mechanical vibrations emanating from rotation of a shaft may include repetitive signal patterns. A certain signal pattern may thus be repeated a certain number of times per revolution of the shaft being monitored. Moreover, repetitive signals may occur with mutually different repetition frequency.

In the book "Machinery Vibration Measurements and Analysis" by Victor Wowk (ISBN 0-07-071936-5), there is provided a couple of examples of mutually different repetition frequencies on page 149:

"Fundamental train frequency (FTF)
Ball spin (BS) frequency
Outer Race (OR)
Inner Race (IR)" The book also provides formulas for calculating these specific frequencies on page 150. The content of the book "Machinery Vibration Measurements and Analysis" by Victor Wowk, is hereby incorporated by reference. In particular the above mentioned formulas for calculating these specific frequencies are hereby incorporated by reference. A table on page 151 of the same book indicates that these frequencies also vary dependent on bearing manufacturer, and that FTF may have a bearing frequency factor of 0.378;
BS may have a bearing frequency factor of 1.928;
OR may have a bearing frequency factor of 3.024; and
IR may have a bearing frequency factor of 4.976

The frequency factor is multiplied with the rotational speed of the shaft to obtain the repetition frequency. The book indicates that for a shaft having a rotational speed of 1715 rpm, i.e. 28.58 Hz, the repetition frequency for a pulse emanating from the Outer Race (OR) of a bearing of standard type 6311 may be about 86 Hz.; and the FTF repetition frequency may be 10.8 Hz.

When the monitored shaft rotates at a constant rotational speed such a repetition frequency may be discussed either in terms of repetition per time unit or in terms of repetition per revolution of the shaft being monitored, without distinguishing between the two. However, if the machine part rotates at a variable rotational speed the matter is further complicated, as discussed below in connection with FIGS. 16, 17 and 20.

Machinery Presenting Sudden Damages

Some types of machinery may suffer complete machine failure or breakdown very abruptly. For some machine types, such as rotating parts in a wind power station, breakdown has been known to occur suddenly and as a complete surprise to the maintenance personnel and to the machine owner. Such sudden breakdown causes a lot of costs to the machine owner and may cause other negative side effects e.g. if machine parts fall off as a result of unexpected mechanical failure.

The inventor realized that there is a particularly high noise level in the mechanical vibrations of certain machinery, and that such noise levels hamper the detection of machine damages. Hence, for some types of machinery, conventional methods for preventive condition monitoring have failed to provide sufficiently early and/or reliable warning of oncoming deteriorating conditions. The inventor concluded that there may exist a mechanical vibration $V_{MD}$ indicative of a deteriorated condition in such machinery, but that conventional methods for measuring vibrations may hitherto have been inadequate.

The inventor also realized that machines having slowly rotating parts were among the types of machinery that seem to be particularly prone to sudden failure.

Having realized that a particularly high noise level in the mechanical vibrations of certain machinery hampers the detection of machine damages, the inventor came up with a method for enabling detection of weak mechanical signals in a noisy environment. As mentioned above, the repetition frequency $f_D$ of vibration signal component $S_D$ in measuring signal $S_{EA}$ depends on a mechanical vibration $V_{MD}$ which is indicative of an incipient damage of a rotational part 8 of the monitored machine 6. The inventor realized that it may be possible to detect an incipient damage, i.e. a damage that is just starting to develop, if a corresponding weak signal can be discerned.

Hence, the measurement signal may include at least one vibration signal component $S_D$ dependent on a vibration movement of the rotationally movable part 8; wherein said vibration signal component has a repetition frequency $f_D$ which depends on the speed of rotation $f_{ROT}$ of the rotationally movable part 8. The existence of a vibration signal component which is dependent on the vibration movement of the rotationally movable part 8 may therefore provide an early indication of a deteriorating condition or an incipient damage of the monitored machine.

In a wind turbine application the shaft whose bearing is analyzed may rotate at a speed of less than 120 revolutions per minute, i.e. the shaft rotational frequency $f_{ROT}$ is less than 2 revolutions per second (rps). Sometimes such a shaft to be analyzed rotates at a speed of less than 50 revolutions per minute (rpm), i.e. a shaft rotational frequency $f_{ROT}$ of less than 0.83 rps. In fact the speed of rotation may typically be less than 15 rpm. Whereas a shaft having a rotational speed of 1715 rpm, as discussed in the above mentioned book, produces 500 revolutions in just 17.5 seconds; a shaft rotating at 50 revolutions per minute takes ten minutes to produce 500 revolutions. Certain large wind power stations have shafts that may typically rotate at 12 RPM=0.2 rps.

Accordingly, when a bearing to be analyzed is associated with a slowly rotating shaft, and the bearing is monitored by a detector generating an analogue measurement signal $S_{EA}$ which is sampled using a sampling frequency $f_S$ of about 100 Khz, the number of sampled values associated with one full revolution of the shaft becomes very large. As an illustrative example, it takes 60 million (60 000 000) sample values at a sampling frequency of 100 kHz to describe 500 revolutions when the shaft rotates at 50 rpm.

Moreover, performing advanced mathematical analysis of the signal requires a lot of time when the signal includes so many samples. Accordingly it is desired to reduce the number of samples per second before further processing of the signal $S_{ENV}$.

Figure 9:
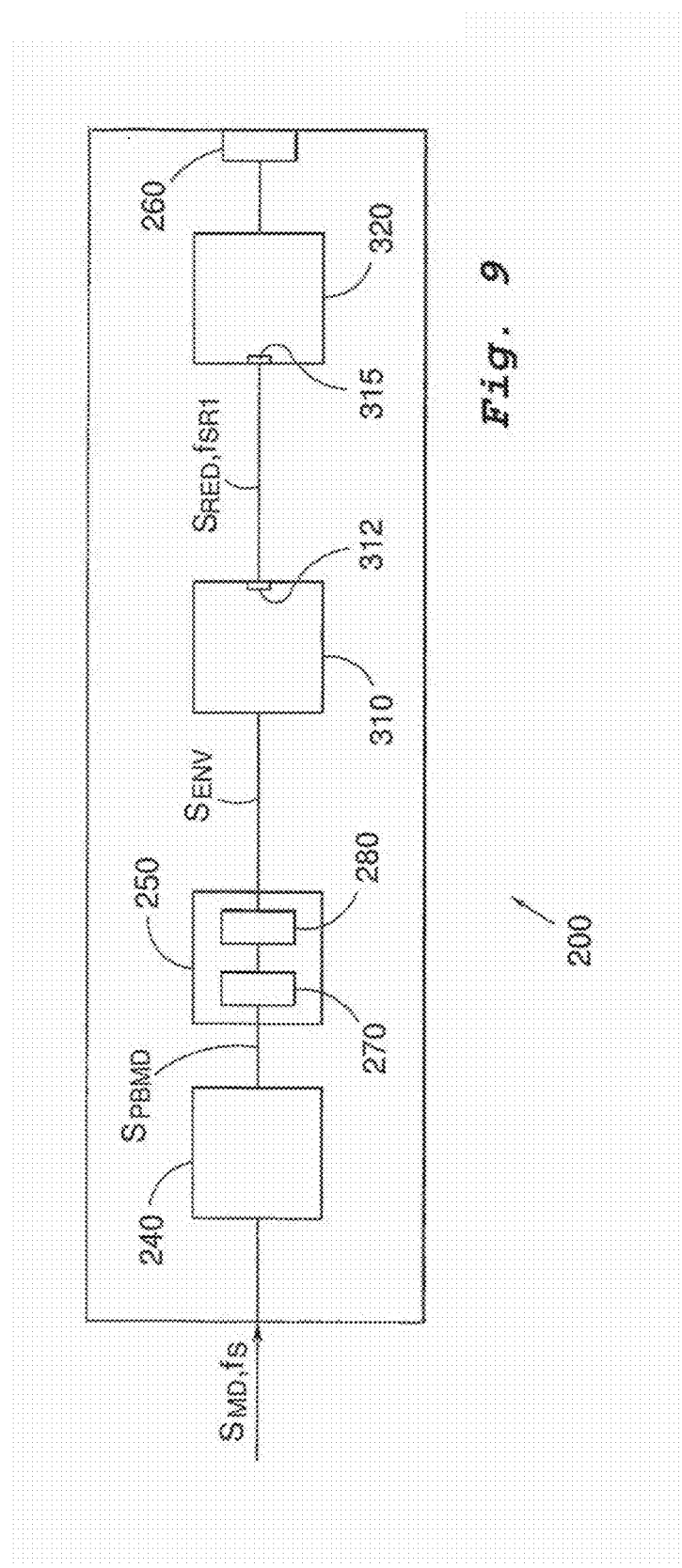
FIG. 9 illustrates another embodiment of the pre-processor 200.

FIG. 9 illustrates another embodiment of the pre-processor 200, The FIG. 9 embodiment of the pre-processor 200 includes a digital band pass filter 240 and a digital enveloper 250 as described above in connection with FIG. 6. As mentioned above, the signal $S_{ENV}$ is a digital representation of an enveloped signal which is produced in response to the filtered measurement data signal $S_F$.

According to the FIG. 9 embodiment of the pre-processor 200, the digital enveloped signal $S_{ENV}$ is delivered to a decimator 310 adapted to produce a digital signal $S_{RED}$ having a reduced sampling frequency $f_{SR1}$. The decimator 310 operates to produce an output digital signal wherein the temporal duration between two consecutive sample values is longer than the temporal duration between two consecutive sample values in the input signal. The decimator is described in more detail in connection with FIG. 14, below. According to an embodiment of the invention the optional low pass filter 280 may be eliminated, as mentioned above. When, in the FIG. 9 embodiment, the signal produced by the digital rectifier 270 is delivered to decimator 310, which includes low pass filtering, the low pass filter 280 may be eliminated.

An output 312 of the decimator 310 delivers the digital signal $S_{RED}$ to an input 315 of an enhancer 320. The enhancer 320 is capable of receiving the digital signal $S_{RED}$ and in response thereto generating an output signal $S_{MDP}$. The output signal $S_{MDP}$ is delivered to output port 260 of pre-processor 200.

Figure 10A:
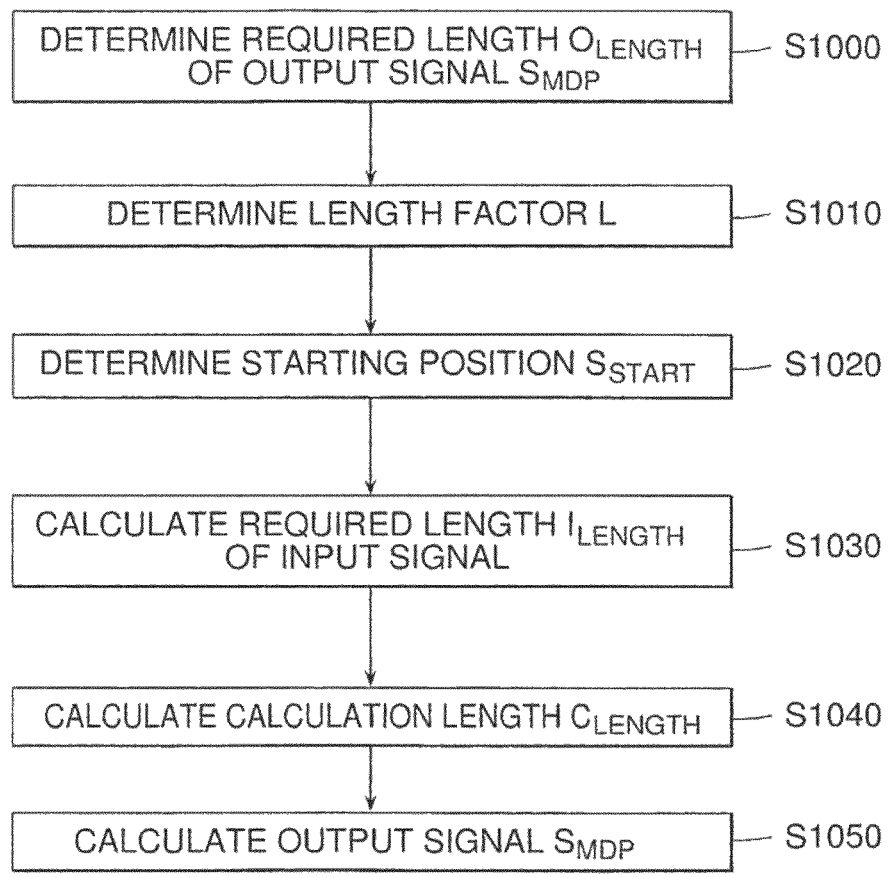
FIG. 10A is a flow chart that illustrates embodiments of a method for enhancing repetitive signal patterns in signals.

FIG. 10A is a flow chart that illustrates embodiments of a method for enhancing repetitive signal patterns in signals. This method may advantageously be used for enhancing repetitive signal patterns in signals representing the condition of a machine having a rotating shaft. An enhancer 320 may be designed to operate according to the method illustrated by FIG. 10A.

Method steps S1000 to S1040 in FIG. 10A represent preparatory actions to be taken in order to make settings before actually generating the output signal values. Once, the preparatory actions have been executed, the output signal values may be calculated, as described with reference to step S 1050.

Figure 10B:
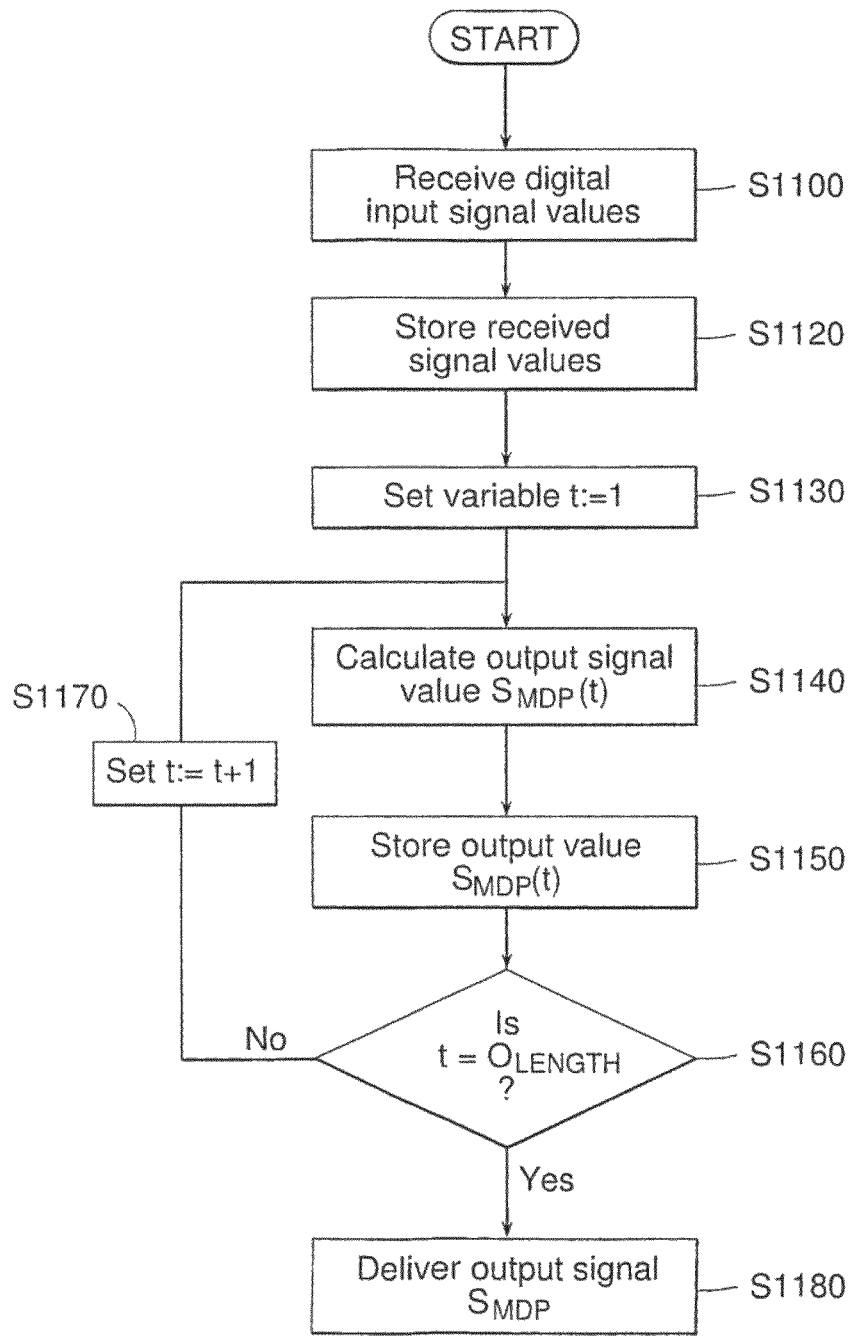
FIG. 10B is a flow chart illustrating a method of generating a digital output signal.

FIG. 10B is a flow chart illustrating a method of generating a digital output signal.

More particularly, FIG. 10B illustrates an embodiment of a method to generate a digital output signal when preparatory actions described with reference to steps S1000 to S1040 in FIG. 10A have been performed.

With reference to step S1000 in FIG. 10A, a desired length $O_{LENGTH}$ of an output signal $S_{MDP}$ is determined.

Figure 11:
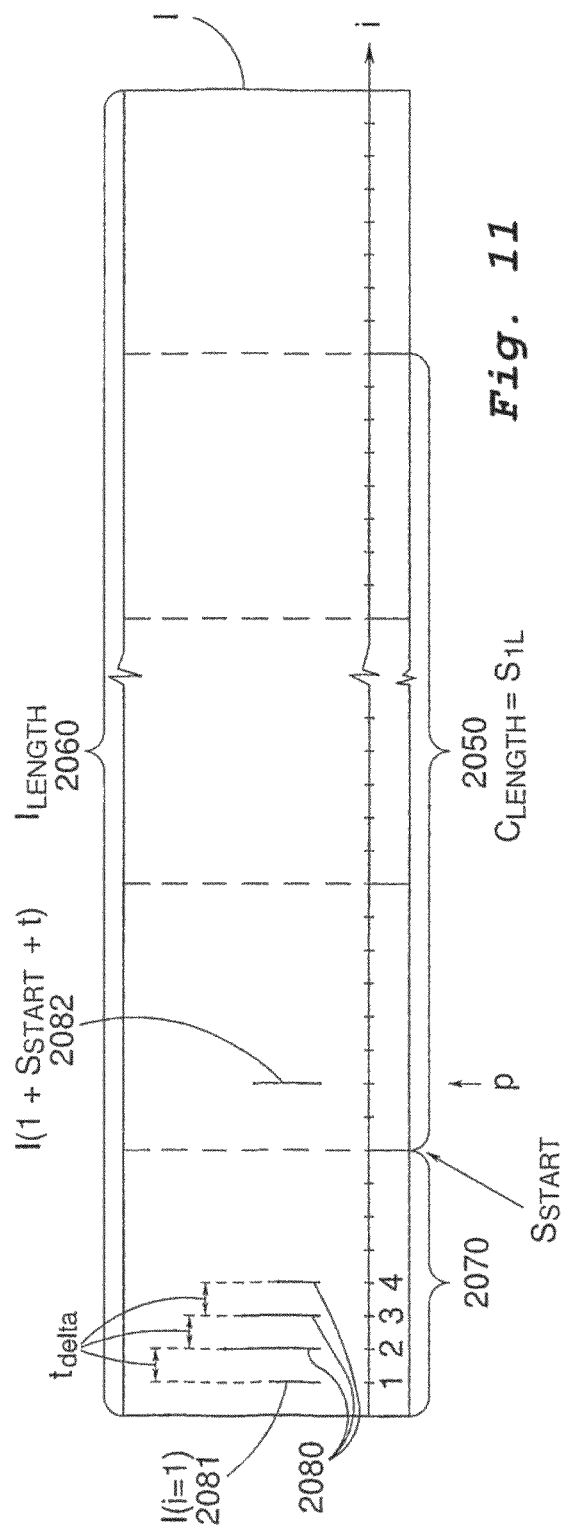
FIG. 11 is a schematic illustration of a first memory having plural memory positions

FIG. 11 is a schematic illustration of a first memory having plural memory positions i. The memory positions i of the first memory hold an example input signal I comprising a sequence of digital values. The example input signal is used for calculating the output signal $S_{MDP}$ according to embodiments of the invention. FIG. 11 shows some of many consecutive digital values for the input signal I. The digital values 2080 in the input signal I only illustrate a few of the digital values that are present in the input signal. In FIG. 11 two neighbouring digital values in the input signal are separated by a duration $t_{delta}$. The value $t_{delta}$ is the inverse of a sampling frequency $f_{SR}$ of the input signal received by the enhancer 320 (See FIG. 9 & FIG. 16).

Figure 12:
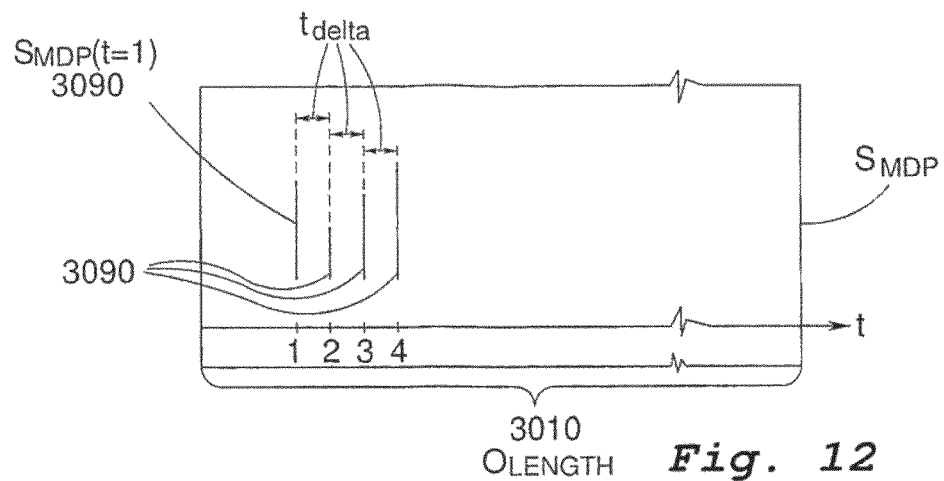
FIG. 12 is a schematic illustration of a second memory having plural memory positions t.

FIG. 12 is a schematic illustration of a second memory having plural memory positions t. The memory positions t of the second memory hold an example output signal $S_{MDP}$ comprising a sequence of digital values. Hence, FIG. 12 illustrates a portion of a memory having digital values 3090 stored in consecutive memory positions. FIG. 12 shows consecutive digital values for the output signal Suva. The digital values 3090 in the output signal $S_{MDP}$ only illustrate a few of the digital values that are present in the output signal. In FIG. 12 two neighbouring digital values in the output signal may be temporally separated by the duration $t_{delta}$.

With reference to step S1000 in FIG. 10, the desired length $O_{LENGTH}$ 3010 of the output signal $S_{MDP}$ may be chosen so that it is possible to use the output signal $S_{MDP}$ for analysing certain frequencies in the output signal. If for instance lower frequencies are of interest a longer output signal is required than if higher frequencies are of interest. The lowest frequency that can be analysed using the output signal is $1/(O_{LENGTH} * t_{delta})$, where $O_{LENGTH}$ is the number of sample values in the output signal. If $f_{SR}$ is the sampling rate of the input signal I, then the time $t_{delta}$ between each digital sample value will be $1/f_{SR}$. As mentioned above, repetitive signal patterns may occur in a data signal representing mechanical vibrations. Accordingly, a measurement signal, such as signal $S_{ENV}$ delivered by the enveloper 250 and signal $S_{RED}$ delivered to enhancer 320 may include at least one vibration signal component $S_D$ dependent on a vibration movement of the rotationally movable part 8; wherein said vibration signal component $S_D$ has a repetition frequency $f_D$ which depends on the speed of rotation $f_{ROT}$ of the rotationally movable part 8. Hence, in order to be certain to detect the occurrence of a repetitive signal pattern having a repetition frequency $f_{REP}=f_D=1/(O_{LENGTH}*t_{delta})$ the output signal $S_{MDP}$ must include at least $O_{LENGTH}$ digital values, when consecutive digital values in the output signal $S_{MDP}$ are separated by the duration $t_{delta}$.

According to an embodiment, the user may input a value representing a lowest repetition frequency $f_{REPmin}$ to be detected as well as information about a lowest expected speed of rotation of the shaft to be monitored. The analysis system 2 (FIG. 1) includes functionality for calculating a suitable value for the variable $O_{LENGTH}$ in response to these values.

Alternatively, with reference to FIG. 2A, a user of an analysis apparatus 14 may set the value $O_{LENGTH}$ 3010 of the output signal $S_{MDP}$ by means of inputting a corresponding value via the user interface 102.

In a next step S1010 a length factor L is chosen. The length factor L determines how well stochastic signals are suppressed in the output signal $S_{MDP}$. A higher value of L gives less stochastic signals in the output signal $S_{MDP}$ than a lower value of L. Hence, the length factor L may be referred to as a Signal-Noise Ratio improver value. According to one embodiment of the method L is an integer between 1 and 10, but L can also be set to other values. According to an embodiment of the method, the value L can be preset in the enhancer 320. According to another embodiment of the method the value L is inputted by a user of the method through the user interface 102 (FIG. 2A). The value of the factor L also has an impact on calculation time required to calculate the output signal. A larger value of L requires longer calculation time than a lower value of L.

Next, in a step S1020, a starting position $S_{START}$ is set. The starting position $S_{START}$ is a position in the input signal I.

The starting position $S_{START}$ is set to avoid or reduce the occurrence of non-repetitive patterns in the output signal $S_{MDP}$. When the starting position $S_{START}$ is set so that a part 2070 of the input signal before the starting position has a length which corresponds to a certain time interval $T_{STOCHASTIC\_MAX}$ then stochastic signals with the a corresponding frequency $f_{STOCHASTIC\_MAX}$ and higher frequencies will be attenuated in the output signal O, $S_{MDP}$.

In a next step S1030 the required length of the input data signal is calculated. The required length of the input data signal is calculated in the step S1030 according to formula (1) below:

$$I_{LENGTH}=O_{LENGTH}*L+S_{START}+O_{LENGTH} \quad (1)$$

Next, in a step S1040, a length $C_{LENGTH}$ in the input data signal is calculated. The length $C_{LENGTH}$ is the length over which the calculation of the output data signal is performed. This length $C_{LENGTH}$ is calculated according to formula (3) below.

$$C_{LENGTH}=I_{LENGTH}-S_{START}-O_{LENGTH} \quad (3)$$

Formula (3) can also be written as $I_{LENGTH}=C_{LENGTH}+S_{START}-O_{LENGTH}$

The output signal is then calculated in a step S1050. The output signal is calculated according to formula (5) below. In formula (5) a value for the output signal is calculated for a time value t in the output signal.

$$S_{MDP}(t) = \sum_{i=1}^{i=CLENGTH} I(i)*I(i+Sstart+t) \quad (5)$$

where $1 \leq t \leq O_{LENGTH}$

The output signal $S_{MDP}$ has a length $O_{LENGTH}$, as mentioned above. To acquire the entire output signal $S_{MDP}$ a value for each time value from t=1 to t=$O_{LENGTH}$ has to be calculated with formula (5). In FIG. 11 a digital value 2081 illustrates one digital value that is used in the calculation of the output signal. The digital value 2081 illustrates one digital value that is used in the calculation of the output signal where i=1 The digital value 2082 illustrates another digital value that is used in the calculation of the output signal. Reference numeral 2082 refers to the digital value $I(1+S_{START}+t)$ in formula (5) above, when i=1 and t=1. Hence, reference numeral 2082 illustrates the digital sample value at position number P in the input signal:

$$P=1+S_{START}+1=S_{START}+2.$$

In FIG. 12, reference numeral 3091 refers to the digital sample value $S_{MDP}(t)$ in the output signal where t=1.

Another embodiment of the method for operating the enhancer 320 for enhancing repetitive patterns in signals representing the condition of a machine having a rotating shaft will now be described, According to an embodiment the length $O_{LENGTH}$ may be preset in the enhancer 320. According to other embodiments of the method the length $O_{LENGTH}$ may be set by user input through the user interface 102 (FIG. 2A). According to a preferred embodiment of the method the variable $O_{LENGTH}$ is set to an even integer which may be divided by two (2) without rendering a fractional number. Selecting the variable $O_{LENGTH}$ according to this rule advantageously adapts the number of samples in the output signal so that it is suitable for use in the optional Fast Fourier Transformer 294. Hence, according to embodiments of the method the variable $O_{LENGTH}$ may preferably be set to a number such as e.g. 1024, 2048, 4096.

In a particularly advantageous embodiment the value $S_{START}$ is set, in step S1020, so that the part 2070 of the input signal before the starting position has the same length as the output signal 3040, i.e. $S_{START}=O_{LENGTH}$.

As mentioned in connection with equation (1) above, the required length of the input data signal is $$I_{LENGTH}=O_{LENGTH}*L+S_{START}+O_{LENGTH}$$

Hence, setting $S_{START}=O_{LENGTH}$ in eq (1) renders $$I_{LENGTH}=O_{LENGTH}*L+O_{LENGTH}+$$
$$O_{LENGTH}=O_{LENGTH}*L+O_{LENGTH}*2$$

Accordingly, the required length of the input signal can be expressed in terms of the length of the output signal according to equation (6) below.

$$I_{LENGTH}=(L+2)*O_{LENGTH} \quad (6)$$

where L is the length factor discussed above, and $O_{LENGTH}$ is the number of digital values in the output signal, as discussed above.

The length $C_{LENGTH}$ can be calculated, in this embodiment of the invention, according to formula (7) below.

$$C_{LENGTH}=L*O_{LENGTH} \quad (7)$$

When the preparatory actions described with reference to steps S1000 to S1040 in FIG. 10A have been performed, the digital output signal may be generated by means of a method as described with reference to FIG. 10B. According to an embodiment of the invention, the method described with reference to FIG. 10B is performed by means of a DSP 50 (FIG. 2A).

Figure 16:
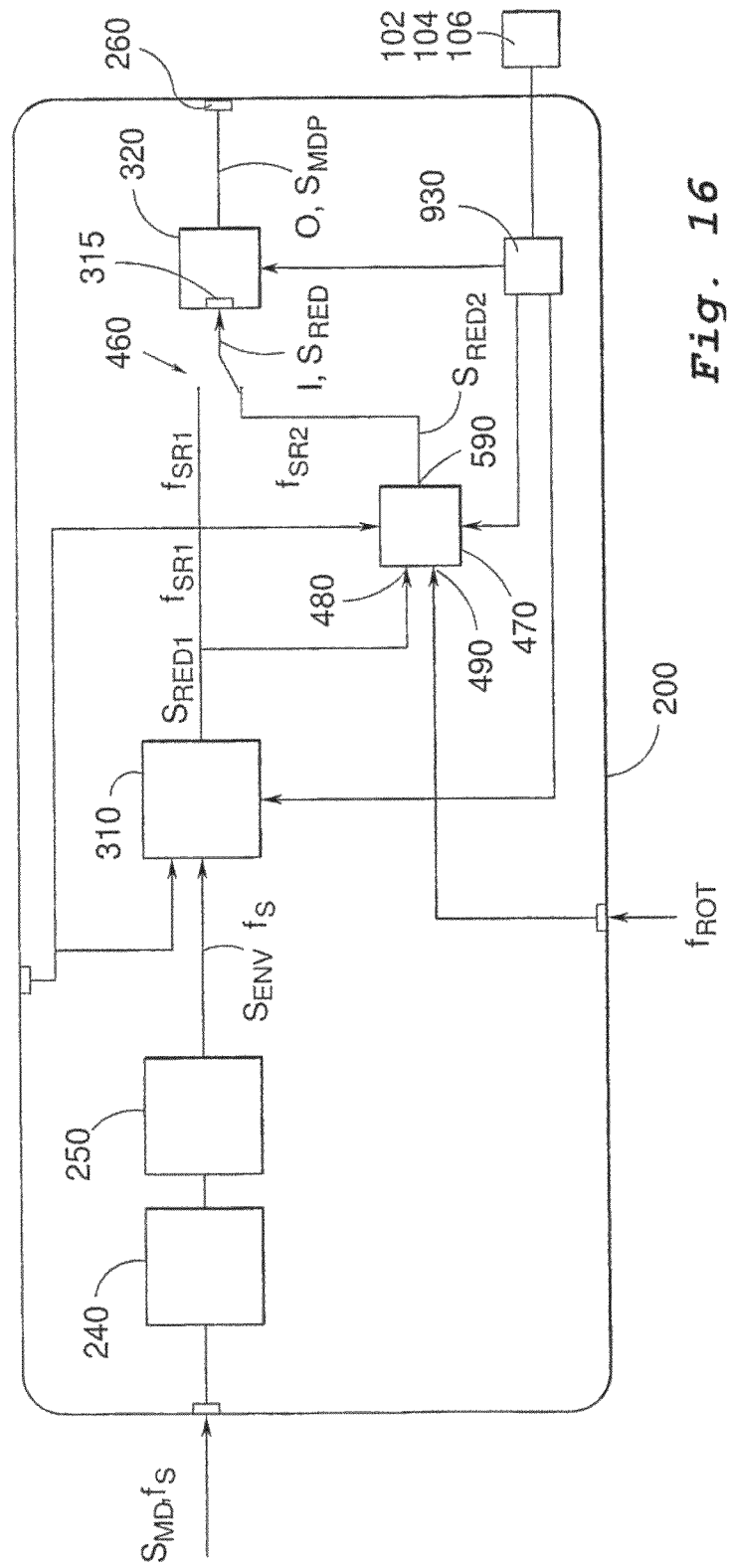
FIG. 16 illustrates an embodiment of the invention including a decimator and an enhancer, as described above, and a fractional decimator.

In a step S1100 (FIG. 10B) the enhancer 320 receives a digital input signal I having a first plurality $I_{LENGTH}$ of sample values on an input 315 (See FIG. 9 and/or FIG. 16). As noted above the digital input signal I may represent mechanical vibrations emanating from rotation of a shaft so far as to cause occurrence of a vibration having a period of repetition $T_R$.

The received signal values are stored (Step S1120) in an input signal storage portion of a data memory associated with the enhancer 320. According to an embodiment of the invention the data memory may be embodied by the read/write memory 52 (FIG. 2A).

In a step S1130 the variable t, used in equation (5) above, is set to an initial value. The initial value may be 1 (one).

In step S1140 an output sample value $S_{MDP}(t)$ is calculated for sample number t. The calculation may employ the below equation:

$$S_{MDP}(t) = \sum_{i=1}^{i=CLENGTH} I(i) * I(i + Sstart + t)$$

The resulting sample value $S_{MDP}(t)$ is stored (Step S1150, FIG. 10B) in an output signal storage portion of the memory 52 (See FIG. 12).

In a step S1160 the process checks the value of variable t, and if the value of t represents a number lower than the desired number of output sample values $O_{LENGTH}$ a step S1160 is performed for increasing the value of variable t, before repeating steps S1140, S1150 and S1160.

If in step S1160, the value of t represents a number equal to the desired number of output sample values $O_{LENGTH}$ a step S1180 is performed.

In step S1180 the output signal O, $S_{MDP}$ is delivered on output 260 (See FIG. 9 and/or FIG. 16).

As mentioned above, a data signal representing mechanical vibrations emanating from rotation of a shaft may include repetitive signal signatures, and a certain signal signature may thus be repeated a certain number of times per revolution of the shaft being monitored. Moreover, several mutually different repetitive signal signatures may occur, wherein the mutually different repetitive signal signatures may have mutually different repetition frequency. The method for enhancing repetitive signal signatures in signals, as described above, advantageously enables simultaneous detection of many repetitive signal signatures having mutually different repetition frequency. This advantageously enables the simultaneous detection of e.g a Bearing Inner Race damage signature and a Bearing Outer Race damage signature in a single measuring and analysis session, as described below.

Figure 13:
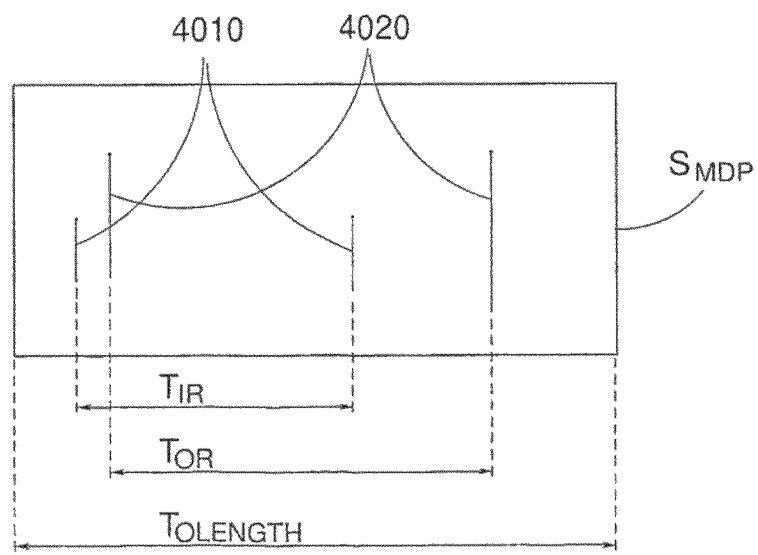
FIG. 13 is a schematic illustration of an example output signal $S_{MDP}$ comprising two repetitive signals signatures.

FIG. 13 is a schematic illustration of an example output signal $S_{MDP}$ comprising two repetitive signals signatures 4010 and 4020. The output signal $S_{MDP}$ may comprise more repetitive signals signatures than the ones illustrated in FIG. 13, but for illustrative purpose only two repetitive signal signatures are shown. Only some of many digital values for the repetitive signals signatures 4010 and 4020 are shown in FIG. 13.

In FIG. 13 the Outer Race (OR) frequency signal 4020 and the Inner Race (IR) frequency signal 4010 are illustrated. As can be seen in FIG. 13 the Outer Race (OR) frequency signal 4020 has a lower frequency than the Inner Race (IR) frequency signal 4010. The repetition frequency for the Outer Race (OR) frequency signal 4020 and the Inner Race (IR) frequency signal 4010 is $1/T_{OR}$ respectively $1/T_{IR}$.

In the above described embodiments of the method of operating the enhancer 320 for enhancing repetitive signal patterns the repetitive signal patterns are amplified when calculating the output signal in step S1050. A higher amplification of the repetitive signal patterns is achieved if the factor L is given a higher value,
in step S1010, than if L is given a lower value. A higher value of L means that a longer input signal $I_{LENGTH}$ is required in step S1030. A longer input signal $I_{LENGTH}$ therefore results in a higher amplification of the repetitive signal patterns in the output signal. Hence, a longer input signal $I_{LENGTH}$ renders the effect of better attenuation of stochastic signals in relation to the repetitive signal patterns in the output signal.

According to an embodiment of the invention the integer value
$I_{LENGTH}$ may be selected in response to a desired amount of attenuation of stochastic signals. In such an embodiment the length factor L may be determined in dependence on the selected integer value $I_{LENGTH}$.

Now consider an exemplary embodiment of the method for operating the enhancer 320 for enhancing repetitive signal patterns where the method is used for amplification of a repetitive signal pattern with a certain lowest frequency. In order to be able to analyse the repetitive signal pattern with the certain lowest frequency a certain length of the output signal is required.

As mentioned above, using a longer input data signal in the calculation of the output signal results in that the repetitive signal pattern is amplified more than if a shorter input data signal is used. If a certain amplification of the repetitive signal pattern is required it is therefore possible to use a certain length of the input signal in order to achieve this certain amplification of the repetitive signal pattern.

To illustrate the above mentioned embodiment consider the following example:

A repetitive signal pattern with a lowest repetition frequency $f_1$ is of interest. In order to ensure detection of such a repetitive signal, it will be necessary to produce an output signal capable of indicating a complete cycle, i.e. it needs to represent a duration of $T_1=1/f_1$. When consecutive output signal sample values are separated by a sample period $t_{delta}$ the minimum number of sample values in the output signal will be $O_{Lengthmin}=T_1/t_{delta}$.

As mentioned above, the amount of amplification of the repetitive signal will increase with the length of the input signal.

As mentioned above, the method described with reference to FIGS. 10 to 13 above operates to enhance repetitive signal signatures in a sequence of measurement data emanating from a rotating shaft. The wording "repetitive signal signature" is to be understood as being sample values [x(t), x(t+T), x, (t+2T), ... x(t+nT)] including an amplitude component having a non-stochastic amplitude value, and wherein a duration T between these sample values is constant, as long as the shaft rotates at a constant speed of rotation. With reference to FIG. 13 it is to be understood that digital values 4010 result from enhancing plural repetitive signal values in the input signal I (See FIG. 11), wherein the input signal values are separated in time by a duration $T_{IR}$. Hence, in that case it can be deduced that the "repetitive signal signature" relates to a damage at the inner ring of the bearing assembly, when the period of repetition $T_{IR}$ corresponds to a ball pass rate at the inner ring. Of course this presumes knowledge of the shaft diameter and the speed of rotation. Also, when there is such a "repetitive signal signature" signal component, there may be a repetitive signal component value x such that x(t) has similar amplitude as x(t+T) which has similar amplitude as x(t+2T), which has similar amplitude as x(t+nT)x, and so on. When there is such a "repetitive signal signature" present in the input signal, it may advantageously be detected using the above described method, even when the repetitive signal signature is so weak as to generate an amplitude component smaller than that of the stochastic signal components.

The method described in connection with FIGS. 10-13 may be performed by the analysis apparatus 14 when the processor 50 executes the corresponding program code 94, as discussed in conjunction with FIG. 4 above. The data processor 50 may include a central processing unit for controlling the operation of the analysis apparatus 14, as well as a Digital Signal Processor (DSP). The DSP may be arranged to actually run the program code 90 for causing the analysis apparatus 14 to execute the program 94 causing the process described above in connections with FIGS. 10-13 to be executed. The Digital Signal Processor may be e.g. of the type TMS320C6722, manufactured by Texas Instruments. In this manner the analysis apparatus 14 may operate to execute all signal processing functions 94, including filtering function 240, enveloping function 250, decimation function 310 & 470 and enhancing function 320.

According to another embodiment of the invention, the signal processing may be shared between the apparatus 14 and the computer 33, as mentioned above. Hence, apparatus 14 may receive the analogue measurement signal $S_{EA}$ and generate a corresponding digital signal $S_{MD}$, and then deliver the digital signal $S_{MD}$ to control computer 33, allowing further signal processing functions 94 to be performed at the control location 31.

Decimation of Sampling Rate

As discussed above in connection with FIG. 9, it may be desirable to provide a decimator 310 to reduce the sampling frequency of the digital signal before delivery to the enhancer 320. Such a decimator 310 advantageously reduces the number of samples in the signal to be analyzed, thereby reducing the amount of memory space needed for storing the signal to be used. The decimation also enables a faster processing in the subsequent enhancer 320.

Figure 14A:
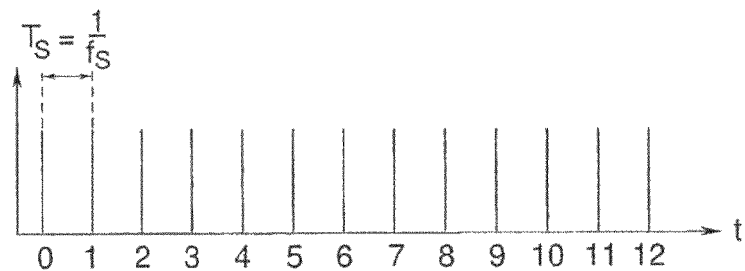
FIG. 14A illustrates a number of sample values in the signal delivered to the input of the decimator 310.
Figure 14B:
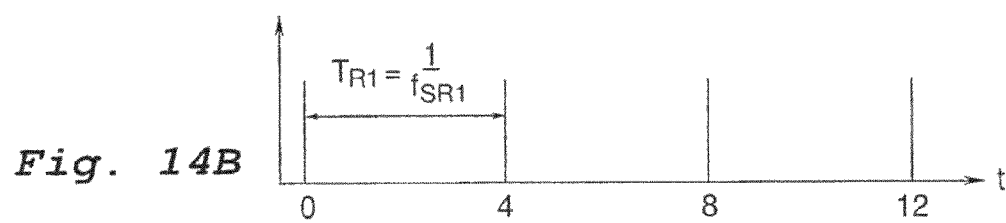
FIG. 14B illustrates output sample values of the corresponding time period.

FIG. 14A illustrates a number of sample values in the signal delivered to the input of the decimator 310, and FIG. 14B illustrates output sample values of the corresponding time period. The signal being input to decimator 310 may have a sampling frequency $f_S$. As can be seen the output signal is has a reduced sample frequency $f_{SR1}$. The decimator 310 is adapted to perform a decimation of the digitally enveloped signal $S_{ENV}$ so as to deliver a digital signal $S_{RED}$ having a reduced sample rate $f_{SR1}$ such that the output sample rate is reduced by an integer factor M as compared to the input sample rate $f_S$.

Hence, the output signal $S_{RED}$ includes only every M:th sample value present in the input signal $S_{ENV}$. FIG. 14B illustrates an example where M is 4, but M could be any positive integer. According to an embodiment of the invention the decimator may operate as described in U.S. Pat. No. 5,633,811, the content of which is hereby incorporated by reference.

Figure 15A:
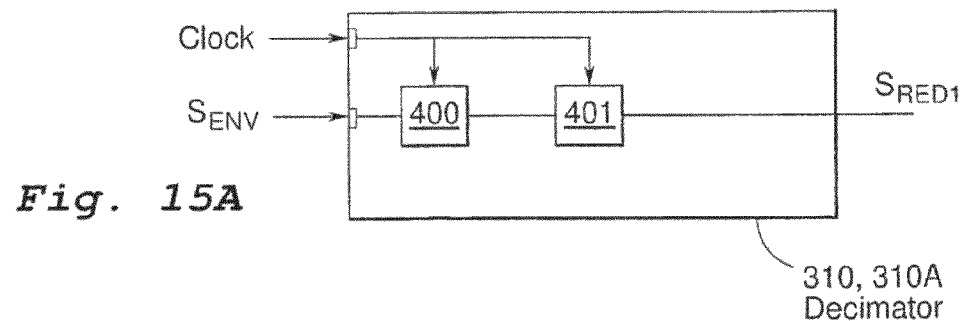
FIG. 15A illustrates a decimator according to an embodiment of the invention.

FIG. 15A illustrates a decimator 310 according to an embodiment of the invention. In the embodiment 310A of decimator 310 according to FIG. 15A, a comb filter 400 filters and decimates the incoming signal at a ratio of 16:1. That is, the output sampling rate is reduced by a first integer factor M1 of sixteen (M1=16) as compared to the input sampling rate. A finite impulse response (FIR) filter 401 receives the output of the comb filter 400 and provides another reduction of the sampling rate by a second integer factor M2. If integer factor M2=4, the FIR filter 401 renders a 4:1 reduction of the sampling rate, and therefore decimator 310A rendera a total decimation of 64:1.

Figure 15B:
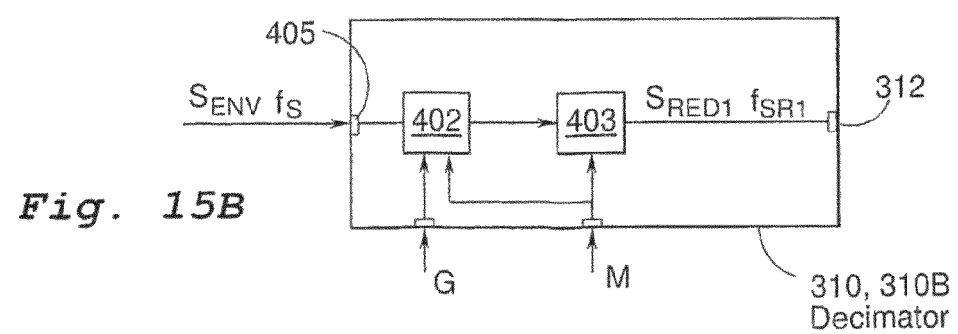
FIG. 15B illustrates another embodiment of the invention

FIG. 15B illustrates another embodiment of the invention, wherein embodiment 310B of the decimator 310 includes a low pass filter 402, followed by a sample selector 403. The sample selector 403 is adapted to pick every M:th sample out of the signal received from the low pass filter 402. The resulting signal $S_{RED1}$ has a sample rate of $f_{SR1}=f_S/M$, where $f_S$ is the sample rate of received signal $S_{ENV}$. The cutoff frequency of the low pass filter 402 is controlled by the value M.

According to one embodiment the value M is preset to a certain value. According to another embodiment the value M may be settable. The decimator 310 may be settable to make a selected decimation M:1, wherein M is a positive integer. The value M may be received on a port 404 of decimator 310.

The cut-off frequency of low pass filter 402 is $f_{SR1}/(G*M)$ Hertz. The factor G may be selected to a value of two (2.0) or a value higher than two (2.0). According to an embodiment the value C is selected to a value between 2.5 and 3. This advantageously enables avoiding aliasing. The low pass filter 402 may be embodied by a FIR filter.

The signal delivered by low pass filter 402 is delivered to sample selector 403. The sample selector receives the value M on one port and the signal from low pass filter 402 on another port, and it generates a sequence of sample values in response to these inputs. The sample selector is adapted to pick every M:th sample out of the signal received from the low pass filter 402. The resulting signal $S_{RED1}$ has a sample rate of $f_{SR1}=1/M*f_S$, where $f_S$ is the sample rate of a signal $S_{ENV}$ received on a port 405 of the decimator 310.

A Method for Compensating for Variable Shaft Speed

As mentioned above, a repetitive signal signature being present in the input signal may advantageously be detected using the above described method, even when the repetitive signal signature is so weak as to generate an amplitude component smaller than that of the stochastic signal components.

However, in certain applications the shaft rotational speed may vary. Performing the method described with reference to FIGS. 10-13 using an input measurement sequence wherein the speed of shaft rotation varies leads to deteriorated quality of the resulting output signal $S_{MDP}$.

Accordingly an object of an aspect of the invention is to achieve equally high quality of the resulting block Y when the rotational speed of the shaft varies as when the rotational speed of the shaft is constant during the complete measuring sequence.

FIG. 16 illustrates an embodiment of the invention including a decimator 310 and an enhancer 320, as described above, and a fractional decimator 470.

According to an embodiment of the invention, whereas the decimator 310 operates to decimate the sampling rate by M:1, wherein M is an integer, the FIG. 16 embodiment includes a fractional decimator 470 for decimating the sampling rate by U/N, wherein both U and N are positive integers. Hence, the fractional decimator 470 advantageously enables the decimation of the sampling rate by a fractional number. According to an embodiment the values for U and N may be selected to be in the range from 2 to 2000. According to an embodiment the values for U and N may be selected to be in the range from 500 to 1500. According to yet another embodiment the values for U and N may be selected to be in the range from 900 to 1100.

In the FIG. 16 embodiment the output signal from the decimator 310 is delivered to a selector 460. The selector enables a selection of the signal to be input to the enhancer 320. When condition monitoring is made on a rotating part having a constant speed of rotation, the selector 460 may be set in the position to deliver the signal $S_{RED}$ having sample frequency $f_{SR1}$ to the input 315 of enhancer 320, and fractional decimator 470 may be disabled. When condition monitoring is made on a rotating part having a variable speed of rotation, the fractional decimator 470 may be enabled and the selector 460 is set in the position to deliver the signal $S_{RED2}$ having sample frequency $f_{SR2}$ to the input 315 of enhancer 320.

The fractional decimator 470 has an input 480. The input 480 may be coupled to receive the signal output from decimator 310. The fractional decimator 470 also has an input 490 for receiving information indicative of the rotational speed of the shaft 8.

A speed detector 420 (See FIG. 5) may be provided to deliver a signal indicative of the speed of rotation $f_{ROT}$ of the shaft 8. The speed signal may be received on a port 430 of the processing means 180, thereby enabling the processing means 180 to deliver that speed signal to input 490 of fractional decimator 470. The speed of rotation $f_{ROT}$ of the shaft 8 may be provided in terms of rotations per second, i.e. Hertz (Hz).

Figure 17:
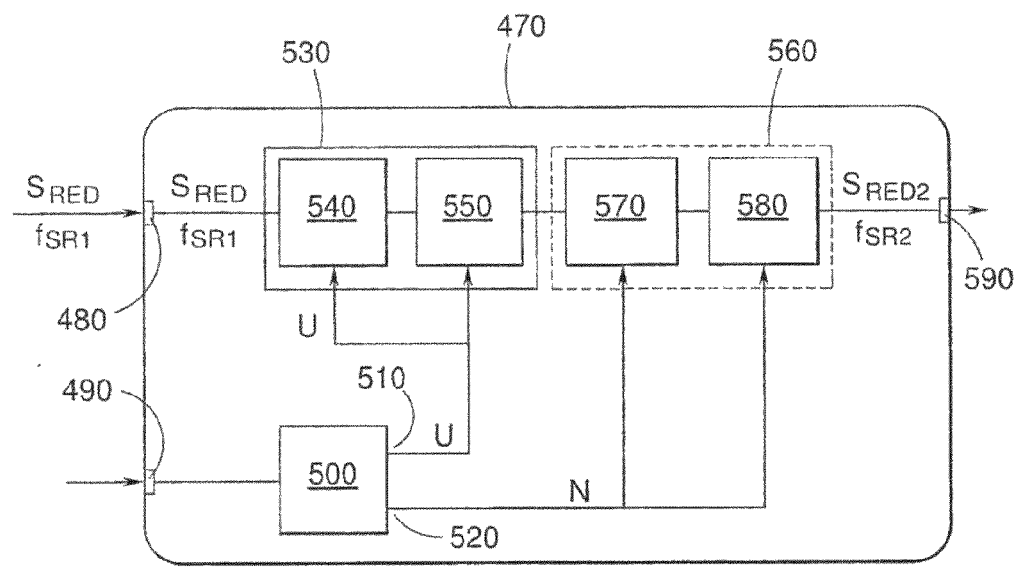
FIG. 17 illustrates an embodiment of the fractional decimator.

FIG. 17 illustrates an embodiment of the fractional decimator 470 enabling the alteration of the sample rate by a fractional number U/N, wherein U and N are positive integers. This enables a very accurate control of the sample rate $f_{SR2}$ to be delivered to the enhancer 320, thereby enabling a very good detection of weak repetitive signal signatures even when the shaft speed varies.

The speed signal, received on input 490 of fractional decimator 470, is delivered to a Fractional Number generator 500. The Fractional Number generator 500 generates integer number outputs U and N on outputs 510 and 520, respectively. The U output is delivered to an upsampler 530. The upsampler 530 receives the signal $S_{RED}$ (See FIG. 16) via input 480. The upsampler 530 includes a sample introductor 540 for introducing U−1 sample values between each sample value received on port 480. Each such added sample value is provided with an amplitude value. According to an embodiment each such added sample value is a zero (0) amplitude.

The resulting signal is delivered to a low pass filter 550 whose cut-off frequency is controlled by the value U delivered by Fractional Number generator 500. The cut-off frequency of low pass filter 550 is $f_{SR2}/(K*U)$ Hertz. The factor K may be selected to a value of two (2) or a value higher than two (2).

The resulting signal is delivered to a Decimator 560. The Decimator 560 includes a low pass filter 570 whose cutoff frequency is controlled by the value N delivered by Fractional Number generator 500. The cut-off frequency of low pass filter 570 is $f_{SR2}/(K*N)$ Hertz. The factor K may be selected to a value of two (2) or a value higher than two (2).

The signal delivered by low pass filter 570 is delivered to sample selector 580. The sample selector receives the value N on one port and the signal from low pass filter 570 on another port, and it generates a sequence of sample values in response to these inputs. The sample selector is adapted to pick every N:th sample out of the signal received from the low pass filter 570. The resulting signal $S_{RED2}$ has a sample rate of $f_{SR2}=U/N*f_{SR1}$, where $f_{SR1}$ is the sample rate of a signal $S_{RED}$ received on port 480. The resulting signal $S_{RED2}$ is delivered on an output port 590.

The low pass filters 550 and 570 may be embodied by FIR filters. This advantageously eliminates the need to perform multiplications with the zero-amplitude values introduced by sample introductor 540.

Figure 18:
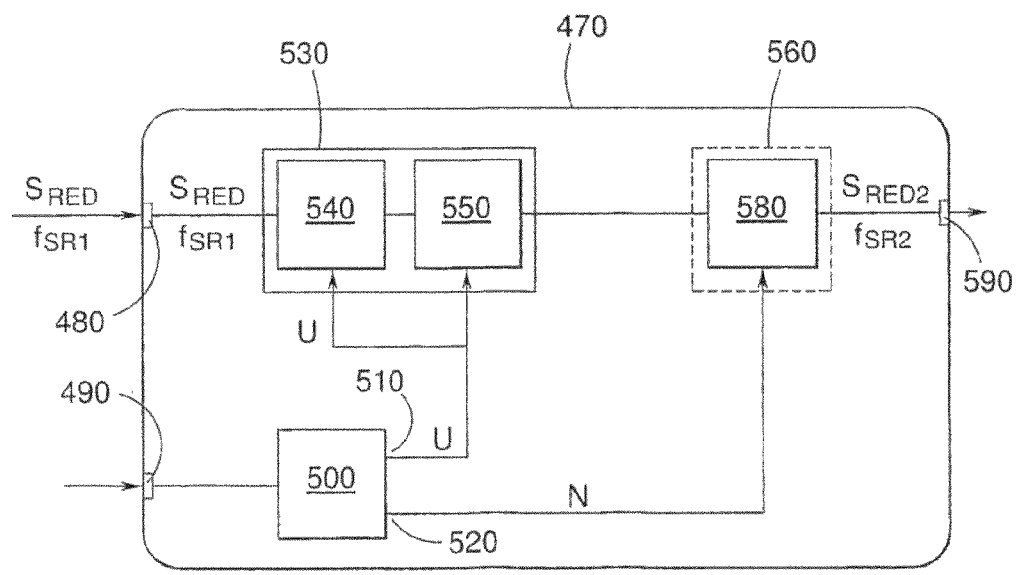
FIG. 18 illustrates another embodiment of the fractional decimator.

FIG. 18 illustrates another embodiment of the fractional decimator 470. The FIG. 18 embodiment advantageously reduces the amount of calculation needed for producing the signal $S_{RED2}$.

In the FIG. 18 embodiment the low pass filter 570 has been eliminated, so that the signal delivered by low pass filter 550 is delivered directly to sample selector 580. When the fractional decimator 470 is embodied by hardware the FIG. 18 embodiment advantageously reduces an amount of hardware, thereby reducing the cost of production.

When the fractional decimator 470 is embodied by software the FIG. 18 embodiment advantageously reduces an amount of program code that need to be executed, thereby reducing the load on the processor and increasing the execution speed.

With reference to FIGS. 17 and 18, the resulting signal $S_{RED2}$, which is delivered on the output port of fractional decimator 470, has a sample rate of $f_{SR2}=U/N*f_{SR1}$, where $f_{SR1}$ is the sample rate of a signal $S_{RED}$ received on port 480. The fractional value U/N is dependent on a rate control signal received on input port 490. As mentioned above, the rate control signal may be a signal indicative of the speed of rotation of the shaft 8, which may be delivered by speed detector 420 (See FIG. 1 and/or FIG. 5). The speed detector 420 may be embodied by an encoder, providing a pulse signal with a suitably selected resolution so as to enable the desired accuracy of the speed signal. In one embodiment the encoder 420 delivers a full revolution marker signal once per full revolution of the shaft 8. Such a revolution marker signal may be in the form of an electric pulse having an edge that can be accurately detected and indicative of a certain rotational position of the monitored shaft 8. According to another embodiment, the encoder 420 may deliver many pulse signals per revolution of the monitored shaft, so as to enable detection of speed variations also within one revolution of the shaft.

According to an embodiment, the Fractional Number generator 500 controls the values of U and N so that the reduced sample rate $F_{SR2}$ has such a value as to provide a signal $S_{RED2}$ wherein the number of samples per revolution of the shaft 8 is substantially constant, irrespective of any speed variations of the shaft 8. Accordingly: The higher the values of U and N, the better the ability of the fractional decimator 470 at keeping the number of sample values per revolution of the shaft 8 at a is substantially constant value.

The fractional decimation as described with reference to FIGS. 17 and 18 may be attained by performing the corresponding method steps, and this may be achieved by means of a computer program 94 stored in memory 60, as described above. The computer program may be executed by a DSP 50. Alternatively the computer program may be executed by a Field Programmable Gate Array circuit (FPGA).

The method described in connection with FIGS. 10-13 and the decimation as described with reference to FIGS. 17 and 18 may be performed by the analysis apparatus 14 when the processor 50 executes the corresponding program code 94, as discussed in conjunction with FIG. 4 above. The data processor 50 may include a central processing unit 50 for controlling the operation of the analysis apparatus 14, as well as a Digital Signal Processor (DSP) 50B. The DSP 50B may be arranged to actually run the program code 90 for causing the analysis apparatus 14 to execute the program 94 causing the process described above in connections with FIGS. 10-13 to be executed. According to another embodiment the processor 50B is a Field programmable Gate Array circuit (FPGA).

Figure 19:
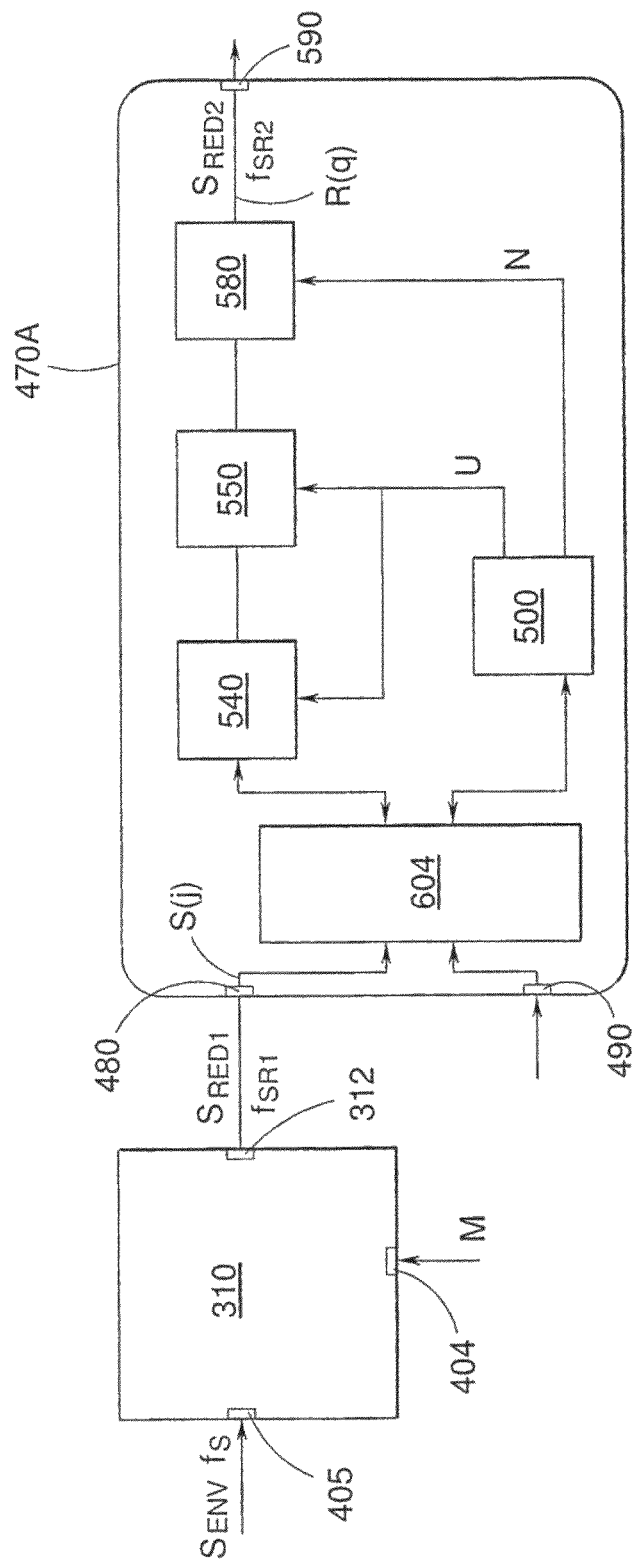
FIG. 19 illustrates decimator and another embodiment of fractional decimator.

FIG. 19 illustrates decimator 310 and another embodiment of fractional decimator 470. Decimator 310 receives the signal $S_{ENV}$ having a sampling frequency $f_S$ on a port 405, and an integer M on a port 404, as described above. Decimator 310 delivers a signal $S_{RED1}$ having a sampling frequency $f_{SR1}$ on output 312, which is coupled to input 480 of fractional decimator 470A. The output sampling frequency $f_{SR1}$ is $$f_{SR1} = f_S/M$$

wherein M is an integer.

Fractional decimator 470A receives the signal $S_{RED1}$, having a sampling frequency $f_{SR1}$, as a sequence of data values S(j), and it delivers an output signal $S_{RED2}$ as another sequence of data values R(q) on its output 590.

Fractional decimator 470A may include a memory 604 adapted to receive and store the data values S(j) as well as information indicative of the corresponding speed of rotation $f_{ROT}$ of the monitored rotating part. Hence the memory 604 may store each data value S(j) so that it is associated with a value indicative of the speed of rotation of the monitored shaft at time of detection of the sensor signal $S_{EA}$ Value corresponding to the data value S(j).

When generating output data values R(q) the fractional decimator 470A is adapted to read data values S(j) as well as information indicative of the corresponding speed of rotation $f_{ROT}$ from the memory 604.

The data values S(j) read from the memory 604 are delivered to sample introductor 540 for introducing U−1 sample values between each sample value received on port 480. Each such added sample value is provided with an amplitude value. According to an embodiment each such added sample value is a zero (0) amplitude.

The resulting signal is delivered to a low pass filter 550 whose cut-off frequency is controlled by the value U delivered by Fractional Number generator 500, as described above.

The resulting signal is delivered to the sample selector 580. The sample selector receives the value N on one port and the signal from low pass filter 550 on another port, and it generates a sequence of sample values in response to these inputs. The sample selector is adapted to pick every N:th sample out of the signal received from the low pass filter 550. The resulting signal $S_{RED2}$ has a sample rate of $f_{SR2} = U/N \cdot f_{SR1}$, where $f_{SR1}$ is the sample rate of a signal $S_{RED}$ received on port 480. The resulting signal $S_{RED2}$ is delivered on output port 590.

Hence, the sampling frequency $f_{SR2}$ for the output data values R(q) is lower than input sampling frequency $f_{SR1}$ by a factor D. D can be set to an arbitrary number larger than 1, and it may be a fractional number. According to preferred embodiments the factor D is settable to values between 1.0 to 20.0. In a preferred embodiment the factor D is a fractional number settable to a value between about 1.3 and about 3.0. The factor D may be obtained by setting the integers U and N to suitable values. The factor D equals N divided by U:

$$D = N/U$$

According to an embodiment of the invention the integers U and N are settable to large integers in order to enable the factor D=N/U to follow speed variations with a minimum of inaccuracy. Selection of variables U and N to be integers larger than 1000 renders an advantageously high accuracy in adapting the output sample frequency to tracking changes in the rotational speed of the monitored shaft. So, for example, setting N to 500 and U to 1001 renders D=2,002.

The variable D is set to a suitable value at the beginning of a measurement and that value is associated with a certain speed of rotation of a rotating part to be monitored. Thereafter, during the condition monitoring session, the fractional value D is automatically adjusted in response to the speed of rotation of the rotating part to be monitored so that the signal outputted on port 590 provides a substantially constant number of sample values per revolution of the monitored rotating part.

As mentioned above, the encoder 420 may deliver a full revolution marker signal once per full revolution of the shaft 8. Such a full revolution marker signal may be in the form of an electric pulse having an edge that can be accurately detected and indicative of a certain rotational position of the monitored shaft 8. The full revolution marker signal, which may be referred to as an index pulse, can be produced on an output of the encoder 420 in response to detection of a zero angle pattern on an encoding disc that rotates when the monitored shaft rotates. This can be achieved in several ways, as is well known to the person skilled in this art. The encoding disc may e.g. be provided with a zero angle pattern which will produce a zero angle signal with each revolution of the disc. The speed variations may be detected e.g. by registering a "full revolution marker" in the memory 604 each time the monitored shaft passes the certain rotational position, and by associating the "full revolution marker" with a sample value s(j) received at the same instant. In this manner the memory 604 will store a larger number of samples between two conseqvtive full revolution markers when the shaft rotates slower, since the A/D converter delivers a constant number of samples $f_S$ per second.

Figure 20:
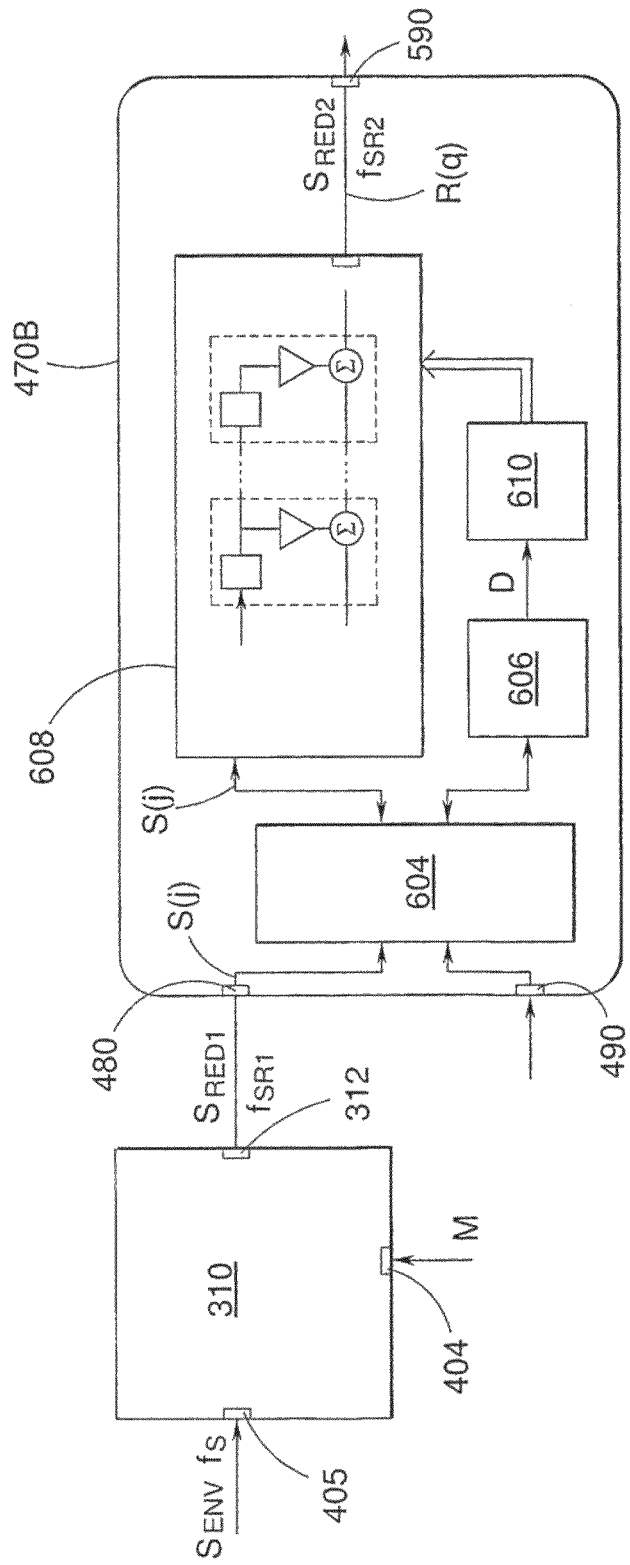
FIG. 20 is a block diagram of decimator and yet another embodiment of fractional decimator.

FIG. 20 is a block diagram of decimator 310 and yet another embodiment of fractional decimator 470. This fractional decimator embodiment is denoted 470B.

Fractional decimator 470B may include a memory 604 adapted to receive and store the data values S(j) as well as information indicative of the corresponding speed of rotation $f_{ROT}$ of the monitored rotating part. Hence the memory 604 may store each data value S(j) so that it is associated with a value indicative of the speed of rotation of the monitored shaft at time of detection of the sensor signal $S_{EA}$ value corresponding to the data value S(j).

Fractional decimator 470B receives the signal $S_{RED1}$, having a sampling frequency $f_{SR1}$, as a sequence of data values S(j), and it delivers an output signal $S_{RED2}$, having a sampling frequency $f_{SR2}$, as another sequence of data values R(q) on its output 590.

Fractional decimator 470B may include a memory 604 adapted to receive and store the data values S(j) as well as information indicative of the corresponding speed of rotation $f_{ROT}$ of the monitored rotating part. Memory 604 may store data values S(j) in blocks so that each block is associated with a value indicative of a relevant speed of rotation of the monitored shaft, as described below in connection with FIG. 21.

Fractional decimator 470B may also include a fractional decimation variable generator 606, which is adapted to generate a fractional value D. The fractional value D may be a floating number. Hence, the fractional number can be controlled to a floating number value in response to a received speed value $f_{ROT}$ so that the floating number value is indicative of the speed value $f_{ROT}$ with a certain inaccuracy. When implemented by a suitably programmed DSP, as mentioned above, the inaccuracy of floating number value may depend on the ability of the DSP to generate floating number values.

Moreover, fractional decimator 470B may also include a FIR filter 608. The FIR filter 608 is a low pass FIR filter having a certain low pass cut off frequency adapted for decimation by a factor $D_{MAX}$. The factor $D_{MAX}$ may be set to a suitable value, e.g. 20,000. Moreover, fractional decimator 470B may also include a filter parameter generator 610.

Operation of fractional decimator 470B is described with reference to FIGS. 21 and 22 below.

Figure 21:
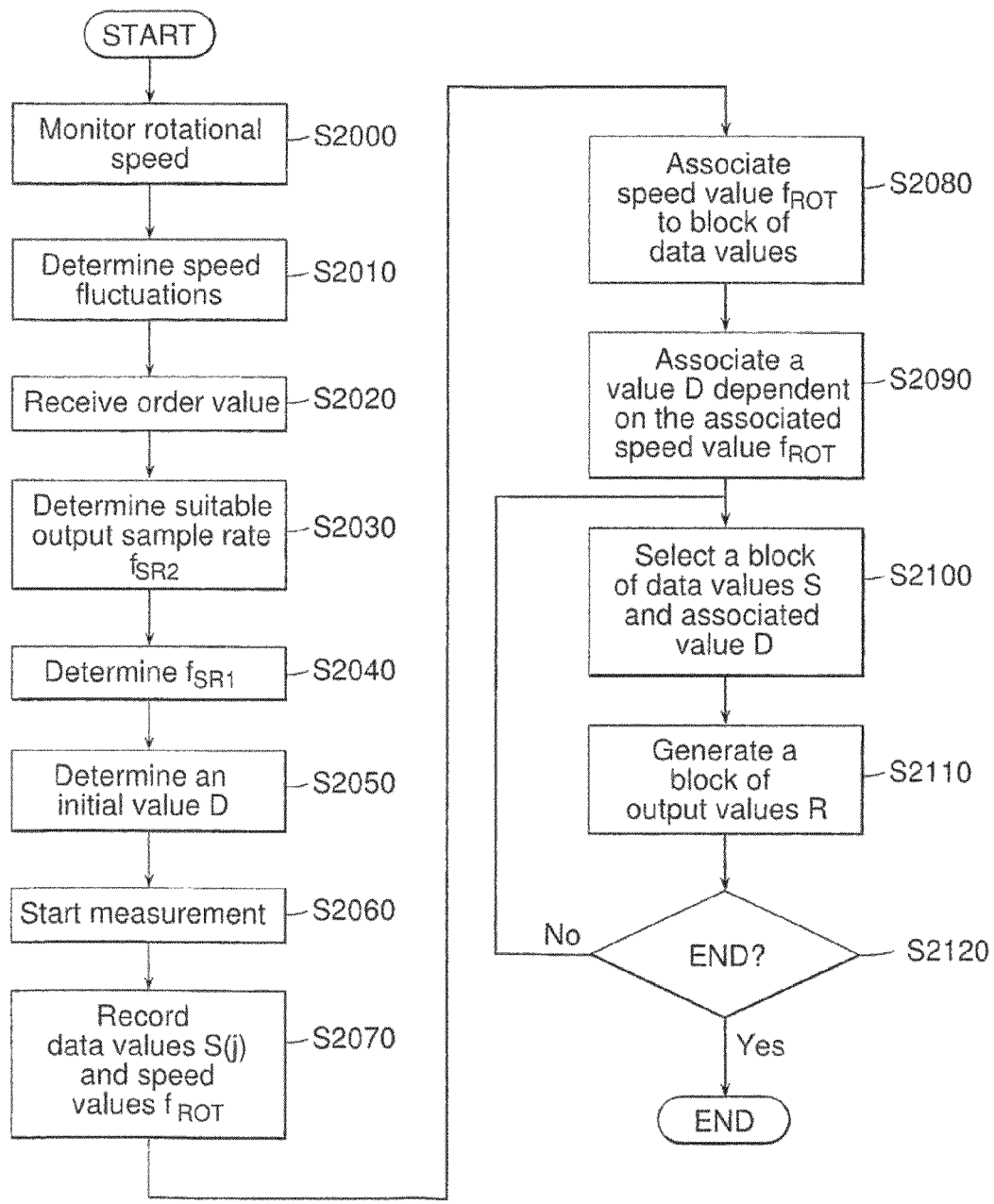
FIG. 21 is a flow chart illustrating an embodiment of a method of operating the decimator and the fractional decimator of FIG. 20.

FIG. 21 is a flow chart illustrating an embodiment of a method of operating the decimator 310 and the fractional decimator 470B of FIG. 20.

In a first step S2000, the speed of rotation $F_{ROT}$ of the part to be condition monitored is recorded in memory 604 (FIGS. 20 & 21), and this may be done at substantially the same time as measurement of vibrations or shock pulses begin. According to another embodiment the speed of rotation of the part to be condition monitored is surveyed for a period of time. The highest detected speed $F_{ROTmax}$ and the lowest detected speed $F_{ROTmin}$ may be recorded, e.g. in memory 604 (FIGS. 20 & 21).

In step S2010, the recorded speed values are analysed, for the purpose of establishing whether the speed of rotation varies. If the speed is determined to be constant, the selector 460 (FIG. 16) may be automatically set in the position to deliver the signal $S_{RED}$ having sample frequency $f_{SR1}$ to the input 315 of enhancer 320, and fractional decimator 470, 470B may be disabled. If the speed is determined to be variable, the fractional decimator 470, 470B may be automatically enabled and the selector 460 is automatically set in the position to deliver the signal $S_{RED2}$ having sample frequency $f_{SR2}$ to the input 315 of enhancer 320.

In step S2020, the user interface 102,106 displays the recorded speed value $f_{ROT}$ or speed values $f_{ROTmin}$, $f_{ROTmax}$, and requests a user to enter a desired order value $O_V$. As mentioned above, the shaft rotation frequency $f_{ROT}$ is often referred to as "order 1", The interesting signals may occur about ten times per shaft revolution (Order 10). Moreover, it may be interesting to analyse overtones of some signals, so it may be interesting to measure up to order 100, or order 500, or even higher. Hence, a user may enter an order number $O_V$ using user interface 102.

In step S2030, a suitable output sample rate $f_{SR2}$ is determined. According to an embodiment output sample rate $f_{SR2}$ is set to $f_{SR2}=C*O_V*f_{ROT}$ wherein C is a constant having a value higher than 2.0

$O_V$ is a number indicative of the relation between the speed of rotation of the monitored part and the repetition frequency of the signal to be analysed, $f_{ROT}$ is the momentary speed of rotation of the monitored part during a measurement session.

The constant C may be selected to a value of 2.00 (two) or higher in view of the sampling theorem. According to embodiments of the invention the Constant C may be preset to a value between 2.40 and 2.70.

According to an embodiment the factor C is advantageously selected such that 100*C/2 renders an integer. According to an embodiment the factor C may be set to 2.56. Selecting C to 2.56 renders 100*C=256=2 raised to 8.

In step S2040, the integer value M is selected dependent on the detected speed of rotation $f_{ROT}$ of the part to be monitored. The value of M may be automatically selected dependent on the detected speed of rotation of the part to be monitored such that the intermediate reduced sampling frequency $f_{SR1}$ will be higher than the desired output signal sampling frequency $f_{SR2}$. The value of the reduced sampling frequency $f_{SR1}$ is also selected depending on how much of a variation of rotational speed there is expected to be during the measuring session. According to an embodiment the sample rate $f_S$ of the A/D converter may be 102.4 kHz. According to an embodiment, the integer value M may be settable to a value between 100 and 512 so as to render intermediate reduced sampling frequency $f_{SR1}$ values between 1024 Hz and 100 Hz.

In step S2050, a fractional decimation variable value D is determined. When the speed of rotation of the part to be condition monitored varies, the fractional decimation variable value D will vary in dependence on momentary detected speed value.

According to another embodiment of steps S2040 and S2050, the integer value M is set such that intermediate reduced sampling frequency $f_{SR1}$ is at least as many percent higher than $f_{SR2}$ (as determined in step S2030 above) as the relation between highest detected speed value $f_{ROTmax}$ divided by the lowest detected speed value $f_{ROTmax}$. According to this embodiment, a maximum fractional decimation variable value $D_{MAX}$ is set to a value of $D_{MAX}=f_{ROTmax}/f_{ROTmin}$, and a minimum fractional decimation variable value $D_{MIN}$ is set to 1.0. Thereafter a momentary real time measurement of the actual speed value $f_{ROT}$ is made and a momentary fractional value D is set accordingly.

$f_{ROT}$ is value indicative of a measured speed of rotation of the rotating part to be monitored In step S2060, the actual measurement is started, and a desired total duration of the measurement may be determined. This duration may be determined in dependence on the degree of attenuation of stochastic signals needed in the enhancer. Hence, the desired total duration of the measurement may be set so that it corresponds to, or so that it exceeds, the duration needed for obtaining the input signal $I_{LENGTH}$, as discussed above in connection with FIGS. 10A to 13. As mentioned above in connection with FIGS. 10A to 13, a longer input signal $I_{LENGTH}$ renders the effect of better attenuation of stochastic signals in relation to the repetitive signal patterns in the output signal.

The total duration of the measurement may also be determined in dependence on a desired number of revolutions of the monitored part.

When measurement is started, decimator 310 receives the digital signal $S_{ENV}$ at a rate $f_S$ and it delivers a digital signal $S_{RED1}$ at a reduced rate $f_{SR1}=f_S/M$ to input 480 of the fractional decimator. In the following the signal $S_{RED1}$ is discussed in terms of a signal having sample values S(j), where j is an integer.

In step S2070, record data values S(j) in memory 604, and associate each data value with a speed of rotation value $f_{ROT}$. According to an embodiment of the invention the speed of rotation value $f_{ROT}$ is read and recorded at a rate $f_{RR}=1000$ times per second. The read & record rate $f_{RR}$ may be set to other values, dependent on how much the speed $f_{ROT}$ of the monitored rotating part varies.

In a subsequent step S2080, analyze the recorded speed of rotation values, and divide the recorded data values S(j) into blocks of data dependent on the speed of rotation values. In this manner a number of blocks of block of data values S(j) may be generated, each block of data values S(j) being associated with a speed of rotation value. The speed of rotation value indicates the speed of rotation of the monitored part, when this particular block data values S(j) was recorded. The individual blocks of data may be of mutually different size, i.e. individual blocks may hold mutually different numbers of data values S(j).

If, for example, the monitored rotating part first rotated at a first speed $f_{ROT1}$ during a first time period, and it thereafter changed speed to rotate at a second speed $f_{ROT2}$ during a second, shorter, time period, the recorded data values S(j) may be divided into two blocks of data, the first block of data values being associated with the first speed value $f_{ROT1}$, and the second block of data values being associated with the second speed value $f_{ROT2}$. In this case the second block of data would contain fewer data values than the first block of data since the second time period was shorter.

According to an embodiment, when all the recorded data values S(j) have been divided into blocks, and all blocks have been associated with a speed of rotation value, then the method proceeds to execute step S2090.

In step S2090, select a first block of data values S(O), and determine a fractional decimation value D corresponding to the associated speed of rotation value $f_{ROT}$. Associate this fractional decimation value D with the first block of data values S(j). According to an embodiment, when all blocks have been associated with a corresponding fractional decimation value D, then the method proceeds to execute step S2090. Hence, the value of the fractional decimation value D is adapted in dependence on the speed $f_{ROT}$.

In step S2100, select a block of data values S(j) and the associated fractional decimation value D, as described in step S2090 above.

In step S2110, generate a block of output values R in response to the selected block of input values S and the associated fractional decimation value D. This may be done as described with reference to FIG. 22.

In step S2120, Check if there is any remaining input data values to be processed. If there is another block of input data values to be processed, then repeat step S2100. If there is no remaining block of input data values to be processed then the measurement session is completed.

Figure 22A:
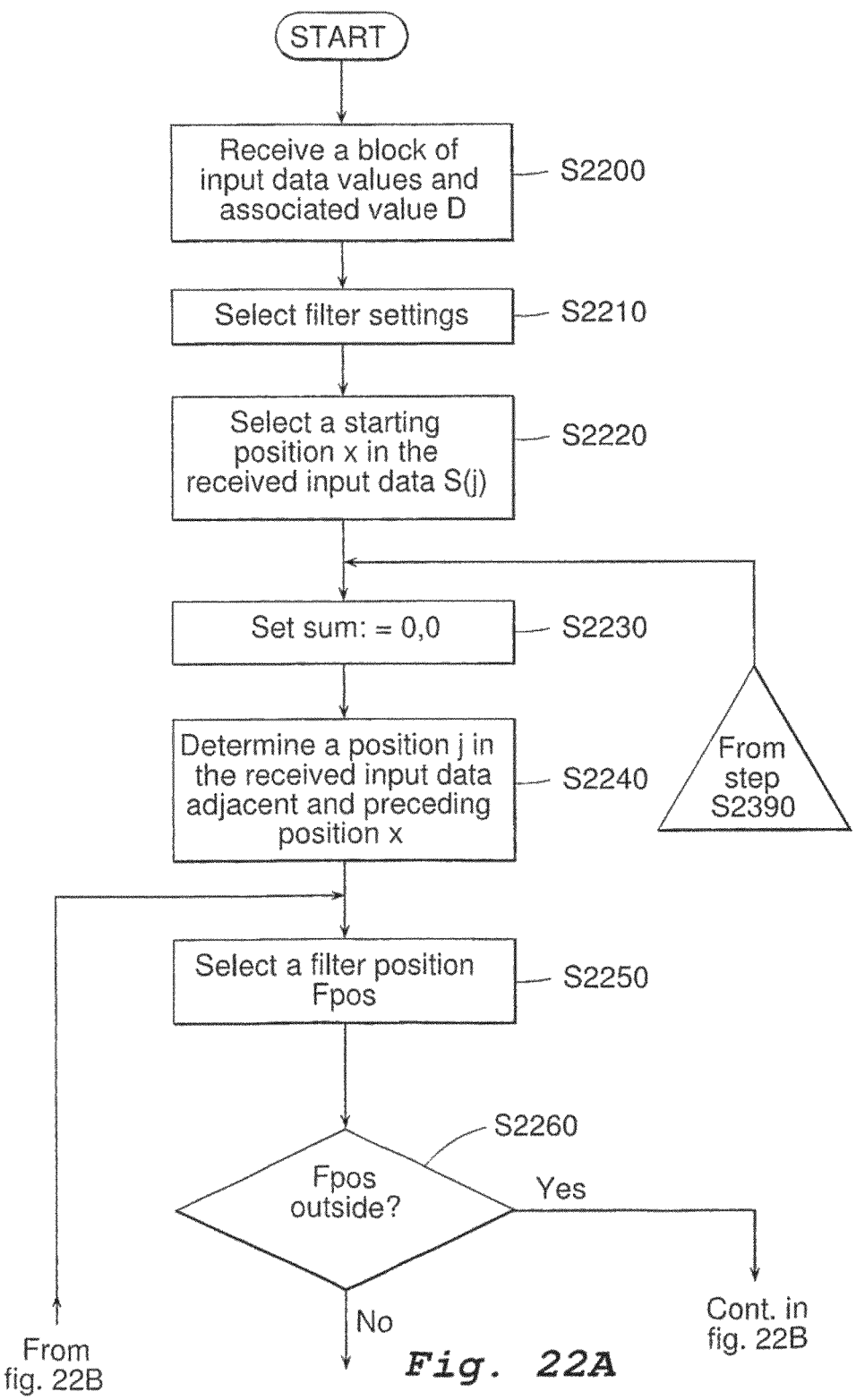
FIGS. 22A, 22B & 22C describe a method which may be implemented as a computer program.
Figure 22B:
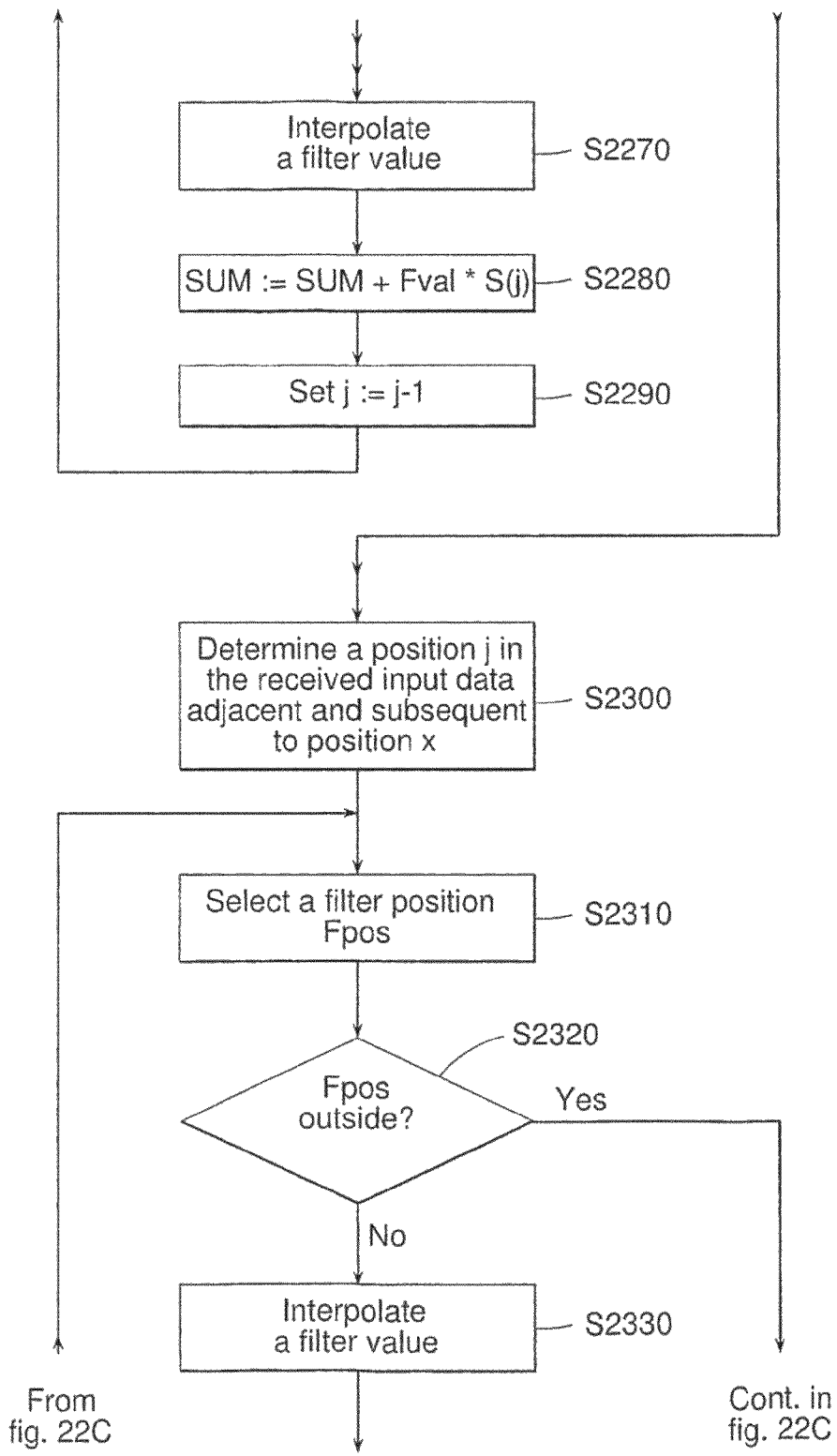
Figure 22C:
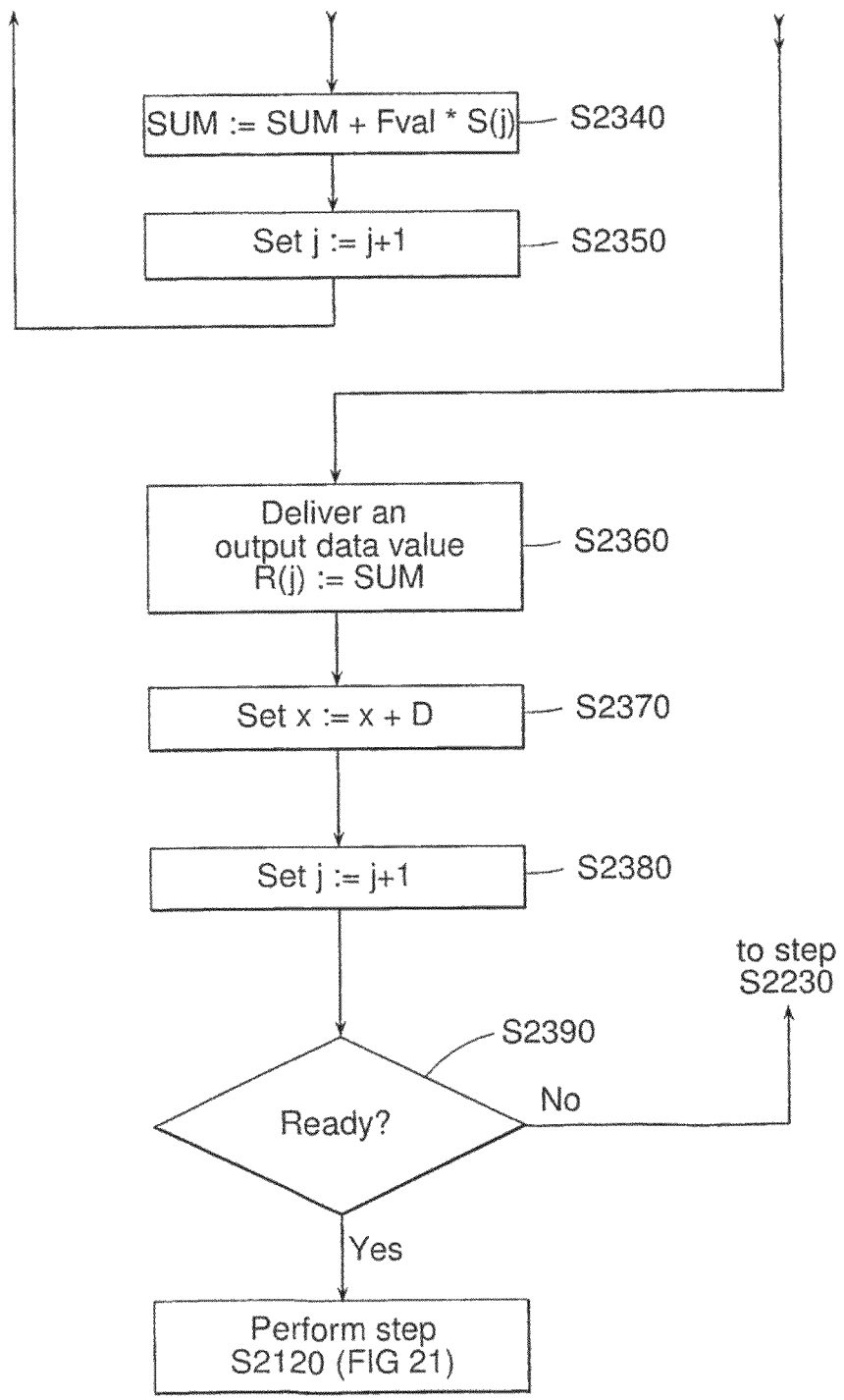

FIGS. 22A, 22B and 22C illustrate a flow chart of an embodiment of a method of operating the fractional decimator 470B of FIG. 20.

In a step S2200, receive a block of input data values S(j) and an associated specific fractional decimation value D. According to an embodiment, the received data is as described in step S2100 for FIG. 21 above. The input data values S(j) in the received block of input data values S are all associated with the specific fractional decimation value D.

In steps S2210 to S2390 the FIR-filter 608 is adapted for the specific fractional decimation value D as received in step S2200, and a set of corresponding output signal values R(q) are generated. This is described more specifically below.

In a step S2210, filter settings suitable for the specific fractional decimation value D are selected. As mentioned in connection with FIG. 20 above, the FIR filter 608 is a low pass FIR filter having a certain low pass cut off frequency adapted for decimation by a factor $D_{MAX}$. The factor $D_{MAX}$ may be set to a suitable value, e.g. 20.

A filter ratio value $F_R$ is set to a value dependent on factor $D_{MAX}$ and the specific fractional decimation value D as received in step S2200. Step S2210 may be performed by filter parameter generator 610 (FIG. 20).

In a step S2220, select a starting position value x in the received input data block s(j). It is to be noted that the starting position value x does not need to be an integer. The FIR filter 608 has a length $F_{LENGTH}$ and the starting position value x will then be selected in dependence of the filter length $F_{LENGTH}$ and the filter ratio value $F_R$. The filter ratio value $F_R$ is as set in step S2210 above. According to an embodiment, the starting position value x may be set to $x:=F_{LENGTH}/F_R$.

In a step S2230 a filter sum value SUM is prepared, and set to an initial value, such as e.g. SUM:=0.0

In a step S2240 a position j in the received input data adjacent and preceding position x is selected. The position j may be selected as the integer portion of x.

In a step S2250 select a position Fpos in the FIR filter that corresponds to the selected position j in the received input data. The position Fpos may be a fractional number. The filter position Fpos, in relation to the middle position of the filter, may be determined to be $$Fpos=[(x-j)*F_R]$$

wherein $F_R$ is the filter ratio value.

In step S2260, check if the determined filter position value Fpos is outside of allowable limit values, i.e. points at a position outside of the filter. If that happens, then proceed with step S2300 below. Otherwise proceed with step S2270.

In a step S2270, a filter value is calculated by means of interpolation. It is noted that adjacent filter coefficient values in a FIR low pass filter generally have similar numerical values. Hence, an interpolation value will be advantageously accurate. First an integer position value IFpos is calculated:

$$IFpos:=\text{Integer portion of } Fpos$$

The filter value Fval for the position Fpos will be:

$$Fval=A(IFpos)+[A(IFpos+1)-A(IFpos)]*[Fpos-Ifpos]$$

wherein A(IFpos) and A(IFpos+1) are values in a reference filter, and the filter position Fpos is a position between these values.

In a step S2280, calculate an update of the filter sum value SUM in response to signal position j:

$$SUM:=SUM+Fval*S(j)$$

In a step S2290 move to another signal position:

$$\text{Set } j:=j-1$$

Thereafter, go to step S2250.

In a step 2300, a position j in the received input data adjacent and subsequent to position x is selected. This position j may be selected as the integer portion of x. plus 1 (one), i.e $j:=1+\text{Integer portion of } x$ In a step S2310 select a position in the FIR filter that corresponds to the selected position j in the received input data. The position Fpos may may be a fractional number. The filter position Fpos, in relation to the middle position of the filter, may be determined to be $$Fpos=[(j-x)*F_R]$$

wherein $F_R$ is the filter ratio value.

In step S2320, check if the determined filter position value Fpos is outside of allowable limit values, i.e. points at a position outside of the filter. If that happens, then proceed with step S2360 below. Otherwise proceed with step S2330.

In a step S2330, a filter value is calculated by means of interpolation. It is noted that adjacent filter coefficient values in a FIR low pass filter generally have similar numerical values. Hence, an interpolation value will be advantageously accurate. First an integer position value IFpos is calculated:

$$IFpos:=\text{Integer portion of } Fpos$$

The filter value for the position Fpos will be:

$$Fval(Fpos)=A(IFpos)+[A(IFpos+1)-A(IFpos)]*[Fpos-Ifpos]$$

wherein A(IFpos) and A(IFpos+1) are values in a reference filter, and the filter position Fpos is a position between these values.

In a step S2340, calculate an update of the filter sum value SUM in response to signal position j:

SUM:=SUM+Fval*S(j)

In a step S2350 move to another signal position:

Set j:=j+1

Thereafter, go to step S2310.

In a step S2360, deliver an output data value R(j). The output data value R(j) may be delivered to a memory so that consecutive output data values are stored in consecutive memory positions. The numerical value of output data value R(j) is:

R(j):=SUM

In a step S2370, update position value x:

x:=x+D

In a step S2380, update position value j j:=j+1

In a step S2390, check if desired number of output data values have been generated.

If the desired number of output data values have not been generated, then go to step S2230. If the desired number of output data values have been generated, then go to step S2120 in the method described in relation to FIG. 21.

In effect, step S2390 is designed to ensure that a block of output signal values R(q), corresponding to the block of input data values S received in step S2200, is generated, and that when output signal values R corresponding to the input data values S have been generated, then step S2120 in FIG. 21 should be executed.

The method described with reference to FIG. 22 may be implemented as a computer program subroutine, and the steps S2100 and S2110 may be implemented as a main program.

According to yet an embodiment of the invention, the compensation for variable shaft speed may be achieved by controlling the clock frequency delivered by the clock 190. As mentioned above, a speed detector 420 (See FIG. 5) may be provided to deliver a signal indicative of the speed of rotation $f_{ROT}$ of the shaft 8, The speed signal may be received on a port 430 of the processing means 180, thereby enabling the processing means 180 to control the clock 190. Accordingly, processing means 180 may have a port 440 for delivering a clock control signal. Hence, the processing means 180 may be adapted to control the clock frequency in response to the detected speed of rotation $f_{ROT}$.

As mentioned in connection with FIG. 2B, the sampling rate of the A/D-converter is dependent upon a clock frequency. Hence, the apparatus 14 may be adapted to control the clock frequency in response to the detected speed of rotation $f_{ROT}$ so that the number of sample values per revolution of the monitored rotating part is kept at a substantially constant value even when the speed of rotation varies.

According to yet another embodiment of the invention, the enhancer functionality 320, 94 may be achieved by a method for producing autocorrelation data as described in U.S. Pat. No. 7,010,445, the content of which is hereby incorporated by reference. In particular the digital signal processor 50 may include functionality 94 for performing successive Fourier Transform operations on the digitized signals to provide autocorrelation data.

Monitoring Condition of Gear Systems

It should be noted that embodiments of the invention may also be used to survey, monitor and detect the condition of gear systems. Some embodiments provide particularly advantageous effects when monitoring epicyclic gear systems comprising epicyclic transmissions, gears and/or gear boxes. This will be described more in detail below. Epicyclic transmissions, gears and/or gear boxes may also be referred to as planetary transmissions, gears and/or gear boxes.

Figure 23:
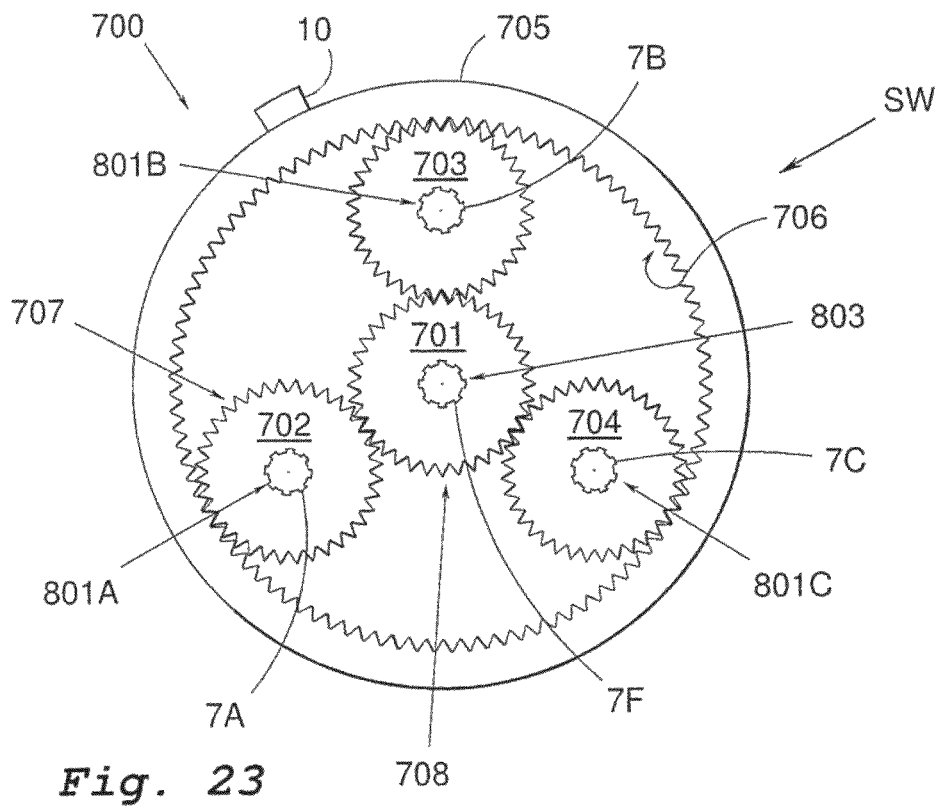
FIG. 23 is a front view illustrating an epicyclic gear system

FIG. 23 is a front view illustrating an epicyclic gear system 700. The epicyclic gear system 700 comprises at least one or more outer gears 702, 703, 704 revolving around a central gear 701. The outer gears 702, 703, 704 are commonly referred to as planet gears, and the central gear 701 is commonly referred to as a sun gear. The epicyclic gear system 700 may also incorporate the use of an outer ring gear 705, commonly also referred to as an annulus. The planet gears 702, 703, 704 may comprise P number of teeth 707, the sun gear 701 may comprise S number of teeth 708, and the annulus 705 may comprise A number of teeth 706. The A number of teeth on the annulus 705 are arranged to mesh with the P number of teeth on the planet gears 702, 703, 704, which in turn are also arranged to mesh with the S number of teeth on the sun gear 701. It should however be noted that the sun gear 701 is normally larger than the planet gears 702, 703, 704, whereby the illustration shown in FIG. 23 should not be construed as limiting in this respect. When there are different sizes on the sun gear 701 and the planet gears 702, 703, 704, the analysis apparatus 14 may also distinguish between detected conditions of different shafts and gears of the epicyclic gear system 700, as will become apparent from the following.

In many epicyclic gear systems, one of these three basic components, that is, the sun gear 701, the planet gears 702, 703, 704 or the annulus 705, is held stationary. One of the two remaining components may then serve as an input and provide power to the epicyclic gear system 700. The last remaining component may then serve as an output and receive power from the epicyclic gear system 700. The ratio of input rotation to output rotation is dependent upon the number of teeth in each gear, and upon which component is held stationary.

Figure 24:
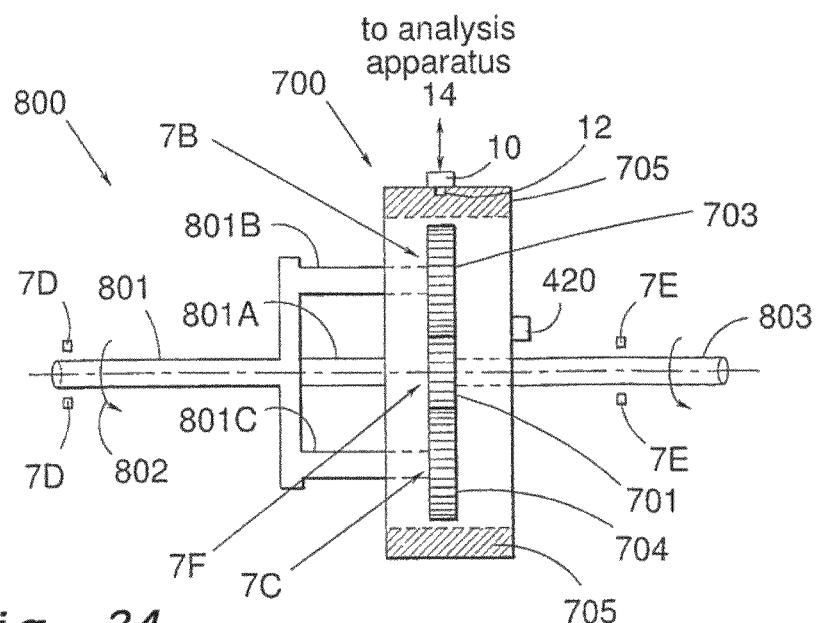
FIG. 24 is a schematic side view of the epicyclic gear system 700 of FIG. 23, as seen in the direction of the arrow SW in FIG. 23.

FIG. 24 is a schematic side view of the epicyclic gear system 700 of FIG. 23, as seen in the direction of the arrow SW in FIG. 23. An exemplary arrangement 800, including the epicyclic gear system 700, may comprise at least one sensor 10 and at least one analysis apparatus 14 according to the invention as described above. The arrangement 800 may, for example, be used as gear box for wind turbines.

In an embodiment of the arrangement 800, the annulus 705 is held fixed. A rotatable shaft 801 has plural movable arms or carriers 801A, 801B, 801C arranged to engage the planet gears 702, 703, 704. Upon providing an input rotation 802 to the rotatable shaft 801, the rotatable shaft 801 and the movable arms 801A, 801B, 801C and the planet gears 702, 703, 704 may serve as an input and provide power to the epicyclic gear system 700. The rotatable shaft 801 and the planet gears 702, 703, 704 may then rotate relative to the sun gear 701. The sun gear 701, which may be mounted on a rotary shaft 803, may thus serve as an output and receive power from the epicyclic gear system 700. This configuration will produce an increase in gear ratio $$G = 1 + \frac{A}{S}.$$

As an example, the gear ratio G when used as a gear box in a wind turbine may be arranged such that the output rotation is about 5-6 times the input rotation. The planet gears 702, 703, 704 may be mounted, via bearings 7A, 7B and 7C, respectively, on the movable arms or carriers 801A, 801B and 801C (as shown in both FIGS. 23-24), The rotatable shaft 801 may be mounted in bearings 7D. Similarly, the rotary shaft 803 may be mounted in bearings 7E, and the sun gear 701 may be mounted, via bearings 7F, on the rotary shaft 803.

According to one embodiment of the invention, the at least one sensor 10 may be attached on or at a measuring point 12 of the fixed annulus 705 of the epicyclic gear system 700. The sensor 10 may also be arranged to communicate with the analysis apparatus 14. The analysis apparatus 14 may be arranged to analyse the condition of the epicyclic gear system 700 on the basis of measurement data or signal values delivered by the sensor 10 as described above in this document. The analysis apparatus 14 may include an evaluator 230 as above.

Figure 25:
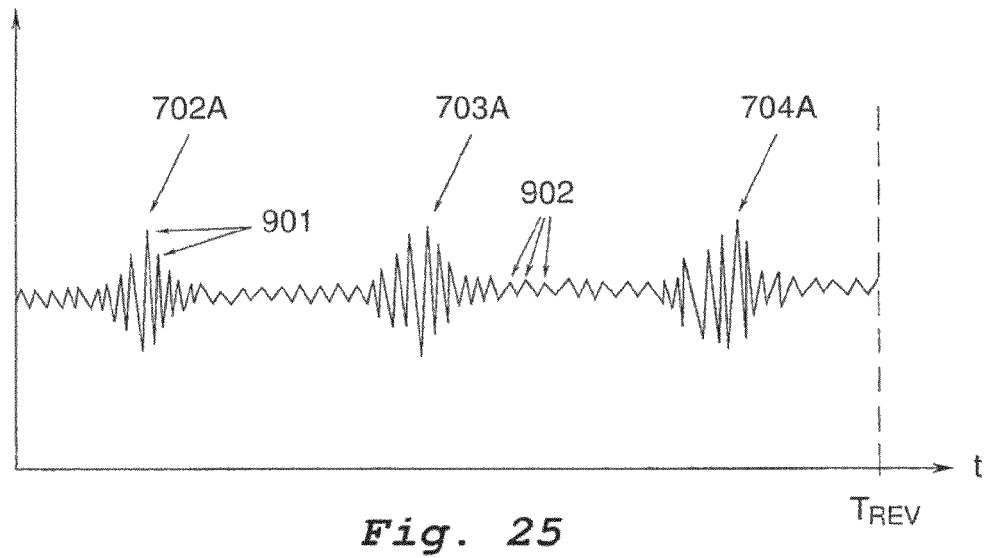
FIG. 25 illustrates an analogue version of an exemplary signal produced by and outputted by the pre-processor 200 (see FIG. 5 or FIG. 16) in response to signals detected by the at least one sensor 10 upon rotation of the epicyclic gear system.

FIG. 25 illustrates an analogue version of an exemplary signal produced by and outputted by the pre-processor 200 (see FIG. 5 or FIG. 16) in response to signals detected by the at least one sensor 10 upon rotation of the epicyclic gear system 700 in the arrangement 800. The signal is shown for a duration of $T_{REV}$, which represents signal values detected during one revolution of the rotatable shaft 801. It is to be understood that the signal delivered by the pre-processor 200 on port 260 (see FIG. 5 and FIG. 16) may be delivered to input 220 of the evaluator 230 (see FIG. 8 or FIG. 7).

As can be seen from the signal in FIG. 25, the amplitude or signal output of the signal increases as each of the planet gears 702, 703, 704 passes the measuring point 12 of the sensor 10 in the arrangement 800. These portions of the signal are referred to in the following as the high amplitude regions 702A, 703A, 704A, which may comprise high amplitude spikes 901. It can also be shown that the total amount of spikes 901, 902 in the signal over one revolution of the rotatable shaft 801, i.e. during the time period $T_{REV}$, directly correlates to the amount of teeth on the annulus 705. For example, if number of teeth on the annulus 705 is A=73, the total number of spikes in the signal during a time period $T_{REV}$ will be 73; or if number of teeth on the annulus 705 is A=75, the total number of spikes in the signal during a time period $T_{REV}$ will be 75, etc. This has been shown to be true provided that there are no errors or faults in the gears 702, 703, 704, 705 of the arrangement 800.

Figure 26:
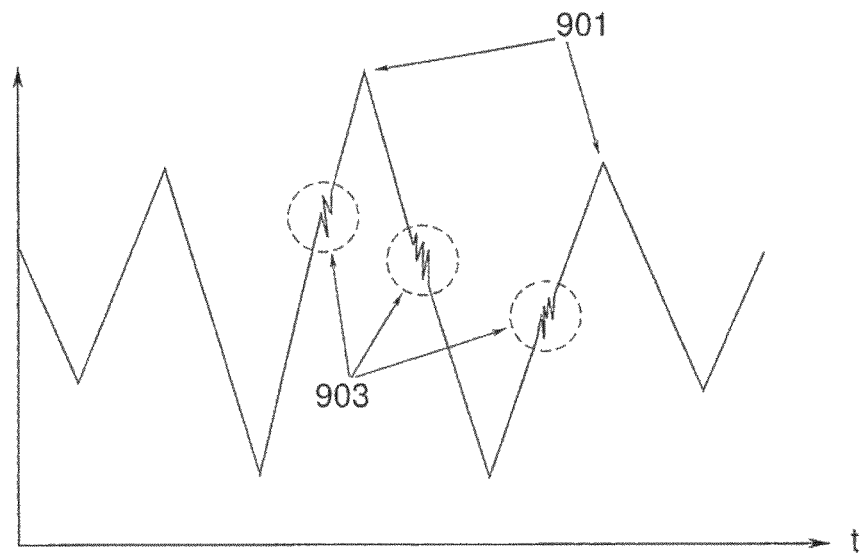
FIG. 26 illustrates an example of a portion of the high amplitude region 702A of the signal shown in FIG. 25.

FIG. 26 illustrates an example of a portion of the high amplitude region 702A of the signal shown in FIG. 25. This signal portion may be generated when the planet gear 702 passes its mechanically nearest position to the measuring point 12 and the sensor 10 (see FIGS. 23-24). It has been noted that small periodic disturbances or vibrations 903, which are illustrated in FIG. 26, may sometimes occur. Here, the small periodic disturbances 903 have been linked to the occurrence of errors, faults or tears in the bearings 7A, as shown in FIGS. 23-24, which may be mounted to one of the movable arms 801A. The small periodic disturbances 903 may thus propagate (or translate) from a bearing 7A through the planet gear 702 of the epicyclic gear system 700, to the annulus 705 where the small periodic disturbances 903 may be picked up by the sensor 10 as described above e.g. in connection with FIGS. 1-24. Similarly, errors, faults or tears in the bearings 7B or 7C mounted to one of the movable arms 801B or 801C may also generate such small periodic disturbances 903 which in the same manner as above may be picked up by the sensor 10. It should also be noted that the small periodic disturbances 903 may also emanate from errors, faults or tears in the bearings 7F which may be mounted to the rotary shaft 803. The detection of these small periodic disturbances in the signal may be indicative of the bearings 7A, 7B, 7C and/or 7F beginning to deteriorate, or indicative of their being on the limit of their active lifespan. This may, for example, be important since it may help predict when the epicyclic gear system 700 and/or the arrangement 800 are in need of maintenance or replacement.

According to an embodiment of the invention, the condition analyser 290 in the evaluator 230 of the analysis apparatus 14 may be arranged to detect these small periodic disturbances 903 in the received signal from the sensor 10. This is made possible by the previously described embodiments of the invention. The small periodic disturbances 903 may also be referred to as shock pulses 903 or vibrations 903, According to an embodiment of the invention, the analysis apparatus 14 employing an enhancer 320 as described above enables the detection of these shock pulses 903 or vibrations 903 originating from bearings 7A (or 7B, 7C or 7F) using a sensor 10 mounted on the annulus 705 as described above, Although the mechanical shock pulse or vibration signal as picked up by the sensor 10 attached to annulus 705 may be weak, the provision of an enhancer 320 as described above makes it possible to monitor the condition of bearings 7A (or 7B, 7C or 7F) even though the mechanical shock pulse or vibration signal has propagated via one or several of the planet gears 702, 703 or 704.

As previously mentioned and shown in FIGS. 7-9, the condition analyser 290 may be arranged to perform suitable analysis by operating on a signal in the time domain, or a signal in the frequency domain. However, the detection of the small periodic disturbances 903 in the received signal from the sensor 10 is most fittingly described in frequency domain, as shown in FIG. 27.

Figure 27:
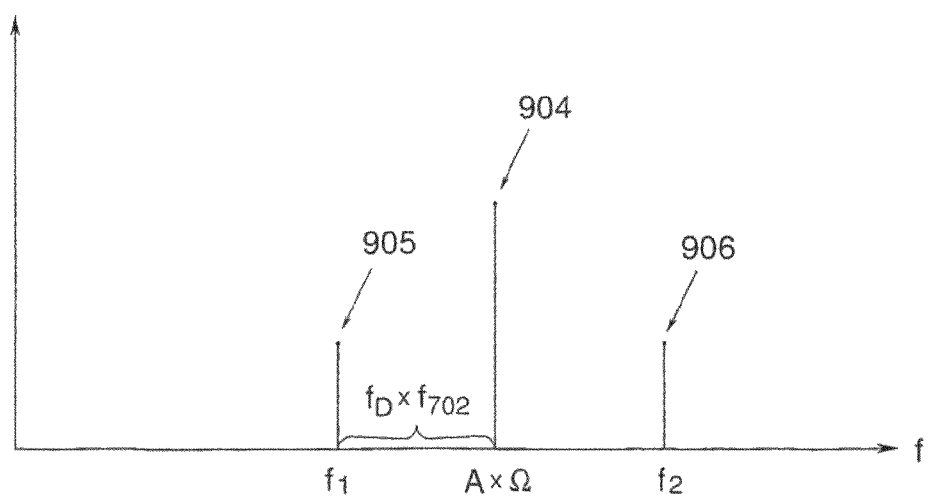
FIG. 27 illustrates an exemplary frequency spectrum of a signal comprising a small periodic disturbance 903 as illustrated in FIG. 26.

FIG. 27 illustrates an exemplary frequency spectrum of a signal comprising a small periodic disturbance 903 as illustrated in FIG. 26. The frequency spectrum of the signal comprises a peak 904 at a frequency which is directly correlated with the engagement or meshing of the teeth of the planet gears 702, 703, 704 and the annulus 705. In fact, the frequency of the peak 904 in the frequency spectrum will be located at A×Ω, where A is the total number of teeth of the annulus 705, and Ω is the number of revolutions per second by the rotatable shaft 801, when rotation 802 occurs at a constant speed of rotation.

In addition to the peak 904 in the frequency spectrum, the small periodic disturbance 903 as illustrated in FIG. 26 may generate peaks 905, 906 at the frequencies $f_1$, $f_2$ centred about the peak 904 in the frequency spectrum. The peaks 905, 906 at the frequencies $f_1$, $f_2$ may thus also be referred to as a symmetrical sideband about the centre peak 904, According to an exemplary embodiment of the invention, the condition analyser 290 may be arranged to detect the one or several peaks in the frequency spectrum, and thus be arranged to detect small periodic disturbances in the signal received from the sensor 10. It can also be shown that the peaks 905, 906 at the frequencies $f_1$, $f_2$ relate to the centre peak 904 according to the equations Eq. 1-2:

$$f_1 = (A \times \Omega) - (f_D \times f_{702}) \qquad \text{(Eq. 1)}$$

$$f_2 = (A \times \Omega) + (f_D \times f_{702}) \qquad \text{(Eq. 2)}$$

wherein

A is the total number of teeth of the annulus 705;

Ω is the number of revolutions per second by the rotatable shaft 801; and $f_D$ is a repetition frequency of the repetitive signal signature which may be indicative of a deteriorated condition; and $f_{702}$ is the number of revolutions per second by the planet 702 around its own centre.

The repetition frequency $f_D$ of the repetitive signal signature is indicative of the one of the rotating parts which is the origin of the repetitive signal signature. The repetition frequency $f_D$ of the repetitive signal signature can also be used to distinguish between different types of deteriorated conditions, as discussed above e.g. in connection with FIG. 8. Accordingly, a detected repetition frequency $f_D$ of the repetitive signal signature may be indicative of a Fundamental train frequency (FTF), a Ball spin (BS) frequency, an Outer Race (OR) frequency, or an Inner Race (IR) frequency relating to a bearing 7A, 7B, 7C or 7F in the epicyclic gear system 700 in the arrangement 800 in FIG. 24.

Hence, as described above, a data signal representing mechanical vibrations emanating from rotation of one or several shafts, such as, rotatable shaft 801 and/or rotary shaft 803 (see FIGS. 23-24), may include several repetitive signal signatures, and a certain signal signature may thus be repeated a certain number of times per revolution of one of the monitored shafts. Moreover, several mutually different repetitive signal signatures may occur, wherein the mutually different repetitive signal signatures may have mutually different repetition frequencies. The method for enhancing repetitive signal signatures in signals, as described above, advantageously enables simultaneous detection of many repetitive signal signatures having mutually different repetition frequencies. This advantageously enables the simultaneous monitoring of several bearings 7A, 7B, 7C, 7F associated with different shafts 801, 803 using a single detector 10. The simultaneous monitoring may also use the fact that the size of the sun gear 701 and the planet gears 702, 703, 704 normally are of different sizes, which further may enable a easy detection of which of the bearings 7A, 7B, 7C, 7F in FIGS. 23-24 it is that is generating the small periodic disturbance 903, and thus which of the bearings 7A, 7B, 7C, 7F in FIGS. 23-24 may be in need of maintenance or replacement. The method for enhancing repetitive signal signatures in signals, as described above, also advantageously makes it possible to distinguish between e.g. a Bearing Inner Race damage signature and a Bearing Outer Race damage signature in a single measuring and analysis session.

The relevant value for Ω, representing the speed of rotation of the planet gears 702, 703, 704, can be indicated by a sensor 420 (see FIG. 24). The sensor 420 may be adapted to generate a signal indicative of rotation of the shaft 803 in relation to the annulus 705, and from this signal the relevant value for Ω can be calculated when the number of teeth of the annulus 705, the planet gears 702, 703, 704 and the sun gear 701 are known.

Figure 28:
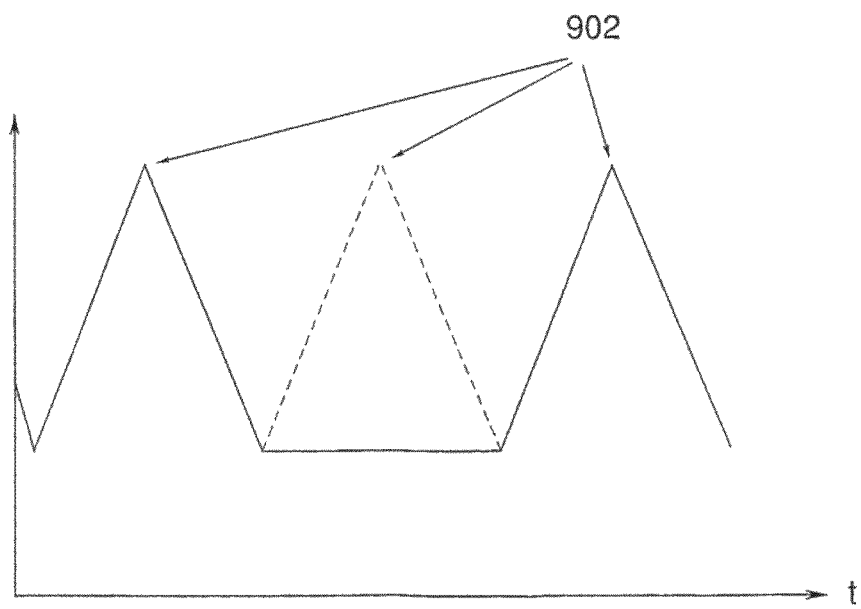
FIG. 28 illustrates an example of a portion of the exemplary signal shown in FIG. 25.

FIG. 28 illustrates an example of a portion of the exemplary signal shown in FIG. 25, This exemplary portion demonstrates another example of an error or fault which the condition analyser 290 also may be arranged to detect in a similar manner as described above. If a tooth in the one or several of the gears 701, 702, 703, 704, 705 should break or be substantially worn down, the condition analyser 290 may be arranged detect that a tooth is broken or worn down since this will also generate a periodic disturbance, i.e. due to the lack of tooth engagement or meshing of the missing or worn down tooth. This may be detectable by the condition analyser 290 in, for example, the frequency spectrum of the signal received from the sensor 10. It should also be noted that this type of error or fault may be detected by the condition analyser 290 in any type of gear and/or gear system. The frequency of this type of teeth engagement error, or meshing error, in a gear and/or gear system is often located at significantly higher frequency than, for example, the frequencies $f_1$, $f_2$ in FIG. 27.

Figure 29:
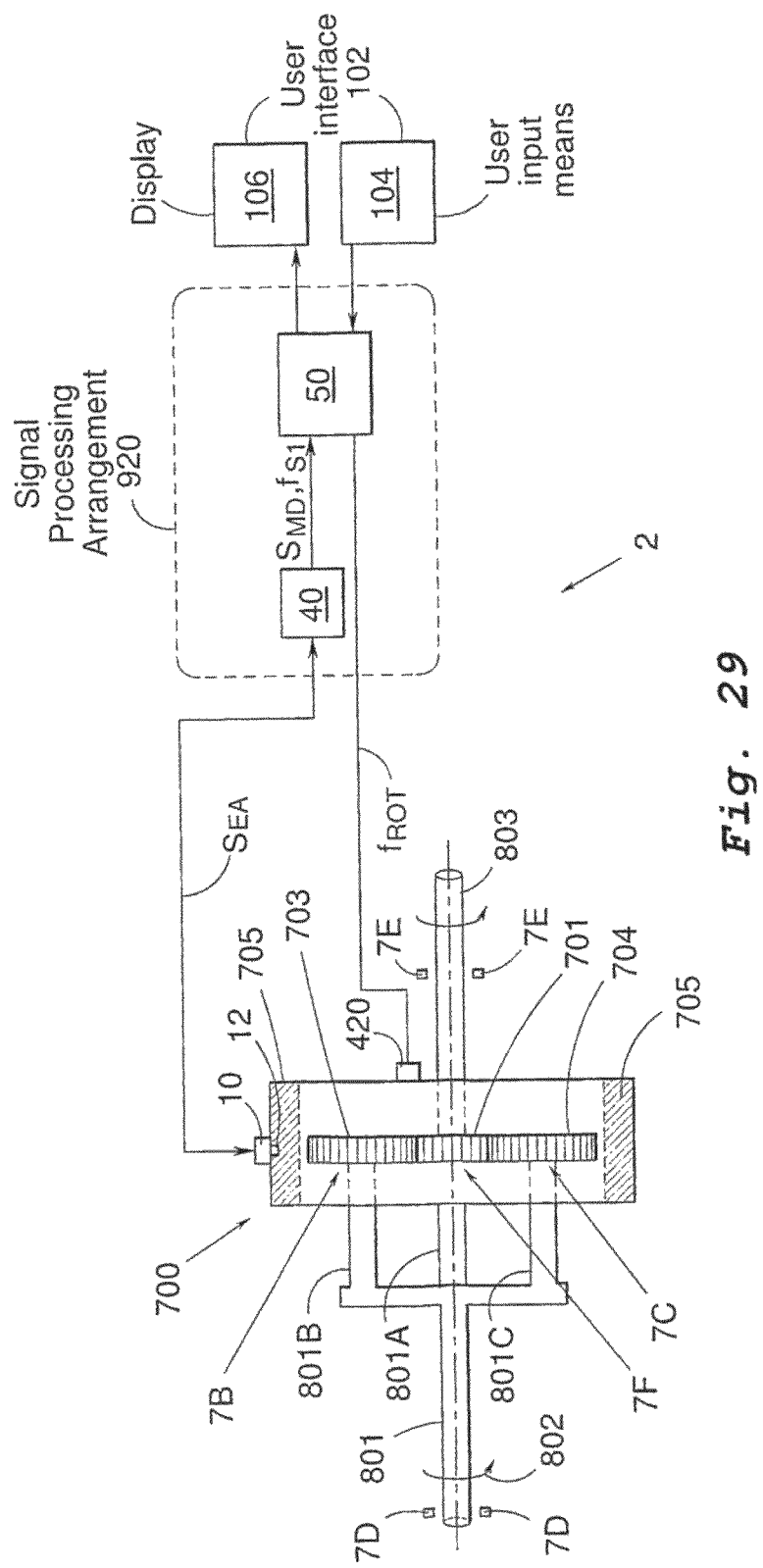
FIG. 29 illustrates yet an embodiment of a condition analyzing system according to an embodiment of the invention.

FIG. 29 illustrates yet an embodiment of a condition analyzing system 2 according to an embodiment of the invention. The sensor 10 is physically associated with a machine 6 which may include a gear system 700 having plural rotational parts (See FIG. 1 & FIG. 29). The gear system of FIG. 29 may be the epicyclic gear system 700 of FIG. 24. The epicyclic gear system 700 may, for example, be used as gear box for wind turbines.

The sensor unit 10 may be a Shock Pulse Measurement Sensor adapted to produce an analogue signal $S_{EA}$ including a vibration signal component dependent on a vibrational movement of a rotationally movable part in the gear system 700. The sensor 10 is delivers the analogue signal $S_{EA}$ to a signal processing arrangement 920. Signal processing arrangement 920 may include a sensor interface 40 and a data processing means 50. The sensor interface 40 includes an A/D converter 44 (FIG. 2A, FIG. 2B) generating the digital measurement signal $S_{MD}$. The A/D converter 44 is coupled to the data processing means 50 so as to deliver the digital measurement data signal $S_{MD}$ to the data processing means 50.

The data processing means 50 is coupled to a user interface 102. The user interface 102 may include user input means 104 enabling a user to provide user input. Such user input may include selection of a desired analysis function 105, 290, 290T, 290F (FIG. 4, FIG. 7, FIG. 8), and/or settings for signal processing functions 94, 250, 310, 470, 470A, 470,B, 320, 294 (See FIG. 4, FIG. 30).

The user interface 102 may also include a display unit 106, as described e.g. in connection with FIG. 2A an FIG. 5.

Figure 30:
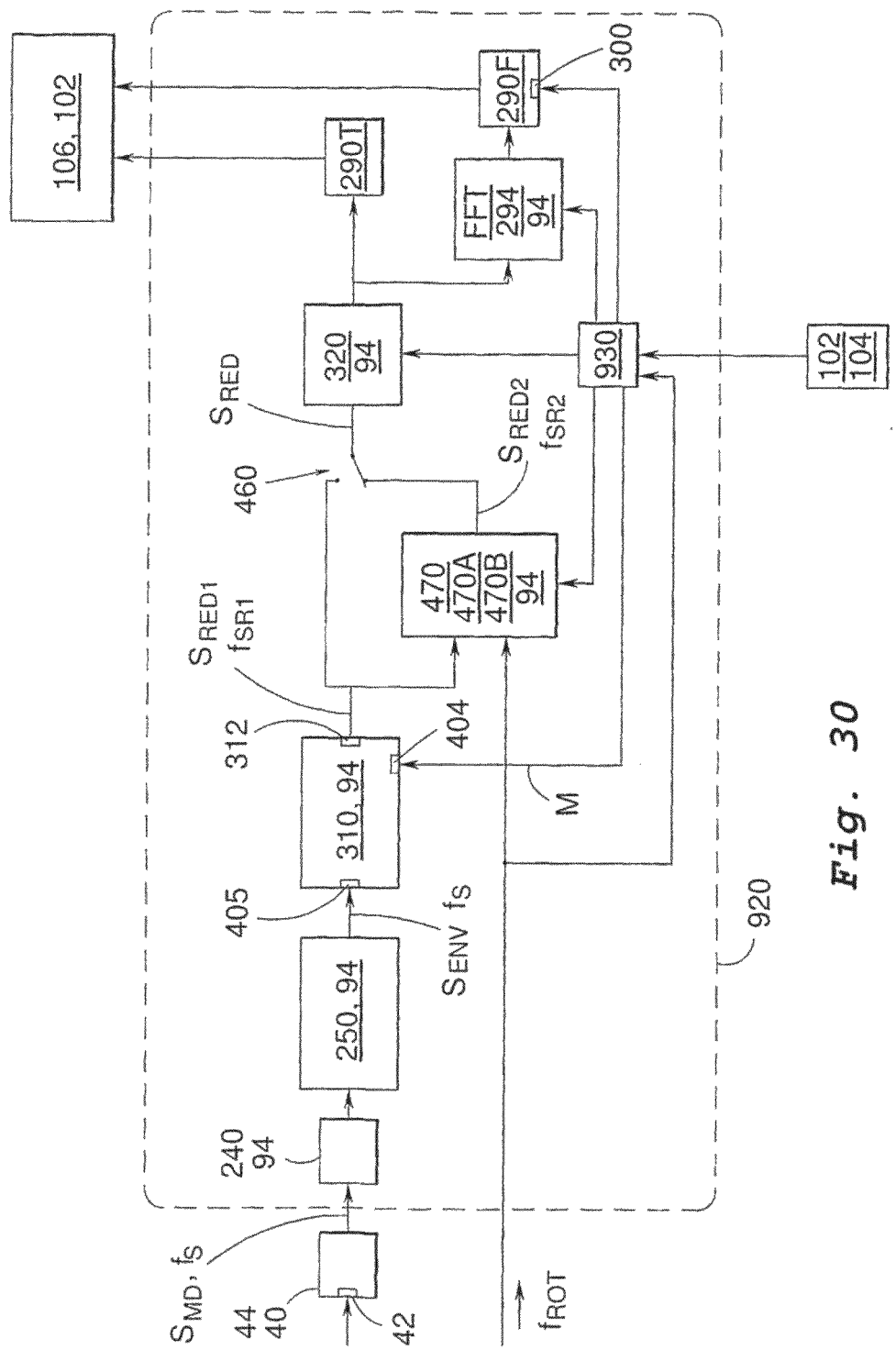
FIG. 30 is a block diagram illustrating the parts of the signal processing arrangement of FIG. 29 together with the user interface and the display.

FIG. 30 is a block diagram illustrating the parts of the signal processing arrangement 920 of FIG. 29 together with the user interface 102, 104 and the display 106.

The sensor interface 40 comprises an input 42 for receiving an analogue signal $S_{EA}$ from a Shock Pulse Measurement Sensor and an A/D converter 44. A signal conditioner 43 (FIG. 2B) may optionally also be provided. The A/D converter 44 samples the received analogue signal with a certain sampling frequency $f_S$ so as to deliver a digital measurement data signal $S_{MD}$ having said certain sampling frequency $f_S$.

The sampling frequency $f_S$ may be set to $$f_S = k \cdot f_{SEAmax}$$

wherein k is a factor having a value higher than 2.0

Accordingly the factor k may be selected to a value higher than 2.0. Preferably factor k may be selected to a value between 2.0 and 2.9 in order to avoid aliasing effects. Selecting factor k to a value higher than 2.2 provides a safety margin in respect of aliasing effects, as mentioned above in this document. Factor k may be selected to a value between 2.2 and 2.9 so as to provide said safety margin while avoiding to generate unnecessarily many sample values. According to an embodiment the factor k is advantageously selected such that 100*k/2 renders an integer. According to an embodiment the factor k may be set to 2.56. Selecting k to 2.56 renders 100*k=256=2 raised to 8.

According to an embodiment the sampling frequency $f_S$ of the digital measurement data signal $S_{MD}$ may be fixed to a certain value $f_S$, such as e.g. $f_S=102.4$ kHz Hence, when the sampling frequency $f_S$ is fixed to a certain value $f_S$, the frequency $f_{SEAmax}$ of the analogue signal $S_{EA}$ will be:

$$f_{SEAmax}=f_S/k$$

wherein $f_{SEAmax}$ is the highest frequency to be analyzed in the sampled signal.

Hence, when the sampling frequency $f_S$ is fixed to a certain value $f_S=102.4$ kHz, and the factor k is set to 2.56, the maximum frequency $f_{SEAmax}$ of the analogue signal $S_{EA}$ will be:

$$f_{SEAmax}=f_S/k=102\ 400/2.56=40\text{ kHz}$$

The digital measurement data signal $S_{MD}$ having sampling frequency $f_S$ is received by a filter 240. According to an embodiment, the filter 240 is a high pass filter having a cut-off frequency $f_{LC}$. This embodiment simplifies the design by replacing the band-pass filter, described in connection with FIG. 6, with a high-pass filter 240. The cut-off frequency $f_{LC}$ of the high pass filter 240 is selected to approximately the value of the lowest expected mechanical resonance frequency value $f_{RMU}$ of the resonant Shock Pulse Measurement sensor 10. When the mechanical resonance frequency $f_{RM}$ is somewhere in the range from 30 kHz to 35 kHz, the high pass filter 240 may be designed to having a lower cutoff frequency $f_{LC}$ 30 kHz. The high-pass filtered signal is then passed to the rectifier 270 and on to the low pass filter 280.

According to an embodiment it should be possible to use sensors 10 having a resonance frequency somewhere in the range from 20 kHz to 35 kHz. In order to achieve this, the high pass filter 240 may be designed to having a lower cutoff frequency $f_{LC}=20$ kHz.

The output signal from the digital filter 240 is delivered to a digital enveloper 250.

Whereas prior art analogue devices for generating an envelop signal in response to a measurement signal employs an analogue rectifier which inherently leads to a biasing error being introduced in the resulting signal, the digital enveloper 250 will advantageously produce a true rectification without any biasing errors. Accordingly, the digital envelop signal $S_{ENV}$ will have a good Signal-to-Noise Ratio, since the sensor being mechanically resonant at the resonance frequency in the passband of the digital filter 240 leads to a high signal amplitude. Moreover, the signal processing being performed in the digital domain eliminates addition of noise and eliminates addition of biasing errors.

According an embodiment of the invention the optional low pass filter 280 in enveloper 250 may be eliminated. In effect, the optional low pass filter 280 in enveloper 250 is eliminated since decimator 310 includes a low pass filter function, Hence, the enveloper 250 of FIG. 30 effectively comprises a digital rectifier 270, and the signal produced by the digital rectifier 270 is delivered to integer decimator 310, which includes low pass filtering.

The Integer decimator 310 is adapted to perform a decimation of the digitally enveloped signal $S_{ENV}$ so as to deliver a digital signal $S_{RED}$ having a reduced sample rate $f_{SR1}$ such that the output sample rate is reduced by an integer factor M as compared to the input sample rate $f_S$.

The value M may be settable in dependence on a detected speed of rotation $f_{ROT}$. The decimator 310 may be settable to make a selected decimation M:1, wherein M is a positive integer. The value M may be received on a port 404 of decimator 310.

The integer decimation is advantageously performed in plural steps using Low pass Finite Impulse Response Filters, wherein each FIR Filter is settable to a desired degree of decimation. An advantage associated with performing the decimation in plural filters is that only the last filter will need to have a steep slope. A steep slope FIR filter inherently must have many taps, i.e. a steep FIR filter must be a long filter. The number of FIR taps, is an indication of
1) the amount of memory required to implement the filter,
2) the number of calculations required, and
3) the amount of "filtering" the filter can do; in effect, more taps means more stopband attenuation, less ripple, narrower filters, etc. Hence the shorter the filter the faster it can be executed by the DSP 50. The length of a FIR filter is also proportional to the degree of achievable decimation. Therefore, according to an embodiment of the integer decimator, the decimation is performed in more than two steps.

According to a preferred embodiment the integer decimation is performed in four steps: M1, M2 M3 & M4. The total decimation M equals M1*M2*M3*M4 This may achieved by providing a bank of different FIR filters, which may be combined in several combinations to achieve a desired total decimation M. According to an embodiment there are eight different FIR filters in the bank.

Advantageously, the maximum degree of decimation in the last, 4:th, step is five (M4=5), rendering a reasonably short filter having just 201 taps. In this manner the FIR filters in steps 1, 2 and 3 can be allowed to have an even lower number of taps. In fact this allows for the filters in steps 1, 2 and 3 to have 71 taps each or less. In order to achieve a total decimation of M=4000, it is possible to select the three FIR-filters providing decimation M1=10, M2=10 and M3=10, and the FIR filter providing decimation M4=4. This renders an output sample rate $f_{SR1}=25.6$, when $f_S=102400$ Hz, and a frequency range of 10 Hz. These four FIR filters will have a total of 414 taps, and yet the resulting stopband attenuation is very good. In fact, if the decimation of M=4000 were to be made in just one single step it would have required about 160 000 taps to achieve an equally good stop band attenuation.

Output 312 of integer Decimator 310 is coupled to fractional decimator 470 and to an input of a selector 460. The selector enables a selection of the signal to be input to the enhancer 320.

When condition monitoring is made on a rotating part having a constant speed of rotation, the selector 460 may be set in the position to deliver the signal $S_{RED}$ having sample frequency $f_{SR1}$ to the input 315 of enhancer 320, and fractional decimator 470 may be disabled. When condition monitoring is made on a rotating part having a variable speed of rotation, the fractional decimator 470 may be enabled and the selector 460 is set in the position to deliver the signal $S_{RED2}$ having sample frequency $f_{SR2}$ to the input 315 of enhancer 320.

The fractional decimator 470 may be embodied by fractional decimator 470B, 94 including an adaptable FIR filter 608, as described in connection with FIGS. 20, 21 and 22 and FIG. 4.

The fractional decimator 470 is coupled to deliver a decimated signal $S_{RED2}$ having the lower sample rate $f_{SR2}$ to the selector 460, so that when the condition analyzer is set to monitor a machine with variable speed of rotation, the output from fractional decimator 470B is delivered to enhancer 320.

Enhancer 320, 94 may be embodied as described in connection with FIGS. 10A, 10B, 11, 12 and 13 and FIG. 4. The measuring signal input to the enhancer 320 is the signal $S_{RED}$ (See FIG. 30), which is also illustrated in FIG. 11 as having $I_{LENGTH}$ sample values. The signal $S_{RED}$ is also referred to as I and 2060 in the description of FIG. 11. The Enhancer signal processing involves discrete autocorrelation for the discrete input signal $S_{RED}$. The output signal O, also referred to as $S_{MDP}$ is illustrated in FIGS. 12 and 13.

The measurement signal $S_{RED1}$, $S_{RED}$, to be input to the enhancer, may include at least one vibration signal component $S_D$ dependent on a vibration movement of said rotationally movable part; wherein said vibration signal component has a repetition frequency $f_D$ which depends on the speed of rotation $f_{ROT}$ of said first part. The repetition frequency $f_D$ of signal component $S_D$ may be proportional to the speed of rotation $f_{ROT}$ of the monitored rotating part.

Two different damage signatures SD1, SD2 may have different frequencies fd1, fd2 and still be enhanced, i.e. SNR-improved, by the enhancer. Hence, the enhancer 320 is advantageously adapted to enhance different signatures $S_{D1}$, $S_{D2}$ having mutually different repetition frequencies $f_{D1}$ and $f_{D2}$. Both of the repetition frequencies $f_{D1}$ and $f_{D2}$ are proportional to the speed of rotation $f_{ROT}$ of the monitored rotating part, while $f_{D1}$ is different from $f_{D2}$ ($f_{D1}<>f_{D2}$). This may be expressed mathematically in the following manner:

$$fD1=k1*f_{ROT}, \text{ and}$$

$$fD2=k2*f_{ROT}, \text{ wherein}$$

k1 and k2 are positive real values, and
k1<>k2, and
k1 greater than or equal to one (1), and
k2 greater than or equal to one (1)

The enhancer delivers an output signal sequence to an input of time domain analyzer 290T, so that when a user selects, via user interface 102,104 to perform a time domain analysis, the time domain analyzer 290T, 105 (FIG. 30 & FIG. 4) will execute the selected function 105 and deliver relevant data to the display 106. An advantage with the enhancer 320 is that it delivers the output signal in the time domain. Hence, condition monitoring functions 105, 290T requiring an input signal in the time domain can be set to operate directly on the signal values of the signal output illustrated in FIGS. 12 and 13.

When a user selects, via user interface 102,104 to perform a frequency domain analysis, the enhancer will deliver the output signal sequence to Fast Fourier Transformer 294, and the FFTransformer will deliver the resulting frequency domain data to the frequency domain analyzer 290F, 105 (FIG. 30 & FIG. 4). The frequency domain analyzer 290F, 105 will execute the selected function 105 and deliver relevant data to the display 106.

In the embodiment shown in FIGS. 29 and 30, it is advantageously easy for a user to do perform an analysis employing the enhancer and the fractional decimator.

The below is an example of parameter settings:

In order to perform an analysis in the frequency domain the user may input the following data via user interface 102,104:

1) Information indicative of the highest repetition frequency $f_D$ of interest. The repetition frequency $f_D$ is repetition frequency a signature SD of interest. This information may be input in the form of a frequency or in the form an order number $O_{vHigh}$ indicative of the highest repetition frequency of damage signature SD of interest.

2) Information indicative of the desired improvement of the SNR value for repetitive signal signature $S_D$. This information may be input in the form the SNR Improver value L. The SNR Improver value L is also discussed below, and in connection with FIG. 10A above.

3) Information indicative of the desired frequency resolution in the FFT 294, when it is desired to perform an FFT of the signal output from enhancer. This may be set as value Z frequency bins. According to an embodiment of the invention, the frequency resolution Z is settable by selecting one value Z from a group of values. The group of selectable values for the frequency resolution Z may include

Z=400
Z=800
Z=1600
Z=3200
Z=6400

Hence, although the signal processing is quite complex, the arrangement 920 has been designed to provide an advantageously simple user interface in terms of information required by the user. When the user inputs or selects values for the above three parameters, all the other values are automatically set or preset in the arrangement 920.

The SNR Improver Value L

The signal to be input to the enhancer may include a vibration signal component dependent on a vibration movement of the rotationally movable part; wherein said vibration signal component has a repetition frequency $f_D$ which depends on the speed of rotation $f_{ROT}$ of said first part; said measurement signal including noise as well as said vibration signal component so that said measurement signal has a first signal-to-noise ratio in respect of said vibration signal component. The enhancer produces an output signal sequence (O) having repetitive signal components corresponding to said at least one vibration signal component so that said output signal sequence (O) has a second signal-to-noise ratio value in respect of said vibration signal component. The inventor has established by measurements that the second signal-to-noise ratio value is significantly higher than the first signal-to-noise ratio when the SNR Improver value L is set to value one (1).

Moreover, the inventor has established by measurements that when the SNR Improver value L is increased to L=4, then the resulting SNR value in respect of said vibration signal component in the output signal is doubled as compared to the SNR value associated with L=1. Increasing the SNR Improver value L to L=10 appears to render an improvement of the associated SNR value by a factor 3 for the vibration signal component in the output signal, as compared to the SNR value for same input signal when L=1. Hence, when increasing SNR Improver value L from $L_1$=1 to $L_2$ the resulting SNR value may increase by the square root of $L_2$.

Additionally the user may input a setting to have the arrangement 920 keep repeating the measurement. The user may set it to repeat the measurement with a certain repetition period $T_{PM}$, i.e. to always start a new measurement when the time $T_{PM}$ has passed. $T_{PM}$ may be set to be a one week, or one hour or ten minutes. The value to select for this repetition frequency depends on the relevant measuring conditions.

Since the enhancer method requires a lot of data input values, i.e. the number of input sample values may be high, and it is suited for measuring on slowly rotating parts, the duration of the measurement will sometimes be quite long.

Hence there is a risk that the user settings for the frequency of repetition of measurements is incompatible with the duration of measurements. Therefore, one of the steps performed by the arrangement 920, immediately after receiving the above user input, is to calculate an estimate of the expected duration of measurements $T_M$.

The duration $T_M$ is:

$$T_M = I_{Length}/f_{SR2},$$

Wherein $I_{LENGTH}$ is the number of samples in the signal to be input into the enhancer in order to achieve measurements according to selected user settings as defined below, and fSR2 is as defined below.

The arrangement 920 is also adapted to compare the duration of measurements $T_M$ with the repetition period value $T_{PM}$ as selected by the user. If the repetition period value $T_{PM}$ is shorter or about the same as the expected duration of measurements $T_M$, a parameter controller 930 is adapted to provide a warning indication via the user interface 102,106 e.g. by a suitable text on the display. The warning may also include a sound, or a blinking light.

According to an embodiment the arrangement 920 is adapted to calculate a suggested minimum value for the repetition period value $T_{PM}$ is dependence on the calculated estimate of duration of measurements $T_M$.

Based on the above user settings, the parameter controller 930 of signal processing arrangement 920 is capable of setting all the parameters for the signal processing functions 94 (FIG. 4), i.e. integer decimator settings and enhancer settings.

Moreover the parameter controller 930 is capable of setting all the parameters for the fractional decimator when needed. The parameter controller 930 is capable of setting the parameter for the FFT 294 when a frequency analysis is desired.

The following parameter may be preset in the arrangement 920 (FIG. 30):
sample frequency $f_S$ of A/D converter 40,44.

The following parameter may be measured: $f_{ROT}$

As mentioned above, the parameter value $f_{ROT}$ may be measured and stored in association with the corresponding sample values of the signal $S_{RED1}$ whose sample values are fed into the fractional decimator 470B.

The following parameters may be automatically set in the arrangement 920:

Sample rate in the signal output from enhancer 320:

$$f_{SR2} = C*O_V*f_{ROT}$$

wherein
C is a constant of value higher than 2.0
$O_V$ is the order number input by the user, or calculated in response to a highest frequency value to be monitored as selected by the user
$f_{ROT}$ is the momentary measured rotational speed of the rotating part during the actual condition monitoring;

M=The integer decimator value for use in decimator 310 is selected from a table including a set of predetermined values for the total integer decimation. In order to select the most suitable value M, the parameter controller 930 (FIG. 30) first calculates a fairly close value $M\_calc = f_S/f_{SR2}*f_{ROTmin}/f_{ROTmax}$ wherein
$f_S$ & $f_{SR2}$ are defined above, and
$f_{ROTmin}/f_{ROTmax}$ is a value indicative of the relation between lowest and highest speed of rotation to be allowed during the measurement. Based on the value M_calc the selector then chooses a suitable value M from a list of preset values. This may e.g be done by selecting the closest value M which is lower than M_calc from the table mentioned above.

$f_{SR1}$=the sample rate to be delivered from the integer decimator 310. fSR1 is set to $f_{SR1}=f_S/M$
D is the fractional decimator value for fractional decimator. D may be set to $D=f_{sr1}/f_{sr2}$, wherein $f_{sr1}$ and $f_{sr2}$ are as defined above.

$$O_{LENGTH} = C*Z$$

wherein
C is a constant of value higher than 2.0, such as e.g. 2.56 as mentioned above
Z is the selected number of frequency bins, i.e. information indicative of the desired frequency resolution in the FFT 294, when it is desired to perform an FFT of the signal output from enhancer.

$S_{START} = O_{LENGTH}$ or a value higher than $O_{LENGTH}$, wherein $O_{LENGTH}$ is as defined immediately above.

$$I_{LENGTH} = O_{LENGTH}*L + S_{START} + O_{LENGTH}$$

$$C_{LENGTH} = I_{LENGTH} - S_{START} - O_{LENGTH}$$

SMDP(t)=the values of the samples of the output signal, as defined in equation (5) (See FIG. 10A).

Hence, the parameter controller 930 is adapted to generate the corresponding setting values as defined above, and to deliver them to the relevant signal processing functions 94 (FIG. 30 & FIG. 4).

Once an output signal has been generated by enhancer 320, the condition analyser 290 can be controlled to perform a selected condition analysis function 105, 290, 290T, 290F by means of a selection signal delivered on a control input 300 (FIG. 30). The selection signal delivered on control input 300 may be generated by means of user interaction with the user interface 102 (See FIGS. 2A & 30). When the selected analysis function includes Fast Fourier Transform, the analyzer 290F will be set by the selection signal 300 to operate on an input signal in the frequency domain.

The FFTransformer 294 may be adapted to perform Fast Fourier Transform on a received input signal having a certain number of sample values. It is advantageous when the certain number of sample values is set to an even integer which may be divided by two (2) without rendering a fractional number.

According to an advantageous embodiment of the invention, the number of samples $O_{LENGTH}$ in the output signal from the enhancer is set in dependence on the frequency resolution Z. The relation between frequency resolution Z and the number of samples $O_{LENGTH}$ in the output signal from the enhancer is:

$$O_{LENGTH} = k*Z$$

wherein
$O_{LENGTH}$ is the samples number of sample values in the signal delivered from the enhancer 320.
k is a factor having a value higher than 2.0

Preferably factor k may be selected to a value between 2.0 and 2.9 in order to provide a good safety margin while avoiding to generate unnecessarily many sample values.

According to an embodiment the factor k is advantageously selected such that 100*k/2 renders an integer. This selection renders values for $O_{LENGTH}$ that are adapted to be suitable as input into the FFTransformer 294. According to an embodiment the factor k may be set to 2.56. Selecting k to 2.56 renders 100*k=256=2 raised to 8.

Table A indicates examples of user selectable Frequency resolution values Z and corresponding values for $O_{LENGTH}$.

TABLE A

| K | Z | $O_{LENGTH}$ |
|---|---|---|
| 2.56 | 400 | 1024 |
| 2.56 | 800 | 2048 |
| 2.56 | 1600 | 4096 |
| 2.56 | 3200 | 8192 |
| 2.56 | 6400 | 16384 |
| 2.56 | 12800 | 32768 |
| 2.56 | 25600 | 65536 |
| 2.56 | 51200 | 131072 |

The invention claimed is:

1. An apparatus for analysing the condition of a machine having a part rotating with a speed of rotation, comprising:
   a first sensor adapted to generate an analogue measurement signal dependent on mechanical vibrations emanating from rotation of said part;
   an analogue-to-digital converter for sampling said analogue measurement signal at a sampling frequency so as to generate a digital measurement data signal in response to said analogue measurement signal;
   a digital rectifier adapted to generate a rectified signal dependent on said digital measurement data signal;
   a first decimator for performing a decimation of the rectified signal so as to achieve a first digital signal having a first reduced sampling frequency;
   a fractional second decimator, said fractional second decimator having
      a first input for receiving said first digital signal,
      a second input for receiving a signal indicative of a relevant variable speed of rotation associated with said rotating part, and
      a third input for receiving a signal indicative of an output sample rate setting signal,
   said fractional second decimator being adapted to generate a second digital signal having a second reduced sampling frequency such that the number of sample values per revolution of said rotating part is kept at a substantially constant value, said fractional second decimator including a low pass filter having a low pass cut-off frequency, and said fractional second decimator generating said second digital signal in response to
      said first digital signal,
      said signal indicative of a relevant variable speed of rotation, and
      said signal indicative of an output sample rate setting signal;
   and
   an evaluator adapted to perform a condition analysis function for analysing the condition of the machine dependent on said second digital signal.

2. The apparatus according to claim 1, wherein said low pass cut-off frequency is dependent on the value indicative of a speed of rotation.

3. The apparatus according to claim 1, wherein said fractional second decimator comprises:
   a memory adapted to receive and store said data values and information indicative of the corresponding speed of rotation; and
   a value generator adapted to generate a fractional value, and
   wherein said low pass filter of the fractional second decimator is a finite impulse response (FIR) filter having an input for receiving data values of said first digital signal, said finite impulse response filter comprising a plurality of finite impulse response filter taps each having individual filter values.

4. The apparatus according to claim 3, wherein said fractional second decimator is adapted to calculate an individual filter value by means of interpolation.

5. The apparatus according to claim 3,
   wherein said fractional second decimator is adapted to generate a fractional value dependent on said speed of rotation value, and
   wherein said fractional second decimator is adapted to associate said data values with a corresponding variable speed of rotation value.

6. The apparatus according to claim 5, wherein said fractional second decimator is arranged to adapt said finite impulse response filter in response to said fractional value.

7. The apparatus according to claim 5,
   wherein said finite impulse response filter is an adaptable finite impulse response filter, and
   wherein said fractional second decimator, during a condition monitoring session, is adapted to automatically adjust the fractional value in response to said speed of rotation value so that said second digital signal comprises a substantially constant number of sample values per revolution of the monitored rotating part when the speed of rotation varies during the condition monitoring session.

8. The apparatus according to claim 1, wherein said evaluator is adapted to perform a condition analysis function for detection of whether the condition of the machine is normal or somewhat deteriorated or abnormal.

9. The apparatus according to claim 1, wherein said evaluator is adapted to perform a condition analysis function making it possible to establish the nature of, and/or cause for, an abnormal machine condition.

10. The apparatus according to claim 1, wherein said condition analysis function includes a Fast Fourier Transform of said second digital signal.

11. The apparatus according to claim 1, wherein said first sensor is a shock pulse sensor.

12. The apparatus according to claim 1, wherein said first sensor is a vibration sensor having a substantially linear response in a frequency range up to around 10 kHz.

13. A method for analyzing a condition of a machine having a part rotating with a variable speed of rotation, the method comprising the steps of:
   (I) providing the apparatus of claim 1;
   (II) applying the sensor to a measuring point on the machine; and
   (III) generating the machine condition from the evaluator, wherein the rotating part has a rotational speed of less than 50 revolutions per minute.

14. A method for analyzing a condition of a machine having a part rotating with a variable speed of rotation, the method comprising the steps of:
   (I) providing the apparatus of claim 1;
   (II) applying the sensor to a measuring point on the machine; and
   (III) generating the machine condition from the evaluator, wherein the rotating part is part of a gear system, and the machine condition is a condition of the gear system.

15. An apparatus for analysing the condition of a machine having a part rotating with a speed of rotation, comprising:
   a first sensor adapted to generate an analogue measurement signal dependent on mechanical vibrations emanating from rotation of said part;

an analogue-to-digital converter for sampling said analogue measurement signal at a sampling frequency so as to generate a digital measurement data signal in response to said analogue measurement signal;

a digital rectifier adapted to generate a digitally rectified measurement data signal dependent on said digital measurement data signal;

an input for receiving a value indicative of a speed of rotation of said rotating part;

a fractional second decimator adapted to perform a decimation of the digitally rectified measurement data signal so as to generate a decimated digital signal having a reduced sampling frequency, said fractional second decimator including a low pass filter having a low pass cut-off frequency, and said fractional second decimator being adapted to control the reduced sampling frequency in dependence of the value indicative of a speed of rotation such that the number of sample values per revolution of said rotating part is kept at a substantially constant value in said decimated digital signal, and said low pass cut-off frequency being dependent on the value indicative of a speed of rotation; and an evaluator adapted to perform a condition analysis function for analysing the condition of the machine dependent on said decimated digital signal.

16. The apparatus according to claim 15, wherein said fractional second decimator includes a fractional decimator memory adapted to receive and store a plurality of sample values of said digitally rectified measurement data signal as well as information indicative of a corresponding speed of rotation of the monitored rotating part, the fractional second decimator being adapted to store a sample value of said digitally rectified measurement data signal so that the stored sample value is associated with a value indicative of a speed of rotation of the monitored rotating part.

17. The apparatus according to claim 15, wherein said fractional second decimator includes a fractional decimator memory adapted to store a plurality of sample values of said digitally rectified measurement data signal so that each plurality of sample values is associated with a value indicative of a speed of rotation of the monitored shaft.

18. The apparatus according to claim 17, wherein said fractional second decimator includes a fractional value generator for generating a fractional value, the fractional value generator being adapted to automatically adjust the fractional value in response to the speed of rotation of the rotating part.

19. The apparatus according to claim 18,
wherein said fractional second decimator includes a filter parameter generator, and
wherein said low pass filter is a finite impulse response filter having said low pass cut-off frequency.

20. The apparatus according to claim 19,
wherein said finite impulse response filter is adapted to receive, from said fractional decimator memory, a selected plurality of sample values and an associated specific fractional decimation value,
wherein the filter parameter generator is adapted to generate filter settings suitable for the associated specific fractional decimation value, and
wherein said finite impulse response filter is adapted to generate a block of output values in response to the selected plurality of sample values and the associated fractional decimation value.

21. The apparatus according to claim 19, wherein said finite impulse response filter comprises a plurality of finite impulse response filter taps having individual filter values.

22. The apparatus according to claim 19, wherein said filter parameter generator is adapted to calculate an individual filter value by means of interpolation.

23. The apparatus according to claim 20, wherein said fractional second decimator, during a condition monitoring session, is adapted to automatically adjust the fractional value in response to said speed of rotation value so that said decimated digital signal comprises a substantially constant number of sample values per revolution of the monitored rotating part when the speed of rotation varies during the condition monitoring session.

24. The apparatus according to claim 15, wherein said evaluator is adapted to perform a condition analysis function for detection of whether the condition of the machine is normal or somewhat deteriorated or abnormal.

25. The apparatus according to claim 15, wherein said evaluator is adapted to perform a condition analysis function making it possible to establish the nature of, and/or cause for, an abnormal machine condition.

26. The apparatus according to claim 15, wherein said condition analysis function includes a Fast Fourier Transform of said decimated digital signal.

27. The apparatus according to claim 15, wherein said first sensor is a shock pulse sensor.

28. The apparatus according to claim 15, wherein said first sensor is a vibration sensor having a substantially linear response in a frequency range up to around 10 kHz.

29. A method for analyzing a condition of a machine having a part rotating with a variable speed of rotation, the method comprising the steps of:
(I) providing the apparatus of claim 15;
(II) applying the sensor to a measuring point on the machine; and
(III) generating the machine condition from the evaluator, wherein the rotating part has a rotational speed of less than 50 revolutions per minute.

30. A method for analyzing a condition of a machine having a part rotating with a variable speed of rotation, the method comprising the steps of:
(I) providing the apparatus of claim 15;
(II) applying the sensor to a measuring point on the machine; and
(III) generating the machine condition from the evaluator, wherein the rotating part is part of a gear system, and the machine condition is a condition of the gear system.

31. The method according to claim 30,
wherein the gear system includes a plurality of rotating parts which are rotating at mutually different rotational speed,
wherein the sensor is adapted to generate the analogue electric measurement signal so that it includes at least one repetitive signal signature dependent on said mechanical vibrations such that the repetitive signal signature has a repetition frequency which depends on the speed of rotation of a part which is the origin of the repetitive signal signature, and
wherein the step of generating the machine condition includes the step of:
(IIIA) indicating the rotating part from which the repetitive signal signature originates; said indication being generated in dependence on the repetition frequency of the repetitive signal signature.

32. The method according to claim 30, wherein the gear system includes a plurality of rotating parts which are rotating at mutually different rotational speed, wherein the sensor is adapted to generate the analogue electric measurement signal so that it includes at least one repetitive signal signature dependent on said mechanical vibrations such that the repetitive signal signature has a repetition frequency which depends on the speed of rotation of a part which is the origin of the repetitive signal signature, and wherein the step of generating the machine condition includes the step of:

(IIIB) indicating a type of deteriorated condition from among a plurality of different types of deteriorated conditions; said indicating step being performed in dependence on the repetition frequency of the repetitive signal signature.

33. The method according to claim 30, wherein the gear system includes a plurality of rotating parts which are rotating at mutually different rotational speed, wherein the sensor is adapted to generate the analogue electric measurement signal so that it includes at least one repetitive signal signature dependent on said mechanical vibrations such that the repetitive signal signature has a repetition frequency which depends on the speed of rotation of a part which is the origin of the repetitive signal signature, and wherein the step of generating the machine condition includes the steps of:

detecting the repetition frequency of the repetitive signal signature; and indicating a type of deteriorated condition in dependence on the detected repetition frequency, wherein the repetitive signal signature is indicative of at least one deteriorated condition selected from a group comprising: a Bearing Inner Race damage, a Bearing Outer Race damage, and a teeth engagement error.

* * * * *